US011038709B2

(12) United States Patent
Park et al.

(10) Patent No.: US 11,038,709 B2
(45) Date of Patent: Jun. 15, 2021

(54) BUILDING SYSTEM WITH A SPACE GRAPH WITH ENTITY RELATIONSHIPS AND INGESTED DATA

(71) Applicant: Johnson Controls Technology Company, Auburn Hills, MI (US)

(72) Inventors: Youngchoon Park, Brookfield, WI (US); Sudhi Sinha, Milwaukee, WI (US)

(73) Assignee: Johnson Controls Technology Company, Auburn Hills, MI (US)

(*) Notice: Subject to any disclaimer, the term of this patent is extended or adjusted under 35 U.S.C. 154(b) by 0 days.

(21) Appl. No.: 16/895,814

(22) Filed: Jun. 8, 2020

(65) Prior Publication Data

US 2020/0313924 A1   Oct. 1, 2020

Related U.S. Application Data

(63) Continuation of application No. 16/688,819, filed on Nov. 19, 2019, which is a continuation of application
(Continued)

(51) Int. Cl.
*H04L 12/28* (2006.01)
*G06F 16/901* (2019.01)

(52) U.S. Cl.
CPC ...... *H04L 12/2827* (2013.01); *G06F 16/9024* (2019.01); *H04L 12/2809* (2013.01); *H04L 12/2812* (2013.01); *H04L 12/2832* (2013.01)

(58) Field of Classification Search
CPC .......................... H04L 12/2827; G06F 16/9024
(Continued)

(56) References Cited

U.S. PATENT DOCUMENTS 6,487,457 B1   11/2002   Hull et al.
8,401,991 B2   3/2013   Wu et al.
(Continued)

FOREIGN PATENT DOCUMENTS

CN   106406806 A   2/2017
CN   107598928 A   1/2018
(Continued)

OTHER PUBLICATIONS

Balaji et al, "Brick: Towards a Unified Metadata Schema for Buildings," dated Nov. 16-17, 2016, 10 pages.
(Continued)

*Primary Examiner* — Anthony D Brown
(74) *Attorney, Agent, or Firm* — Foley & Lardner LLP

(57) ABSTRACT

A building system for operating a building and managing building information, the building system comprising one or more memory devices configured to store instructions thereon. The instructions causing one or more processors to receive building data from one or more building data sources and generate a space graph based on the building data, wherein the space graph is a graph data structure comprising nodes representing entities and edges between the entities representing relationships between the entities. The instructions cause the one or more processors to ingest data values of the building data into the space graph, the data values associated with the entities, and perform one or more operations with the space graph based on both the relationships of the entities and the ingested data values.

20 Claims, 21 Drawing Sheets

Related U.S. Application Data

No. 16/260,078, filed on Jan. 28, 2019, now Pat. No. 10,505,756, which is a continuation-in-part of application No. 16/036,685, filed on Jul. 16, 2018, and a continuation-in-part of application No. 16/048,052, filed on Jul. 27, 2018, now Pat. No. 10,417,451, and a continuation-in-part of application No. 16/142,578, filed on Sep. 26, 2018, and a continuation-in-part of application No. 15/644,581, filed on Jul. 7, 2017, now Pat. No. 10,169,486, said application No. 16/142,578 is a continuation-in-part of application No. 15/644,560, filed on Jul. 7, 2017, now Pat. No. 10,417,245, and a continuation-in-part of application No. 15/644,519, filed on Jul. 7, 2017, now Pat. No. 10,095,756, said application No. 16/260,078 is a continuation-in-part of application No. 16/142,758, filed on Sep. 26, 2018.

(60) Provisional application No. 62/533,581, filed on Jul. 17, 2017, provisional application No. 62/564,247, filed on Sep. 27, 2017, provisional application No. 62/611,984, filed on Dec. 29, 2017, provisional application No. 62/611,974, filed on Dec. 29, 2017, provisional application No. 62/612,167, filed on Dec. 29, 2017, provisional application No. 62/457,654, filed on Feb. 10, 2017, provisional application No. 62/588,114, filed on Nov. 17, 2017, provisional application No. 62/588,190, filed on Nov. 17, 2017, provisional application No. 62/588,179, filed on Nov. 17, 2017, provisional application No. 62/611,962, filed on Dec. 29, 2017.

(58) Field of Classification Search
USPC .................................................. 726/22–25
See application file for complete search history.

(56) References Cited

U.S. PATENT DOCUMENTS

| | | | |
|---|---|---|---|
| 8,516,016 | B2 | 8/2013 | Park et al. |
| 8,532,808 | B2 | 9/2013 | Drees et al. |
| 8,532,839 | B2 | 9/2013 | Drees et al. |
| 8,600,556 | B2 | 12/2013 | Nesler et al. |
| 8,635,182 | B2 | 1/2014 | Mackay |
| 8,682,921 | B2 | 3/2014 | Park et al. |
| 8,731,724 | B2 | 5/2014 | Drees et al. |
| 8,751,487 | B2 | 6/2014 | Byrne et al. |
| 8,788,097 | B2 | 7/2014 | Drees et al. |
| 8,843,238 | B2 | 9/2014 | Wenzel et al. |
| 8,990,127 | B2 | 3/2015 | Taylor |
| 9,196,009 | B2 | 11/2015 | Drees et al. |
| 9,286,582 | B2 | 3/2016 | Drees et al. |
| 9,354,968 | B2 | 5/2016 | Wenzel et al. |
| 9,753,455 | B2 | 9/2017 | Drees |
| 9,811,249 | B2 | 11/2017 | Chen et al. |
| 9,886,478 | B2 | 2/2018 | Mukherjee |
| 10,169,454 | B2 | 1/2019 | Ait-Mokhtar et al. |
| 10,171,586 | B2 | 1/2019 | Shaashua et al. |
| 2005/0154494 | A1 | 7/2005 | Ahmed |
| 2006/0271589 | A1 | 11/2006 | Horowitz et al. |
| 2007/0203693 | A1* | 8/2007 | Estes ............... G06F 16/248 704/9 |
| 2010/0045439 | A1* | 2/2010 | Tak ............... H04Q 9/00 340/10.1 |
| 2010/0281387 | A1 | 11/2010 | Holland et al. |
| 2011/0047418 | A1 | 2/2011 | Drees et al. |
| 2011/0087650 | A1 | 4/2011 | Mackay et al. |
| 2011/0125737 | A1* | 5/2011 | Pothering ............. G06F 16/832 707/728 |
| 2011/0218777 | A1 | 9/2011 | Chen et al. |
| 2013/0060820 | A1 | 3/2013 | Bulusu et al. |
| 2015/0019174 | A1 | 1/2015 | Kiff et al. |
| 2015/0168931 | A1 | 6/2015 | Jin |
| 2016/0350364 | A1 | 12/2016 | Anicic et al. |
| 2017/0017221 | A1 | 1/2017 | Lamparter et al. |
| 2017/0052536 | A1 | 2/2017 | Warner et al. |
| 2017/0053441 | A1 | 2/2017 | Nadumane et al. |
| 2017/0230930 | A1* | 8/2017 | Frey .................. H04W 64/003 |
| 2017/0315697 | A1 | 11/2017 | Jacobson et al. |
| 2017/0351957 | A1 | 12/2017 | Lecue et al. |
| 2017/0357490 | A1 | 12/2017 | Park et al. |
| 2018/0024520 | A1 | 1/2018 | Sinha et al. |
| 2018/0048485 | A1 | 2/2018 | Pelton et al. |
| 2018/0114140 | A1 | 4/2018 | Chen et al. |
| 2018/0176241 | A1 | 6/2018 | Manadhata et al. |
| 2018/0198627 | A1* | 7/2018 | Mullins ................. H04L 9/0877 |
| 2018/0203961 | A1 | 7/2018 | Aisu et al. |
| 2018/0275625 | A1 | 9/2018 | Park et al. |
| 2018/0292797 | A1 | 10/2018 | Lamparter et al. |
| 2018/0359111 | A1 | 12/2018 | Harvey |
| 2018/0364654 | A1 | 12/2018 | Locke et al. |
| 2019/0005025 | A1 | 1/2019 | Malabarba |
| 2019/0013023 | A1 | 1/2019 | Pourmohammad et al. |
| 2019/0025771 | A1 | 1/2019 | Park et al. |
| 2019/0042988 | A1 | 2/2019 | Brown et al. |
| 2019/0147883 | A1 | 5/2019 | Mellenthin et al. |
| 2019/0158309 | A1 | 5/2019 | Park et al. |

FOREIGN PATENT DOCUMENTS

| | | |
|---|---|---|
| EP | 3 324 306 | 5/2018 |
| WO | WO-2011/100255 A2 | 8/2011 |

OTHER PUBLICATIONS

Balaji et al, Brick: Metadata schema for portable smart building applications, dated Sep. 25, 2017, 20 pages.
Balaji et al, Demo Abstract: Portable Queries Using the Brick Schema for Building Applications, dated Nov. 16-17, 2016, 2 pages.
Bhattacharya et al., Short Paper: Analyzing Metadata Schemas for Buildings—The Good, The Bad and The Ugly, ACM, Nov. 4-5, 2015, 4 pages.
Brick: Metadata schema for portable smart building applications, dated Sep. 15, 2018, 3 pages, (Abstract).
Brick: Towards a Unified Metadata Schema for Buildings, dated Nov. 16, 2016, 46 pages.
Building Blocks for Smart Buildings, BrickSchema.org, Mar. 2019, 17 pages.
Extended European Search Report issued in EP Application No. 18196948.6 dated Apr. 10, 2019, 9 pages.
Fierro et al., Beyond a House of Sticks: Formalizing Metadata Tags with Brick, dated Nov. 13-14, 2019, 10 pages.
Fierro et al., Dataset: An Open Dataset and Collection Tool for BMS Point Labels, dated Nov. 10, 2019, 3 pages.
Fierro et al., Design and Analysis of a Query Processor for Brick, dated Jan. 2018, 25 pages.
Fierro et al., Design and Analysis of a Query Processor for Brick, dated Nov. 8-9, 2017, 10 pages.
Fierro et al., Mortar: An Open Testbed for Portable Building Analytics, dated Nov. 7-8, 2018, 10 pages.
Fierro et al., Why Brick is a Game Changer for Smart Buildings, Memoori Webinar, 2019, 67 pages.
Fierro, Writing Portable Building Analytics with the Brick Metadata Schema, UC Berkeley ACM E-Energy, 2019, 39 pages.
Gao et al., A large-scale evaluation of automated metadata inference approaches on sensors from air handling units, dated May 1, 2018, pp. 14-30.
International Search Report and Written Opinion on PCT/US2019/015481, dated May 17, 2019, 78 pages.
Koh et al., "Scrabble: Transferrable Semi-Automated Semantic Metadata Normalization using Intermediate Representation," Nov. 7-8, 2018, 10 pages.
Koh et al., Plaster: An Integration, Benchmark, and Development Framework for Metadata Normalization Methods, dated Nov. 7-8, 2018, 10 pages.

(56) References Cited

OTHER PUBLICATIONS

Koh et al., Who can Access What, and When?, dated Nov. 13-14, 2019, 4 pages.
Metadata Schema for Buildings, 3 pages, Brickschema.org (Cannot confirm date.).
International Search Report and Written Opinion on PCT/US2020/058381, dated Jan. 27, 2021, 30 pages.

* cited by examiner

BUILDING SYSTEM WITH A SPACE GRAPH WITH ENTITY RELATIONSHIPS AND INGESTED DATA

CROSS-REFERENCE TO RELATED PATENT APPLICATIONS

This application is a continuation of U.S. patent application Ser. No. 16/688,819 filed Nov. 19, 2019, which is a continuation of U.S. patent application Ser. No. 16/260,078 filed Jan. 28, 2019 (now U.S. Pat. No. 10,505,756) which is a continuation-in-part of U.S. patent application Ser. No. 16/048,052 filed Jul. 27, 2018 (now U.S. Pat. No. 10,417,451), which claims the benefit of and priority to U.S. Provisional Patent Application No. 62/564,247 filed Sep. 27, 2017, U.S. Provisional Patent Application No. 62/611,984 filed Dec. 29, 2017, and U.S. Provisional Patent Application No. 62/611,974 filed Dec. 29, 2017. U.S. patent application Ser. No. 16/260,078 filed Jan. 28, 2019 (now U.S. Pat. No. 10,505,756) is also a continuation-in-part of U.S. patent application Ser. No. 16/142,578 filed Sep. 26, 2018, which claims the benefit of and priority to U.S. Provisional Patent Application No. 62/564,247 filed Sep. 27, 2017, and U.S. Provisional Patent Application No. 62/612,167 filed Dec. 29, 2017. U.S. patent application Ser. No. 16/142,578 filed Sep. 26, 2018 is a continuation-in-part of U.S. patent application Ser. No. 15/644,519 filed Jul. 7, 2017 (now U.S. Pat. No. 10,095,756), which claims the benefit of and priority to U.S. Provisional Patent Application No. 62/457,654 filed Feb. 10, 2017. U.S. patent application Ser. No. 16/142,578 filed Sep. 26, 2018 is also a continuation-in-part of U.S. patent application Ser. No. 15/644,581 filed Jul. 7, 2017 (now U.S. Pat. No. 10,169,486), which claims the benefit of and priority to U.S. Provisional Patent Application No. 62/457,654 filed Feb. 10, 2017. U.S. patent application Ser. No. 16/142,578 filed Sep. 26, 2018 is also a continuation-in-part of U.S. patent application Ser. No. 15/644,560 filed Jul. 7, 2017 (now U.S. Pat. No. 10,417,245), which claims the benefit of and priority to U.S. Provisional Patent Application No. 62/457,654 filed Feb. 10, 2017. U.S. patent application Ser. No. 16/260,078 filed Jan. 28, 2019 (now U.S. Pat. No. 10,505,756) is also a continuation-in-part of U.S. patent application Ser. No. 16/142,758 filed Sep. 26, 2018 which claims the benefit of and priority to U.S. Provisional Patent Application No. 62/564,247 filed Sep. 27, 2017, U.S. Provisional Patent Application No. 62/588,179 filed Nov. 17, 2017, U.S. Provisional Patent Application No. 62/588,190 filed Nov. 17, 2017, U.S. Provisional Patent Application No. 62/588,114 filed Nov. 17, 2017, and U.S. Provisional Patent Application No. 62/611,962 filed Dec. 29, 2017. U.S. patent application Ser. No. 16/260,078 filed Jan. 28, 2019 (now U.S. Pat. No. 10,505,756) is also a continuation-in-part of U.S. patent application Ser. No. 16/036,685 filed Jul. 16, 2018, which claims the benefit of and priority to U.S. Provisional Patent Application No. 62/533,581 filed Jul. 17, 2017. The entirety of each of these patent applications is incorporated by reference herein.

BACKGROUND

The present disclosure relates generally to a building management system and more particularly to building information management of a building management system that collects, manages, and utilizes data for interconnected devices and other entities.

In a typical building management systems, relationships between spaces, assets, and/or people are usually pre-defined and generally have a hierarchical organization. This can lead to many deficiencies. For example, any change in the relationships between spaces, assets, and/or people may require underlying databases and/or programs of the building management system to reconfigure the relationships with external user intervention. This does not allow the BMS to naturally and automatically adapt to changes in usage, systems, and/or operating conditions. Furthermore, this also requires specific programming paradigms to be inbuilt into the building management system to allow for these changes. The exception handling scenarios in building management system for any deviation from expected semantic interpretation of data around spaces, assets, and/or people can become cumbersome and complicated, often leading to downstream erroneous data transmission and information processing. The prevalent approach based on linear associations also do not allow for multi-dimensional dynamic and simultaneous analysis of building information around spaces, assets, and/or people for different types of analysis and simulation insights. The increasing usage of artificial intelligence influenced analytical techniques which are not based on heuristics require a more flexible organization of information.

SUMMARY

One implementation of the present disclosure is a building system for operating a building and managing building information, the building system including one or more memory devices configured to store instructions thereon, the instructions causing one or more processors to receive building data from one or more building data sources, generate relationships between entities based on the building data, wherein the relationships includes a pair of relationships between a first entity and a second entity of the entities representing two different types of relationships, wherein the pair of relationships includes a first relationship between the first entity and the second entity and a second relationship between the second entity and the first entity, and update a space graph by causing the space graph to store nodes representing the entities and edges between the nodes representing the relationships, wherein the space graph is a graph data structure.

In some embodiments, the instructions cause the one or more processors to ingest data values of the building data into the space graph, the data values associated with the entities and perform one or more operations with the space graph based on both the relationships of the entities and the ingested data values.

In some embodiments, the instructions cause the one or more processors to receive new building data from the one or more building data sources, generate, based on the new building data, a new relationship between the first entity and the second entity, and update the space graph with the new relationship by causing the space graph to store a new edge between a first node of the nodes representing the first entity and a second node of the nodes representing the second entity.

In some embodiments, the instructions cause the one or more processors to receive a query for information of the space graph from a requesting device, wherein the information is included by one of the nodes of the space graph, retrieve the information from the space graph by traversing at least some of the entities and at least some of the edges to identify the information without traversing other entities or other relationships of a data structure other than the space graph, and provide the information to the requesting device.

In some embodiments, the query includes an indication of the at least some of the nodes and the at least some of the entities to traverse to identify the information.

In some embodiments, the instructions cause the one or more processors to generate a control algorithm based on the space graph and operate one or more pieces of building equipment based on the control algorithm.

In some embodiments, the instructions cause the one or more processors to receive new building data from the one or more building data sources, generate a new relationship between the first entity and the second entity, update the space graph with the new relationship by causing the space graph to store a new edge between a first node of the nodes representing the first entity and a second node of the nodes representing the second entity, and update the control algorithm based on the new edge of the updated space graph and operate the one or more pieces of building equipment based on the updated control algorithm.

In some embodiments, the instructions cause the one or more processors to receive new building data from the one or more building data sources, generate a temporary relationship between the first entity and the second entity based on the new building data, cause the space graph to include the temporary relationship by storing a temporary edge between a first node of the nodes representing the first entity and a second node of the nodes representing the second entity, and perform one or more control operations based on the space graph including the temporary edge.

In some embodiments, the instructions cause the one or more processors to receive additional new building data from the one or more building data sources, the additional new building data based on the one or more control operations based on the space graph including the temporary edge, determine whether to generate a formal relationship to replace the temporary relationship based on the new building data, and update the space graph by causing the formal relationship to replace the temporary relationship of the space graph in response to a determination to generate the formal relationship to replace the temporary relationship by causing a formal edge to replace the temporary edge.

In some embodiments, the instructions cause the one or more processors to receive new building data from the one or more building data sources, identify, based on the building data, an indirect relationship between the first entity and the second entity of a space graph, the indirect relationship caused by a control algorithm of the space graph, and update the space graph with the indirect relationship by causing the space graph to include an indirect relationship edge between a first node of the nodes representing the first entity and a second node of the nodes representing the second entity.

In some embodiments, the instructions cause the one or more processors to update the control algorithm of the space graph based on the indirect relationship edge and operate one or more pieces of building equipment based on the updated control algorithm.

Another implementation of the present disclosure is a method for a building system. The method includes receiving, by a processing circuit, building data from one or more building data sources, generating, by the processing circuit, relationships between entities based on the building data, wherein the relationships includes a pair of relationships between a first entity and a second entity of the entities representing two different types of relationships, wherein the pair of relationships includes a first relationship between the first entity and the second entity and a second relationship between the second entity and the first entity, and updating, by the processing circuit, a space graph by causing the space graph to store nodes representing the entities and edges between the nodes representing the relationships, wherein the space graph is a graph data structure.

In some embodiments, the method includes ingesting, by the processing circuit, data values of the building data into the space graph, the data values associated with the entities and performing, by the processing circuit, one or more operations with the space graph based on both the relationships of the entities and the ingested data values.

In some embodiments, the method includes receiving, by the processing circuit, new building data from the one or more building data sources, generating, by the processing circuit, based on the new building data, a new relationship between the first entity and the second entity, and updating, by the processing circuit, the space graph with the new relationship by causing the space graph to store a new edge between a first node of the nodes representing the first entity and a second node of the nodes representing the second entity.

In some embodiments, the method includes receiving, by the processing circuit, a query for information of the space graph from a requesting device, wherein the information is included by one of the nodes of the space graph, retrieving, by the processing circuit, the information from the space graph by traversing at least some of the entities and at least some of the edges to identify the information without traversing other entities or other relationships of a data structure other than the space graph, and providing, by the processing circuit, the information to the requesting device.

In some embodiments, the query includes an indication of the at least some of the nodes and the at least some of the entities to traverse to identify the information.

In some embodiments, the method includes generating, by the processing circuit, a control algorithm based on the space graph and operate one or more pieces of building equipment based on the control algorithm.

In some embodiments, the method includes receiving, by the processing circuit, new building data from the one or more building data sources, generating, by the processing circuit, a new relationship between the first entity and the second entity, updating, by the processing circuit, the space graph with the new relationship by causing the space graph to store a new edge between a first node of the nodes representing the first entity and a second node of the nodes representing the second entity, and updating, by the processing circuit, the control algorithm based on the new edge of the updated space graph and operate the one or more pieces of building equipment based on the updated control algorithm.

In some embodiments, the method includes receiving, by the processing circuit, new building data from the one or more building data sources, generating, by the processing circuit, a temporary relationship between the first entity and the second entity based on the new building data, causing, by the processing circuit, the space graph to include the temporary relationship by storing a temporary edge between a first node of the nodes representing the first entity and a second node of the nodes representing the second entity, and performing, by the processing circuit, one or more control operations based on the space graph including the temporary edge.

In some embodiments, the method includes receiving, by the processing circuit, additional new building data from the one or more building data sources, the additional new building data based on the one or more control operations based on the space graph including the temporary edge, determining, by the processing circuit, whether to generate a formal relationship to replace the temporary relationship based on the new building data, and updating, by the processing circuit, the space graph by causing the formal relationship to replace the temporary relationship of the space graph in response to a determination to generate the formal relationship to replace the temporary relationship by causing a formal edge to replace the temporary edge.

In some embodiments, the method includes receiving, by the processing circuit, new building data from the one or more building data sources; identifying, by the processing circuit, based on the building data, an indirect relationship between the first entity and the second entity of a space graph, the indirect relationship caused by a control algorithm of the space graph; and updating, by the processing circuit, the space graph with the indirect relationship by causing the space graph to include an indirect relationship edge between a first node of the nodes representing the first entity and a second node of the nodes representing the second entity.

In some embodiments, the method includes updating, by the processing circuit, the control algorithm of the space graph based on the indirect relationship edge and operating, by the processing circuit, one or more pieces of building equipment based on the updated control algorithm.

Another implementation of the present disclosure is a building management system for operating a building and managing building information, the building management system including one or more memory devices configured to store instructions thereon one or more processors. The one or more processors are configured to execute the instructions to receive building data from one or more building data sources, generate relationships between entities based on the building data, wherein the relationships includes a pair of relationships between a first entity and a second entity of the entities representing two different types of relationships, wherein the pair of relationships includes a first relationship between the first entity and the second entity and a second relationship between the second entity and the first entity, update a space graph by causing the space graph to store nodes representing the entities and edges between the nodes representing the relationships, wherein the space graph is a graph data structure, ingest data values of the building data into the space graph, the data values associated with the entities, and perform one or more operations with the space graph based on both the relationships of the entities and the ingested data values.

In some embodiments, the one or more processors are configured to execute the instructions to receive new building data from the one or more building data sources, generate, based on the new building data, a new relationship between the first entity and the second entity, and update the space graph with the new relationship by causing the space graph to store a new edge between a first node of the nodes representing the first entity and a second node of the nodes representing the second entity.

In some embodiments, the one or more processors are configured to execute the instructions to receive a query for information of the space graph from a requesting device, wherein the information is included by one of the nodes of the space graph, retrieve the information from the space graph by traversing at least some of the entities and at least some of the edges to identify the information without traversing other entities or other relationships of a data structure other than the space graph, and provide the information to the requesting device.

In some embodiments, the query includes an indication of the at least some of the nodes and the at least some of the entities to traverse to identify the information.

In some embodiments, the one or more processors are configured to execute the instructions to generate a control algorithm based on the space graph and operate one or more pieces of building equipment based on the control algorithm.

In some embodiments, the one or more processors are configured to execute the instructions to receive new building data from the one or more building data sources, generate a new relationship between the first entity and the second entity, update the space graph with the new relationship by causing the space graph to store a new edge between a first node of the nodes representing the first entity and a second node of the nodes representing the second entity, and update the control algorithm based on the new edge of the updated space graph and operate the one or more pieces of building equipment based on the updated control algorithm.

Another implementation of the present disclosure is an information management system including a processing circuit configured to receive building data from one or more building data sources, generate a relationships between entities based on the building data, wherein the relationships includes a pair of relationships between a first entity and a second entity of the entities representing two different types of relationships, wherein the pair of relationships includes a first relationship between the first entity and the second entity and a second relationship between the second entity and the first entity, and update a space graph by causing the space graph to store nodes representing the entities and edges between the nodes representing the relationships, wherein the space graph is a graph data structure.

In some embodiments, processing circuit is configured to ingest data values of the building data into the space graph, the data values associated with the entities and perform one or more operations with the space graph based on both the relationships of the entities and the ingested data values.

Space Graph with Multiple Relationships Between Entities

Another implementation of the present disclosure is a building system for operating a building and managing building information, the building system including one or more memory devices configured to store instructions thereon, the instructions causing one or more processors to receive building data from one or more building data sources, generate relationships between entities based on the building data, wherein the relationships includes a pair of relationships between a first entity and a second entity of the entities representing two different types of relationships, wherein the pair of relationships includes a first relationship between the first entity and the second entity and a second relationship between the second entity and the first entity, and update a space graph by causing the space graph to store nodes representing the entities and edges between the nodes representing the relationships, wherein the space graph is a graph data structure.

In some embodiments, the first relationship indicates that the first entity has a location within the second entity. In some embodiments, wherein the second relationship indicates that the second entity contains the first entity.

In some embodiments, the first relationship indicates a location of the first entity relative to the second entity. In some embodiments, wherein the second relationship indicates a location of the second entity relative to the first entity.

In some embodiments, the first relationship indicates that the first entity controls an environmental condition for the second entity. In some embodiments, wherein the second relationship indicates that the second entity contains the first entity.

In some embodiments, the first entity is an agent configured to perform artificial intelligence to operate the building. In some embodiments, the first relationship indicates that the agent controls the second entity. In some embodiments, the second relationship indicates that the second entity is assigned to the agent.

In some embodiments, the first entity is a data point, wherein the second entity is a device controlled based on the data point. In some embodiments, wherein the first relationship indicates that the data point controls the device. In some embodiments, the second relationship indicates that the device is operated based on the data point.

In some embodiments, the entities are each one of a space, a device, a virtual point, or an agent configured to perform artificial intelligence.

In some embodiments, the instructions cause the one or more processors to receive a query for information of the space graph from a requesting device, wherein the information is included by one of the nodes of the space graph, retrieve the information from the space graph by traversing at least some of the entities and at least some of the edges to identify the information without traversing other entities or other relationships of a data structure other than the space graph, and provide the information to the requesting device.

In some embodiments, the query includes an indication of the at least some of the nodes and the at least some of the entities to traverse to identify the information.

Another implementation of the present disclosure is a method for operating a building, the method including receiving, by a processing circuit, building data from one or more building data sources, generating, by the processing circuit, relationships between entities based on the building data, wherein the relationships includes a pair of relationships between a first entity and a second entity of the entities representing two different types of relationships, wherein the pair of relationships includes a first relationship between the first entity and the second entity and a second relationship between the second entity and the first entity, and updating, by the processing circuit, a space graph by causing the space graph to store nodes representing the entities and edges between the nodes representing the relationships, wherein the space graph is a graph data structure.

In some embodiments, the first relationship indicates that the first entity has a location within the second entity. In some embodiments, the second relationship indicates that the second entity contains the first entity.

In some embodiments, the first relationship indicates a location of the first entity relative to the second entity. In some embodiments, the second relationship indicates a location of the second entity relative to the first entity.

In some embodiments, the first relationship indicates that the first entity controls an environmental condition for the second entity. In some embodiments, the second relationship indicates that the second entity contains the first entity.

In some embodiments, the first entity is an agent configured to perform artificial intelligence to operate the building. In some embodiments, the first relationship indicates that the agent controls the second entity. In some embodiments, wherein the second relationship indicates that the second entity is assigned to the agent.

In some embodiments, the first entity is a data point. In some embodiments, wherein the second entity is a device controlled based on the data point. In some embodiments, the first relationship indicates that the data point controls the device. In some embodiments, the second relationship indicates that the device is operated based on the data point.

In some embodiments, the entities are each one of a space, a device, a virtual point, or an agent configured to perform artificial intelligence.

In some embodiments, the instructions cause the one or more processors to receive a query for information of the space graph from a requesting device, wherein the information is included by one of the nodes of the space graph, retrieve the information from the space graph by traversing at least some of the entities and at least some of the edges to identify the information without traversing other entities or other relationships of a data structure other than the space graph, and provide the information to the requesting device.

In some embodiments, the query includes an indication of the at least some of the nodes and the at least some of the entities to traverse to identify the information.

Another implementation of the present disclosure is a building management system for operating a building and managing building information, the building management system including one or more memory devices configured to store instructions thereon and one or more processors configured to execute the instructions to receive building data from one or more building data sources, generate relationships between entities based on the building data, wherein the relationships includes a pair of relationships between a first entity and a second entity of the entities representing two different types of relationships, wherein the pair of relationships includes a first relationship between the first entity and the second entity and a second relationship between the second entity and the first entity, and update a space graph by causing the space graph to store nodes representing the entities and edges between the nodes representing the relationships, wherein the space graph is a graph data structure.

In some embodiments, the one or more processors are configured to execute the instructions to receive a query for information of the space graph from a requesting device, wherein the information is included by one of the nodes of the space graph, retrieve the information from the space graph by traversing at least some of the entities and at least some of the edges to identify the information without traversing other entities or other relationships of a data structure other than the space graph, and provide the information to the requesting device.

Space Graph with Entity Relationships and Ingested Data

Another implementation of the present disclosure is a building system for operating a building and managing building information, the building system including one or more memory devices configured to store instructions thereon, the instructions causing one or more processors to receive building data from one or more building data sources, generate a space graph based on the building data, wherein the space graph is a graph data structure including nodes representing entities and a plurality edges between the entities representing relationships between the entities, ingest data values of the building data into the space graph, the data values associated with the entities, and perform one or more operations with the space graph based on both the relationships of the entities and the ingested data values.

In some embodiments, the entities include one or more agents, wherein the one or more agents are configured to generate one or more control decisions by querying the space graph for information, wherein the information includes at least some of the entities, at least some of the relationships, and at least some of the ingested data values and cause one or more pieces of equipment to operate based on the one or more control decisions.

In some embodiments, the space graph is a digital twin of the building, wherein the entities represent at least one of spaces, people, or devices associated with the building.

In some embodiments, the instructions cause the one or more processors to receive a query for information of the space graph from a requesting device, wherein the information is included by one of the nodes of the space graph, retrieve the information from the space graph by traversing at least some of the entities and at least some of the edges to identify the information without traversing other entities or other relationships of a data structure other than the space graph, and provide the information to the requesting device.

In some embodiments, the query includes an indication of the at least some of the nodes and the at least some of the entities to traverse to identify the information.

In some embodiments, the information is at least some of the data values ingested into the space graph.

In some embodiments, the instructions cause the one or more processors to receive a request input from a user device in a natural language, generate, by a chatbot system, the query by performing natural language processing on the request input, and provide the information to the user device.

Another implementation of the present disclosure is a method for operating a building, the method including receiving, by a processing circuit, building data from one or more building data sources, generating, by the processing circuit, a space graph based on the building data, wherein the space graph is a graph data structure including nodes representing entities and a plurality edges between the entities representing relationships between the entities, ingesting, by the processing circuit, data values of the building data into the space graph, the data values associated with the entities, and performing, by the processing circuit, one or more operations with the space graph based on both the relationships of the entities and the ingested data values.

In some embodiments, the entities include one or more agents, wherein the agents comprise artificial intelligence. In some embodiments, the method includes generating, by the processing circuit via the one or more agents, one or more control decisions by querying the space graph for information, wherein the information includes at least some of the entities, at least some of the relationships, and at least some of the ingested data values and causing, by the processing circuit, one or more pieces of equipment to operate based on the one or more control decisions.

In some embodiments, the space graph is a digital twin of the building, wherein the entities represent at least one of spaces, people, or devices associated with the building.

In some embodiments, the instructions cause the one or more processors to receiving, by the processing circuit, a query for information of the space graph from a requesting device, wherein the information is included by one of the nodes of the space graph, retrieving, by the processing circuit, the information from the space graph by traversing at least some of the entities and at least some of the edges to identify the information without traversing other entities or other relationships of a data structure other than the space graph, and providing, by the processing circuit, the information to the requesting device.

In some embodiments, the query includes an indication of the at least some of the nodes and the at least some of the entities to traverse to identify the information.

In some embodiments, the information is at least some of the data values ingested into the space graph.

In some embodiments, the instructions cause the one or more processors to receiving, by the processing circuit, a request input from a user device in a natural language, generating, by the processing circuit via a chatbot system, the query by performing natural language processing on the request input, and providing, by the processing circuit, the information to the user device.

Another implementation of the present disclosure is a building management system for operating a building and managing building information including a processing circuit configured to receive building data from one or more building data sources, generate a space graph based on the building data, wherein the space graph is a graph data structure including nodes representing entities and a plurality edges between the entities representing relationships between the entities, ingest data values of the building data into the space graph, the data values associated with the entities, generate one or more control decisions by querying the space graph for information, wherein the information includes at least some of the entities, at least some of the relationships, and at least some of the ingested data values, and cause one or more pieces of equipment to operate based on the one or more control decisions.

In some embodiments, the processing circuit is configured to generate the one or more control decisions via an agent of the space graph, wherein the agent is one node of the nodes.

In some embodiments, the space graph is a digital twin of the building, wherein the entities represent at least one of spaces, people, and devices associated with the building.

In some embodiments, the instructions cause the one or more processors to receive a query for information of the space graph from a requesting device, wherein the information is included by one of the nodes of the space graph, retrieve the information from the space graph by traversing at least some of the entities and at least some of the edges to identify the information without traversing other entities or other relationships of a data structure other than the space graph, and provide the information to the requesting device.

In some embodiments, the query includes an indication of the at least some of the nodes and the at least some of the entities to traverse to identify the information.

In some embodiments, the information is at least some of the data values ingested into the space graph.

Dynamic Space Graph with New Entity Relationship Updates

Another implementation of the present disclosure is a building system for operating a building and managing building information, the building system including one or more memory devices configured to store instructions thereon, the instructions causing one or more processors to generate a space graph based on building data, wherein the space graph is a graph data structure including nodes representing entities, edges between the nodes representing relationships between the entities, and data values of the building data associated with the entities, receive new building data from one or more building data sources, generate, based on the new building data, a new relationship between a first entity of the entities and a second entity of the entities, and update the space graph with the new relationship by causing the space graph to store a new edge between a first node of the nodes representing the first entity and a second node of the nodes representing the second entity.

In some embodiments, the instructions cause the one or more processors to receive a query for information of the space graph from a requesting device, wherein the information is included by one of the nodes of the space graph, retrieve the information from the space graph by traversing at least some of the entities and at least some of the edges to identify the information without traversing other entities or other relationships of a data structure other than the space graph, and provide the information to the requesting device.

In some embodiments, the query includes an indication of the at least some of the nodes and the at least some of the entities to traverse to identify the information.

In some embodiments, the instructions cause the one or more processors to identify, based on the new building data, one or more new entities and update the space graph with the one or more new entities by causing the space graph to store one or more new nodes.

In some embodiments, the instructions cause the one or more processors to identify, based on the new building data, one or more additional new relationships between the one or more new entities and update the space graph to store one or more additional new edges between the one or more new nodes.

In some embodiments, the instructions cause the one or more processors to identify, based on the new building data, one or more additional new relationships between the one or more new entities and the entities and update the space graph to store one or more additional new edges between the one or more new nodes and the nodes.

In some embodiments, the instructions cause the one or more processors to generate, based on the new building data, the new relationship between the first entity of the entities and the second entity of the entities by determining whether events are triggered by analyzing rules with the new building data, wherein each of the events is associated with one of the rules and determining, based on a pattern of the events that are triggered, the new relationship.

In some embodiments, determining, based on the pattern of the events that are triggered, the new relationship includes determining whether a number of the events that are triggered is greater than a predefined amount.

In some embodiments, each of the rules is a conditional rule based on whether operational data of the entities exists and that at least some of the relationships exist, wherein the new building data is the operational data.

Another implementation of the present disclosure is a method for a building system of a building. The method includes generating, by a processing circuit, a space graph based on building data, wherein the space graph is a graph data structure including nodes representing entities, edges between the nodes representing relationships between the entities, and data values of the building data associated with the entities, receiving, by the processing circuit, new building data from one or more building data sources, generating, by the processing circuit, based on the new building data, a new relationship between a first entity of the entities and a second entity of the entities, and updating, by the processing circuit, the space graph with the new relationship by causing the space graph to store a new edge between a first node of the nodes representing the first entity and a second node of the nodes representing the second entity.

In some embodiments, the method includes receiving, by the processing circuit, a query for information of the space graph from a requesting device, wherein the information is included by one of the nodes of the space graph, retrieving, by the processing circuit, the information from the space graph by traversing at least some of the entities and at least some of the edges to identify the information without traversing other entities or other relationships of a data structure other than the space graph, and providing, by the processing circuit, the information to the requesting device.

In some embodiments, the query includes an indication of the at least some of the nodes and the at least some of the entities to traverse to identify the information.

In some embodiments, the method includes identifying, by the processing circuit, based on the new building data, one or more new entities and updating, by the processing circuit, the space graph with the one or more new entities by causing the space graph to store one or more new nodes.

In some embodiments, the method includes identifying, by the processing circuit, based on the new building data, one or more additional new relationships between the one or more new entities and updating, by the processing circuit, the space graph to store one or more additional new edges between the one or more new nodes.

In some embodiments, the method includes identifying, by the processing circuit, based on the new building data, one or more additional new relationships between the one or more new entities and the entities and updating, by the processing circuit, the space graph to store one or more additional new edges between the one or more new nodes and the nodes.

In some embodiments, generating, by the processing circuit, based on the new building data, the new relationship between the first entity of the entities and the second entity of the entities includes determining whether events are triggered by analyzing rules with the new building data, wherein each of the events is associated with one of the rules and determining, based on a pattern of the events that are triggered, the new relationship.

In some embodiments, determining, based on the pattern of the events that are triggered, the new relationship includes determining whether a number of the events that are triggered is greater than a predefined amount.

In some embodiments, each of the rules is a conditional rule based on whether operational data of the entities exists and that at least some of the relationships exist, wherein the new building data is the operational data.

Another implementation of the present disclosure is a building management system for operating a building, the building management system including a processing circuit configured to generate a space graph based on building data, wherein the space graph is a graph data structure including nodes representing entities, edges between the nodes representing relationships between the entities, and data values of the building data associated with the entities, receive new building data from one or more building data sources, generate, based on the new building data, a new relationship between a first entity of the entities and a second entity of the entities, and update the space graph with the new relationship by causing the space graph to store a new edge between a first node of the nodes representing the first entity and a second node of the nodes representing the second entity.

In some embodiments, the processing circuit is configured to generate, based on the new building data, the new relationship between the first entity of the entities and the second entity of the entities includes determining whether events are triggered by analyzing rules with the new building data, wherein each of the events is associated with one of the rules and determining, based on a pattern of the events that are triggered, the new relationship.

Dynamic Building Control Based On Dynamic Space Graph

Another implementation of the present disclosure is a building system for operating a building and managing building information, the building system including one or more memory devices configured to store instructions thereon, the instructions causing one or more processors to generate a space graph based on building data, wherein the space graph is a graph data structure including node representing entities, edges between the nodes representing relationships between the entities, and data values of the building data associated with the entities, generate a control algorithm based on the space graph and operate one or more pieces of building equipment based on the control algorithm, receive new building data from one or more building data sources, generate one or more new relationships between a first entity of the entities and a second entity of the entities, update the space graph with the new relationship by causing the space graph to store a new edge between a first node of the nodes representing the first entity and a second node of the nodes representing the second entity, and update the control algorithm based on the new edge of the updated space graph and operate the one or more pieces of building equipment based on the updated control algorithm.

In some embodiments, the entities include an agent, wherein the processing circuit is configured to update the control algorithm via the agent by querying, via the agent, the space graph for information, wherein the information includes at least some of the entities, at least some of the relationships, and the new edge.

In some embodiments, querying, via the agent, is performed at a predefined time interval.

In some embodiments, the instructions cause the one or more processors to receive a query for information of the space graph from a requesting device, wherein the information is included by one of the nodes of the space graph, retrieve the information from the space graph by traversing at least some of the entities and at least some of the edges to identify the information without traversing other entities or other relationships of a data structure other than the space graph, and provide the information to the requesting device.

In some embodiments, the query includes an indication of the at least some of the nodes and the at least some of the entities to traverse to identify the information.

In some embodiments, the instructions cause the one or more processors to identify, based on the new building data, one or more new entities and update the space graph with the one or more new entities by causing the space graph to store one or more new nodes.

In some embodiments, the instructions cause the one or more processors to update the control algorithm based on the new edge of the updated space graph further based on the one or more new entities.

In some embodiments, the instructions cause the one or more processors to generate, based on the new building data, the new relationship between the first entity of the entities and the second entity of the entities by determining whether events are triggered by analyzing rules with the new building data, wherein each of the events is associated with one of the rules and determining, based on a pattern of the events that are triggered, the new relationship.

In some embodiments, determining, based on the pattern of the events that are triggered, the new relationship includes determining whether a number of the events that are triggered is greater than a predefined amount.

In some embodiments, each of the rules is a conditional rule based on whether operational data of the entities exists and that at least some of the relationships exist, wherein the new building data is the operational data.

Another implementation of the present disclosure is a method for a building system of a building, the method including generating, by a processing circuit, a space graph based on building data, wherein the space graph is a graph data structure including node representing entities, edges between the nodes representing relationships between the entities, and data values of the building data associated with the entities, generating, by the processing circuit, a control algorithm based on the space graph and operate one or more pieces of building equipment based on the control algorithm, receiving, by the processing circuit, new building data from one or more building data sources, generating, by the processing circuit, one or more new relationships between a first entity of the entities and a second entity of the entities, updating, by the processing circuit, the space graph with the new relationship by causing the space graph to store a new edge between a first node of the nodes representing the first entity and a second node of the nodes representing the second entity, and updating, by the processing circuit, the control algorithm based on the new edge of the updated space graph and operating, by the processing circuit, the one or more pieces of building equipment based on the updated control algorithm.

In some embodiments, the entities include an agent, wherein updating, by the processing circuit, the control algorithm is performed via the agent by querying, via the agent, the space graph for information, wherein the information includes at least some of the entities, at least some of the relationships, and the new edge.

In some embodiments, querying, via the agent, is performed at a predefined time interval.

In some embodiments, the method includes receiving, by the processing circuit, a query for information of the space graph from a requesting device, wherein the information is included by one of the nodes of the space graph, retrieving, by the processing circuit, the information from the space graph by traversing at least some of the entities and at least some of the edges to identify the information without traversing other entities or other relationships of a data structure other than the space graph, and providing, by the processing circuit, the information to the requesting device.

In some embodiments, the query includes an indication of the at least some of the nodes and the at least some of the entities to traverse to identify the information.

In some embodiments the method includes identifying, by the processing circuit, based on the new building data, one or more new entities and updating, by the processing circuit, the space graph with the one or more new entities by causing the space graph to store one or more new nodes.

In some embodiments, updating, by the processing circuit the control algorithm based on the new edge of the updated space graph further based on the one or more new entities.

In some embodiments, generating, by the processing circuit, based on the new building data, the new relationship between the first entity of the entities and the second entity of the entities by determining whether events are triggered by analyzing rules with the new building data, wherein each of the events is associated with one of the rules and determining, based on a pattern of the events that are triggered, the new relationship.

In some embodiments, determining, based on the pattern of the events that are triggered, the new relationship includes determining whether a number of the events that are triggered is greater than a predefined amount.

Another implementation of the present disclosure is a building management system for a building including a processing circuit configured to generate a space graph based on building data, wherein the space graph is a graph data structure including node representing entities, edges between the nodes representing relationships between the entities, and data values of the building data associated with the entities, generate a control algorithm based on the space graph and operate one or more pieces of building equipment based on the control algorithm, receive new building data from one or more building data sources, generate one or more new relationships between a first entity of the entities and a second entity of the entities, update the space graph with the new relationship by causing the space graph to store a new edge between a first node of the nodes representing the first entity and a second node of the nodes representing the second entity, and update the control algorithm based on the new edge of the updated space graph and operate the one or more pieces of building equipment based on the updated control algorithm.

Dynamic Space Graph with Temporary Relationships

Another implementation of the present disclosure is a building system for operating a building and managing building information, the building system including one or more memory devices configured to store instructions thereon, the instructions causing one or more processors to receive building data from one or more building data sources, generate a temporary relationship between a first entity and a second entity of a space graph, wherein the space graph is a graph data structure including nodes representing entities, edges between the nodes representing relationships between the entities, and data values of the building data associated with the entities, cause the space graph to include the temporary relationship by storing a temporary edge between a first node of the nodes representing the first entity and a second node of the nodes representing the second entity, perform one or more control operations based on the space graph including the temporary edge, receive new building data from the one or more building data sources, determine whether to generate a permanent relationship to replace the temporary relationship based on the new building data, and update the space graph by causing the permanent relationship to replace the temporary relationship of the space graph in response to a determination to generate the permanent relationship to replace the temporary relationship by causing a permanent edge to replace the temporary edge.

In some embodiments, the instructions cause the one or more processors to determine whether to generate a permanent relationship to replace the temporary relationship include determining a confidence level for the permanent relationship and replacing the temporary relationship with the permanent relationship in response to a determination that the confidence level is greater than a predefined amount.

In some embodiments, the temporary relationship is a single relationship, wherein the permanent relationship includes a first relationship between the first entity and the second entity and a second relationship between the second entity and the first entity.

In some embodiments, the instructions cause the one or more processors to receive a query for information of the space graph from a requesting device, wherein the information is included by one of the nodes of the space graph, retrieve the information from the space graph by traversing at least some of the entities and at least some of the edges to identify the information without traversing other entities or other relationships of a data structure other than the space graph, and provide the information to the requesting device.

In some embodiments, the query includes an indication of the at least some of the nodes and the at least some of the entities to traverse to identify the information.

In some embodiments, the instructions cause the one or more processors to generate, based on the new building data, the temporary relationship between the first entity of the entities and the second entity of the entities by determining whether events are triggered by analyzing rules with the new building data, wherein each of the events is associated with one of the rules and determining, based on a pattern of the events that are triggered, the new relationship.

In some embodiments, determining, based on the pattern of the events that are triggered, the new relationship includes determining whether a number of the events that are triggered is greater than a predefined amount.

In some embodiments, each of the rules is a conditional rule based on whether operational data of the entities exists and that at least some of the relationships exist, wherein the new building data is the operational data.

Another implementation of the present disclosure is a method for a building system of a building, the method including receiving, by a processing circuit, building data from one or more building data sources, generating, by the processing circuit, a temporary relationship between a first entity and a second entity of a space graph, wherein the space graph is a graph data structure including nodes representing entities, edges between the nodes representing relationships between the entities, and data values of the building data associated with the entities, causing, by the processing circuit, the space graph to include the temporary relationship by storing a temporary edge between a first node of the nodes representing the first entity and a second node of the nodes representing the second entity, performing, by the processing circuit, one or more control operations based on the space graph including the temporary edge, receiving, by the processing circuit, new building data from the one or more building data sources, determining, by the processing circuit, whether to generate a permanent relationship to replace the temporary relationship based on the new building data, and updating, by the processing circuit the space graph by causing the permanent relationship to replace the temporary relationship of the space graph in response to a determination to generate the permanent relationship to replace the temporary relationship by causing a permanent edge to replace the temporary edge.

In some embodiments, determining, by the processing circuit, whether to generate a permanent relationship to replace the temporary relationship includes determining a confidence level for the permanent relationship and replacing the temporary relationship with the permanent relationship in response to a determination that the confidence level is greater than a predefined amount.

In some embodiments, the temporary relationship is a single relationship, wherein the permanent relationship includes a first relationship between the first entity and the second entity and a second relationship between the second entity and the first entity.

In some embodiments, the method includes receiving, by the processing circuit, a query for information of the space graph from a requesting device, wherein the information is included by one of the nodes of the space graph, retrieving, by the processing circuit, the information from the space graph by traversing at least some of the entities and at least some of the edges to identify the information without traversing other entities or other relationships of a data structure other than the space graph, and providing, by the processing circuit, the information to the requesting device.

In some embodiments, the query includes an indication of the at least some of the nodes and the at least some of the entities to traverse to identify the information.

In some embodiments, generating, by the processing circuit, based on the new building data, the temporary relationship between the first entity of the entities and the second entity of the entities includes determining whether events are triggered by analyzing rules with the new building data, wherein each of the events is associated with one of the rules and determining, based on a pattern of the events that are triggered, the new relationship.

In some embodiments, determining, based on the pattern of the events that are triggered, the new relationship includes determining whether a number of the events that are triggered is greater than a predefined amount.

In some embodiments, each of the rules is a conditional rule based on whether operational data of the entities exists and that at least some of the relationships exist, wherein the new building data is the operational data.

Another implementation of the present disclosure is a building management system for operating a building and managing building information, the building management system including a processing circuit configured to receive building data from one or more building data sources, generate a temporary relationship between a first entity and a second entity of a space graph, wherein the space graph is a graph data structure including nodes representing entities, edges between the nodes representing relationships between the entities, and data values of the building data associated with the entities, cause the space graph to include the temporary relationship by storing a temporary edge between a first node of the nodes representing the first entity and a second node of the nodes representing the second entity, perform one or more control operations based on the space graph including the temporary edge, receive new building data from the one or more building data sources, determine whether to generate a permanent relationship to replace the temporary relationship based on the new building data, and update the space graph by causing the permanent relationship to replace the temporary relationship of the space graph in response to a determination to generate the permanent relationship to replace the temporary relationship by causing a permanent edge to replace the temporary edge.

In some embodiments, the processing circuit is configured to determine whether to generate a permanent relationship to replace the temporary relationship includes determining a confidence level for the permanent relationship and replacing the temporary relationship with the permanent relationship in response to a determination that the confidence level is greater than a predefined amount.

In some embodiments, the temporary relationship is a single relationship, wherein the permanent relationship includes a first relationship between the first entity and the second entity and a second relationship between the second entity and the first entity.

In some embodiments, the processing circuit is configured to receive a query for information of the space graph from a requesting device, wherein the information is included by one of the nodes of the space graph, retrieve the information from the space graph by traversing at least some of the entities and at least some of the edges to identify the information without traversing other entities or other relationships of a data structure other than the space graph, and provide the information to the requesting device.

Dynamic Space Graph with Indirect Impact Relationships

Another implementation of the present disclosure is a building system for operating a building and managing building information, the building system including one or more memory devices configured to store instructions thereon, the instructions causing one or more processors to receive building data from one or more building data sources, identify, based on the building data, an indirect relationship between a first entity and a second entity of a space graph, the indirect relationship caused by a control algorithm of the space graph, wherein the space graph is a graph data structure including nodes representing entities, edges between the nodes representing relationships between the entities, and data values of the building data associated with the entities, update the space graph with the indirect relationship by causing the space graph to include an indirect relationship edge between a first node of the nodes representing the first entity and a second node of the nodes representing the second entity, update the control algorithm of the space graph based on the indirect relationship edge, and operate one or more pieces of building equipment based on the updated control algorithm.

In some embodiments, one of the entities is an agent configured to perform artificial intelligence to update the control algorithm of the space graph based on the indirect relationship edge.

In some embodiments, the building data environmental condition data indicating an environmental condition of the second entity, wherein the instructions cause the one or more processors to identify the indirect relationship between the first entity and the second entity based on changes in the environmental condition and control commands associated of the first entity.

In some embodiments, the indirect relationship indicates that performing one or more operations by the first entity indirectly affects an environmental condition of the second entity.

In some embodiments, wherein the entities further includes a first zone, wherein the second entity is a second zone, wherein the first entity is a piece of building equipment configured to control an environmental condition of the first zone, wherein the piece of building equipment controlling the environmental condition of the first zone indirectly affects the environmental condition of the second zone.

In some embodiments, the instructions cause the one or more processors to receive a query for information of the space graph from a requesting device, wherein the information is included by one of the nodes of the space graph, retrieve the information from the space graph by traversing at least some of the entities and at least some of the edges to identify the information without traversing other entities or other relationships of a data structure other than the space graph, and provide the information to the requesting device.

In some embodiments, the query includes an indication of the at least some of the nodes and the at least some of the entities to traverse to identify the information.

Another implementation of the present disclosure is a method a building system of a building, the method includes receiving, by a processing circuit, building data from one or more building data sources, identifying, by the processing circuit, based on the building data, an indirect relationship between a first entity and a second entity of a space graph, the indirect relationship caused by a control algorithm of the space graph, wherein the space graph is a graph data structure including nodes representing entities, edges between the nodes representing relationships between the entities, and data values of the building data associated with the entities, updating, by the processing circuit, the space graph with the indirect relationship by causing the space graph to include an indirect relationship edge between a first node of the nodes representing the first entity and a second node of the nodes representing the second entity, updating, by the processing circuit, the control algorithm of the space graph based on the indirect relationship edge, and operating, by the processing circuit, one or more pieces of building equipment based on the updated control algorithm.

In some embodiments, one of the entities is an agent configured to perform artificial intelligence to update the control algorithm of the space graph based on the indirect relationship edge.

In some embodiments, the building data includes environmental condition data indicating an environmental condition of the second entity, wherein the instructions cause the one or more processors to identify the indirect relationship between the first entity and the second entity based on changes in the environmental condition and control commands associated of the first entity.

In some embodiments, the indirect relationship indicates that performing one or more operations by the first entity indirectly affects an environmental condition of the second entity.

In some embodiments, the entities further includes a first zone, wherein the second entity is a second zone, wherein the first entity is a piece of building equipment configured to control an environmental condition of the first zone, wherein the piece of building equipment controlling the environmental condition of the first zone indirectly affects the environmental condition of the second zone.

In some embodiments, the method includes receiving, by the processing circuit, a query for information of the space graph from a requesting device, wherein the information is included by one of the nodes of the space graph, retrieving, by the processing circuit, the information from the space graph by traversing at least some of the entities and at least some of the edges to identify the information without traversing other entities or other relationships of a data structure other than the space graph, and providing, by the processing circuit, the information to the requesting device.

In some embodiments, the query includes an indication of the at least some of the nodes and the at least some of the entities to traverse to identify the information.

Another implementation of the present disclosure is a building management system for operating a building and managing building information, the building management system including a processing circuit configured to receive building data from one or more building data sources, identify, based on the building data, an indirect relationship between a first entity and a second entity of a space graph, the indirect relationship caused by a control algorithm of the space graph, wherein the space graph is a graph data structure including nodes representing entities, edges between the nodes representing relationships between the entities, and data values of the building data associated with the entities, update the space graph with the indirect relationship by causing the space graph to include an indirect relationship edge between a first node of the nodes representing the first entity and a second node of the nodes representing the second entity, update the control algorithm of the space graph based on the indirect relationship edge, and operate one or more pieces of building equipment based on the updated control algorithm.

In some embodiments, one of the entities is an agent configured to perform artificial intelligence to update the control algorithm of the space graph based on the indirect relationship edge.

In some embodiments, the building data includes environmental condition data indicating an environmental condition of the second entity, wherein the instructions cause the one or more processors to identify the indirect relationship between the first entity and the second entity based on changes in the environmental condition and control commands associated of the first entity.

In some embodiments, the indirect relationship indicates that performing one or more operations by the first entity indirectly affects an environmental condition of the second entity.

In some embodiments, the entities further includes a first zone, wherein the second entity is a second zone, wherein the first entity is a piece of building equipment configured to control an environmental condition of the first zone, wherein the piece of building equipment controlling the environmental condition of the first zone indirectly affects the environmental condition of the second zone.

In some embodiments, the instructions cause the one or more processors to receive a query for information of the space graph from a requesting device, wherein the information is included by one of the nodes of the space graph, retrieve the information from the space graph by traversing at least some of the entities and at least some of the edges to identify the information without traversing other entities or other relationships of a data structure other than the space graph, and provide the information to the requesting device.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Figure 1:
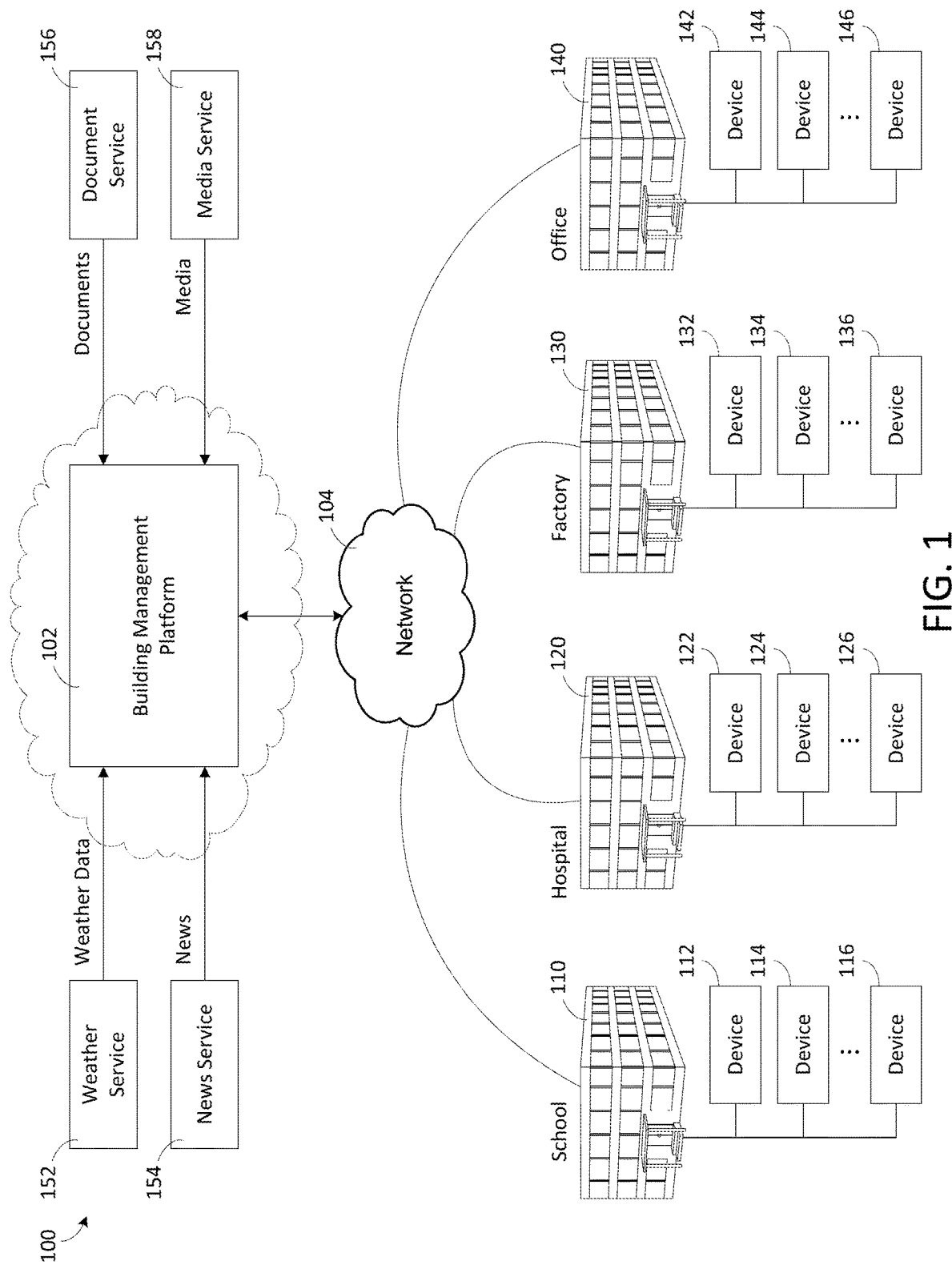
FIG. 1 is a block diagram of a smart building environment, according to an exemplary embodiment.

Referring generally to the FIGURES, a building management system with space graphs is shown, according to various exemplary embodiments. The space graph can be a data structure allowing entities, relationships, and/or information to be stored for operating a building. The space graph can be a data structure including nodes and edges, the nodes representing particular entities and the edges between the nodes representing a relationship between the entities. Any number of nodes and edges can exist in the space graph along with ingested data for each node, e.g., collected data associated with an entity represented by the node. In this regard, the space graph can be a total representation, a digital twin, of an entire space since the space graph can represent the entities of the space, relationships between the entities, and data for the entities.

In some embodiments, there may be multiple relationships between entities of the space graph. For example, a first entity of a space graph can be linked to a second entity of a space graph with a first relationship while the second entity can be linked to the first entity with a different relationship. For example, a variable air volume and a thermostat could be related to each other, however, their relationships to each other are different. The thermostat can be configured to control the VAV while the VAV can be configured to receive commands from the thermostat. Both relationships, though different, can be captured in the space graph.

In some embodiments, the space graph includes agents. The agents can be particular nodes of the space graph. The agents can be artificial intelligence components configured to receive inputs, e.g., other information from the space graph, and/or generate changes or updates to the space graph based on the information. For example, a space graph could be a comfort agent configured to generate control schedules for a thermostat based on information of the space graph. In this regard, the comfort agent can be configured to receive information from the space graph relating to the thermostat, spaces controlled by the thermostat, and activities within the spaces, to generate a control schedule. The control schedule can be an entity of the space graph which implements operation of the thermostat and/or may be associated with a relationship between the agent and the control schedule and a relationship between the control schedule and the thermostat.

Furthermore, the space graph can be a dynamic data structure that adapts based on information collected from the space represented by the space graph and/or ingested into the space graph. For example, the building system can be configured to update the space graph to include new relationships and/or entities overtime such that as changes are made to the space represented by the space graph, the space graph adapts to the changes. In some cases, the building system is configured to add temporary relationships to the space graph. The temporary relationships may indicate a potential relationship between entities of the space graph.

Overtime, the building system can determine whether the temporary relationship should exist permanently in the space graph and can eventually replace the temporary relationship with a permanent relationship. Furthermore, the temporary relationship may not include a description of the relationship type but may be a placeholder indicating that some specific type of relationship exists between two entities. The permanent relationship that replaces the temporary relationship may include a description of the relationship derived from information of the space graph. For example, if the system adds a temporary relationship between a thermostat and a space, the temporary relationship indicating that the thermostat and the space are associated, the permanent relationship may indicate how the thermostat and the space are relation, e.g., that the thermostat controls temperature of the space.

Furthermore, the various agents can periodically scan the space graph overtime to update the control configurations they generate. For example, as new entities and/or new relationships are added to the space graphs, the agents can update their control configurations to account for relationships that are added or removed from the space graph, dynamically updating their control.

In some embodiments, the building management system can add impact relationships between entities of the space graph. The result of a particular control configuration generated by an agent for the space graph may have an indirect impact on another entity. The building management system can detect the impact relationship and add the relationship to the space graph to represent the impact which the control configuration has on the entity. For example, heating or cooling a particular zone may have an impact on the temperature of a neighboring zone. Therefore, a direct relationship may exist between heating or cooling equipment and the first zone while an impact relationship may exist between the heating or cooling equipment and the neighboring zone.

This application is related to U.S. patent application Ser. No. 15/723,624 filed Oct. 3, 2017, U.S. Provisional Patent Application No. 62/611,974 filed Dec. 29, 2017, U.S. Provisional Patent Application No. 62/612,228 filed Dec. 29, 2017, U.S. Provisional Patent Application No. 62/611,962 filed Dec. 29, 2017, U.S. Provisional Patent Application No. 62/627,615 filed Feb. 7, 2018, U.S. patent application Ser. No. 15/934,593 filed Mar. 23, 2018, U.S. patent application Ser. No. 16/008,885 filed Jun. 14, 2018, and U.S. patent application Ser. No. 16/036,685 filed Jul. 16, 2018. The entirety of each of these patent applications is incorporated by reference herein.

Hereinafter, example embodiments will be described in more detail with reference to the accompanying drawings. FIG. 1 is a block diagram of a smart building environment 100, according to some exemplary embodiments. Smart building environment 100 is shown to include a building management platform 102. Building management platform 102 can be configured to collect data from a variety of different data sources. For example, building management platform 102 is shown collecting data from buildings 110, 120, 130, and 140. For example, the buildings may include a school 110, a hospital 120, a factory 130, an office building 140, and/or the like. However, the present disclosure is not limited to the number or types of buildings 110, 120, 130, and 140 shown in FIG. 1. For example, in some embodiments, building management platform 102 may be configured to collect data from one or more buildings, and the one or more buildings may be the same type of building, or may include one or more different types of buildings than that shown in FIG. 1.

Building management platform 102 can be configured to collect data from a variety of devices 112-116, 122-126, 132-136, and 142-146, either directly (e.g., directly via network 104) or indirectly (e.g., via systems or applications in the buildings 110, 120, 130, 140). In some embodiments, devices 112-116, 122-126, 132-136, and 142-146 are internet of things (IoT) devices. IoT devices may include any of a variety of physical devices, sensors, actuators, electronics, vehicles, home appliances, and/or other items having network connectivity which enable IoT devices to communicate with building management platform 102. For example, IoT devices can include smart home hub devices, smart house devices, doorbell cameras, air quality sensors, smart switches, smart lights, smart appliances, garage door openers, smoke detectors, heart monitoring implants, biochip transponders, cameras streaming live feeds, automobiles with built-in sensors, DNA analysis devices, field operation devices, tracking devices for people/vehicles/equipment, networked sensors, wireless sensors, wearable sensors, environmental sensors, RFID gateways and readers, IoT gateway devices, robots and other robotic devices, GPS devices, smart watches, virtual/augmented reality devices, and/or other networked or networkable devices. While the devices described herein are generally referred to as IoT devices, it should be understood that, in various embodiments, the devices referenced in the present disclosure could be any type of devices capable of communicating data over an electronic network.

In some embodiments, IoT devices may include sensors or sensor systems. For example, IoT devices may include acoustic sensors, sound sensors, vibration sensors, automotive or transportation sensors, chemical sensors, electric current sensors, electric voltage sensors, magnetic sensors, radio sensors, environment sensors, weather sensors, moisture sensors, humidity sensors, flow sensors, fluid velocity sensors, ionizing radiation sensors, subatomic particle sensors, navigation instruments, position sensors, angle sensors, displacement sensors, distance sensors, speed sensors, acceleration sensors, optical sensors, light sensors, imaging devices, photon sensors, pressure sensors, force sensors, density sensors, level sensors, thermal sensors, heat sensors, temperature sensors, proximity sensors, presence sensors, and/or any other type of sensors or sensing systems.

Examples of acoustic, sound, or vibration sensors include geophones, hydrophones, lace sensors, guitar pickups, microphones, and seismometers. Examples of automotive or transportation sensors include air flow meters, air-fuel ratio (AFR) meters, blind spot monitors, crankshaft position sensors, defect detectors, engine coolant temperature sensors, Hall effect sensors, knock sensors, map sensors, mass flow sensors, oxygen sensors, parking sensors, radar guns, speedometers, speed sensors, throttle position sensors, tire-pressure monitoring sensors, torque sensors, transmission fluid temperature sensors, turbine speed sensors, variable reluctance sensors, vehicle speed sensors, water sensors, and wheel speed sensors.

Examples of chemical sensors include breathalyzers, carbon dioxide sensors, carbon monoxide detectors, catalytic bead sensors, chemical field-effect transistors, chemiresistors, electrochemical gas sensors, electronic noses, electrolyte-insulator-semiconductor sensors, fluorescent chloride sensors, holographic sensors, hydrocarbon dew point analyzers, hydrogen sensors, hydrogen sulfide sensors, infrared point sensors, ion-selective electrodes, nondispersive infrared sensors, microwave chemistry sensors, nitrogen oxide sensors, olfactometers, optodes, oxygen sensors, ozone monitors, pellistors, pH glass electrodes, potentiometric sensors, redox electrodes, smoke detectors, and zinc oxide nanorod sensors.

Examples of electromagnetic sensors include current sensors, Daly detectors, electroscopes, electron multipliers, Faraday cups, galvanometers, Hall effect sensors, Hall probes, magnetic anomaly detectors, magnetometers, magnetoresistances, mems magnetic field sensors, metal detectors, planar hall sensors, radio direction finders, and voltage detectors.

Examples of environmental sensors include actinometers, air pollution sensors, bedwetting alarms, ceilometers, dew warnings, electrochemical gas sensors, fish counters, frequency domain sensors, gas detectors, hook gauge evaporimeters, humistors, hygrometers, leaf sensors, lysimeters, pyranometers, pyrgeometers, psychrometers, rain gauges, rain sensors, seismometers, SNOTEL sensors, snow gauges, soil moisture sensors, stream gauges, and tide gauges. Examples of flow and fluid velocity sensors include air flow meters, anemometers, flow sensors, gas meter, mass flow sensors, and water meters.

Examples of radiation and particle sensors include cloud chambers, Geiger counters, Geiger-Muller tubes, ionisation chambers, neutron detections, proportional counters, scintillation counters, semiconductor detectors, and thermoluminescent dosimeters. Examples of navigation instruments include air speed indicators, altimeters, attitude indicators, depth gauges, fluxgate compasses, gyroscopes, inertial navigation systems, inertial reference nits, magnetic compasses, MHD sensors, ring laser gyroscopes, turn coordinators, tialinx sensors, variometers, vibrating structure gyroscopes, and yaw rate sensors.

Examples of position, angle, displacement, distance, speed, and acceleration sensors include auxanometers, capacitive displacement sensors, capacitive sensing devices, flex sensors, free fall sensors, gravimeters, gyroscopic sensors, impact sensors, inclinometers, integrated circuit piezoelectric sensors, laser rangefinders, laser surface velocimeters, Light Detection And Ranging (LIDAR) sensors, linear encoders, linear variable differential transformers (LVDT), liquid capacitive inclinometers odometers, photoelectric sensors, piezoelectric accelerometers, position sensors, position sensitive devices, angular rate sensors, rotary encoders, rotary variable differential transformers, selsyns, shock detectors, shock data loggers, tilt sensors, tachometers, ultrasonic thickness gauges, variable reluctance sensors, and velocity receivers.

Examples of optical, light, imaging, and photon sensors include charge-coupled devices, complementary metal-oxide-semiconductor (CMOS) sensors, colorimeters, contact image sensors, electro-optical sensors, flame detectors, infra-red sensors, kinetic inductance detectors, led as light sensors, light-addressable potentiometric sensors, Nichols radiometers, fiber optic sensors, optical position sensors, thermopile laser sensors, photodetectors, photodiodes, photomultiplier tubes, phototransistors, photoelectric sensors, photoionization detectors, photomultipliers, photoresistors, photoswitches, phototubes, scintillometers, Shack-Hartmann sensors, single-photon avalanche diodes, superconducting nanowire single-photon detectors, transition edge sensors, visible light photon counters, and wavefront sensors.

Examples of pressure sensors include barographs, barometers, boost gauges, bourdon gauges, hot filament ionization gauges, ionization gauges, McLeod gauges, oscillating u-tubes, permanent downhole gauges, piezometers, pirani gauges, pressure sensors, pressure gauges, tactile sensors, and time pressure gauges. Examples of force, density, and level sensors include bhangmeters, hydrometers, force gauge and force sensors, level sensors, load cells, magnetic level gauges, nuclear density gauges, piezocapacitive pressure sensors, piezoelectric sensors, strain gauges, torque sensors, and viscometers.

Examples of thermal, heat, and temperature sensors include bolometers, bimetallic strips, calorimeters, exhaust gas temperature gauges, flame detections, Gardon gauges, Golay cells, heat flux sensors, infrared thermometers, microbolometers, microwave radiometers, net radiometers, quartz thermometers, resistance thermometers, silicon bandgap temperature sensors, special sensor microwave/imagers, temperature gauges, thermistors, thermocouples, thermometers, and pyrometers. Examples of proximity and presence sensors include alarm sensors, Doppler radars, motion detectors, occupancy sensors, proximity sensors, passive infrared sensors, reed switches, stud finders, triangulation sensors, touch switches, and wired gloves.

In some embodiments, different sensors send measurements or other data to building management platform 102 using a variety of different communications protocols or data formats. Building management platform 102 can be configured to ingest sensor data received in any protocol or data format and translate the inbound sensor data into a common data format. Building management platform 102 can create a sensor object smart entity for each sensor that communicates with Building management platform 102. Each sensor object smart entity may include one or more static attributes that describe the corresponding sensor, one or more dynamic attributes that indicate the most recent values collected by the sensor, and/or one or more relational attributes that relate sensors object smart entities to each other and/or to other types of smart entities (e.g., space entities, system entities, data entities, etc.).

In some embodiments, building management platform 102 stores sensor data using data entities. Each data entity may correspond to a particular sensor and may include a timeseries of data values received from the corresponding sensor. In some embodiments, building management platform 102 stores relational entities that define relationships between sensor object entities and the corresponding data entity. For example, each relational entity may identify a particular sensor object entity, a particular data entity, and may define a link between such entities.

Building management platform 102 can collect data from a variety of external systems or services. For example, building management platform 102 is shown receiving weather data from a weather service 152, news data from a news service 154, documents and other document-related data from a document service 156, and media (e.g., video, images, audio, social media, etc.) from a media service 158 (hereinafter referred to collectively as $3^{rd}$ party services). In some embodiments, building management platform 102 generates data internally. For example, building management platform 102 may include a web advertising system, a website traffic monitoring system, a web sales system, or other types of platform services that generate data. The data generated by building management platform 102 can be collected, stored, and processed along with the data received from other data sources. Building management platform 102 can collect data directly from external systems or devices or via a network 104 (e.g., a WAN, the Internet, a cellular network, etc.). Building management platform 102 can process and transform collected data to generate timeseries data and entity data. Several features of building management platform 102 are described in more detail below.

Building HVAC Systems and Building Management Systems

Figure 2:
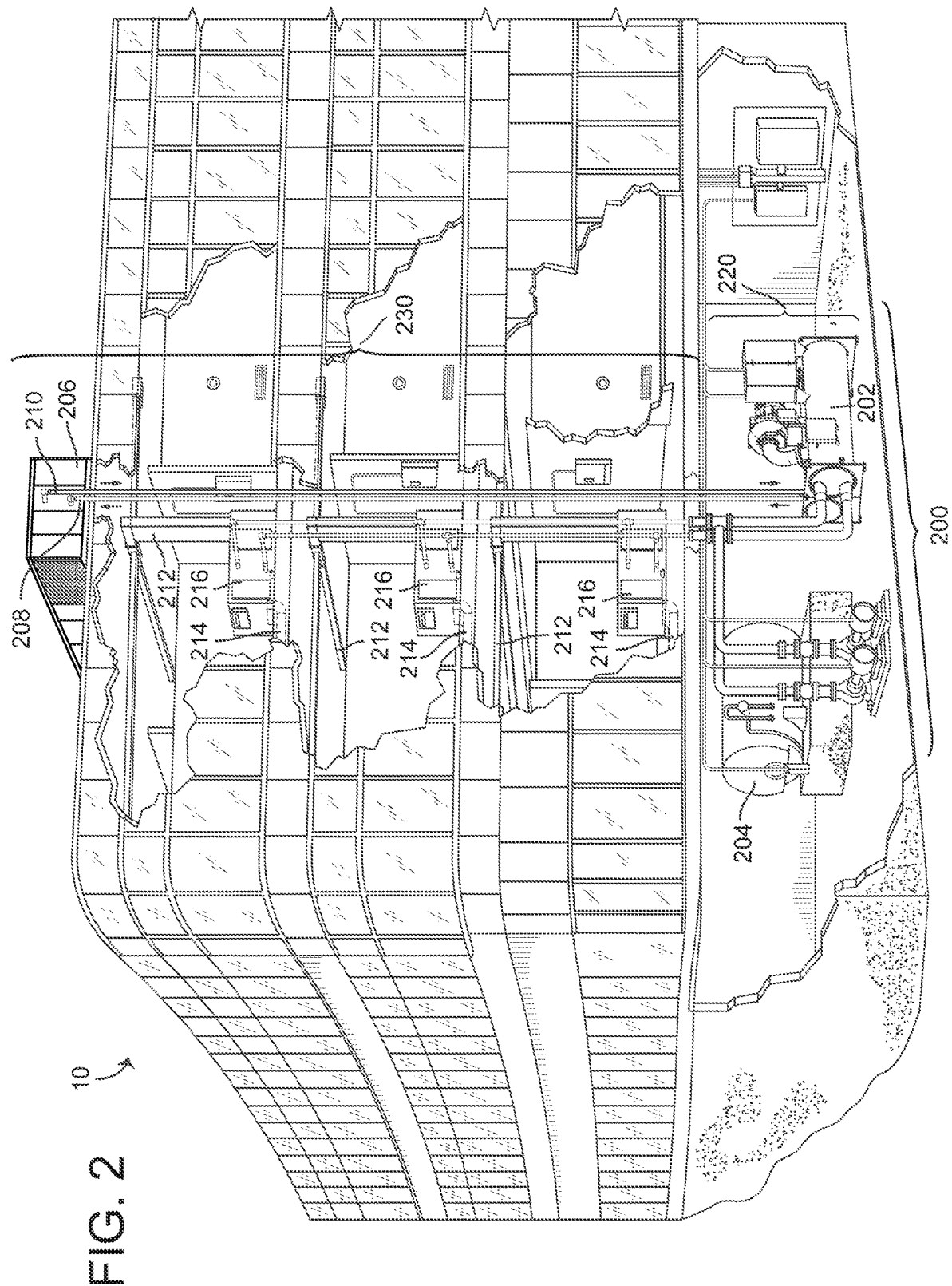
FIG. 2 is a perspective view of a smart building, according to an exemplary embodiment.
Figure 3:
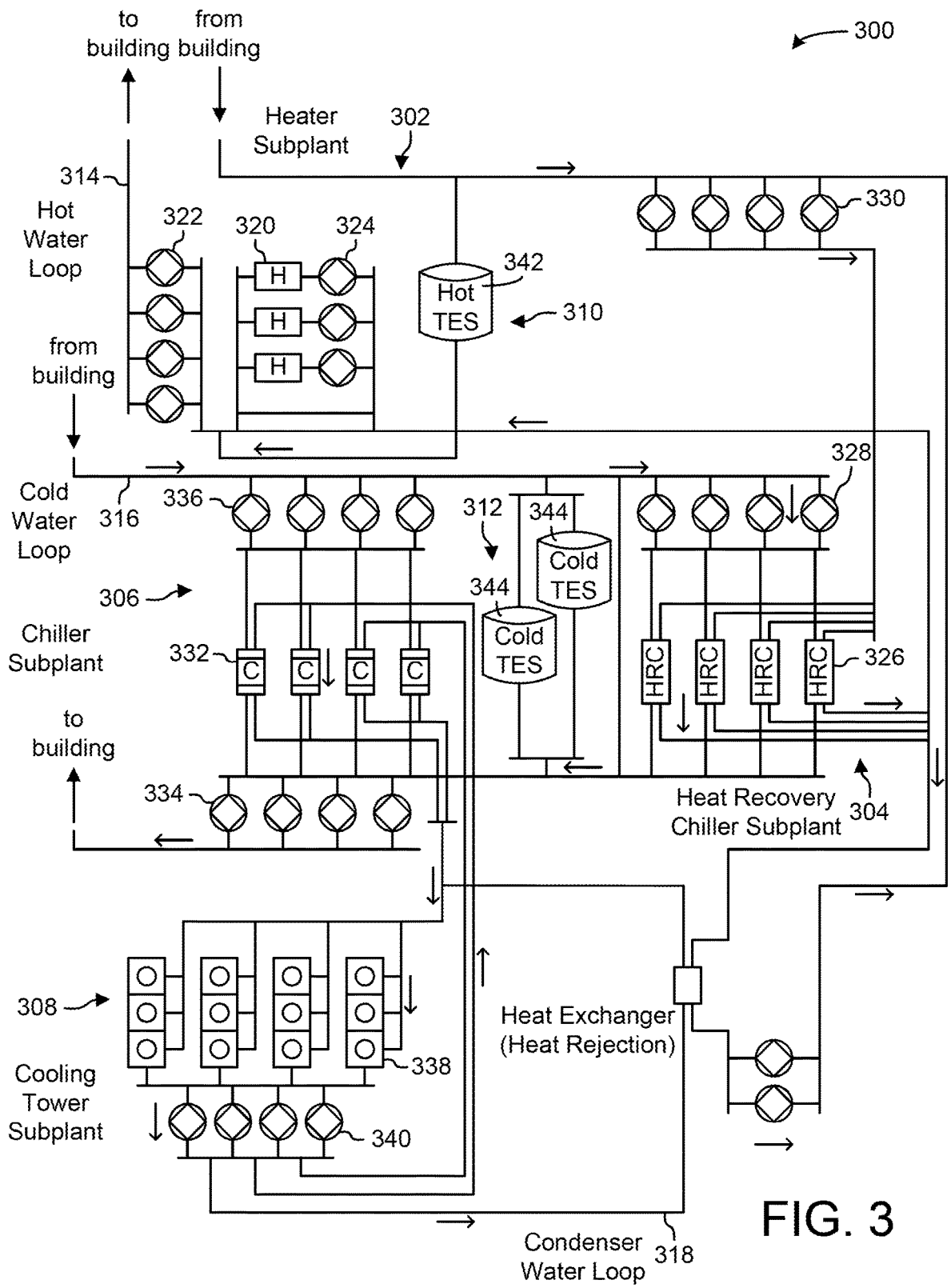
FIG. 3 is a block diagram of a waterside system, according to an exemplary embodiment.
Figure 4:
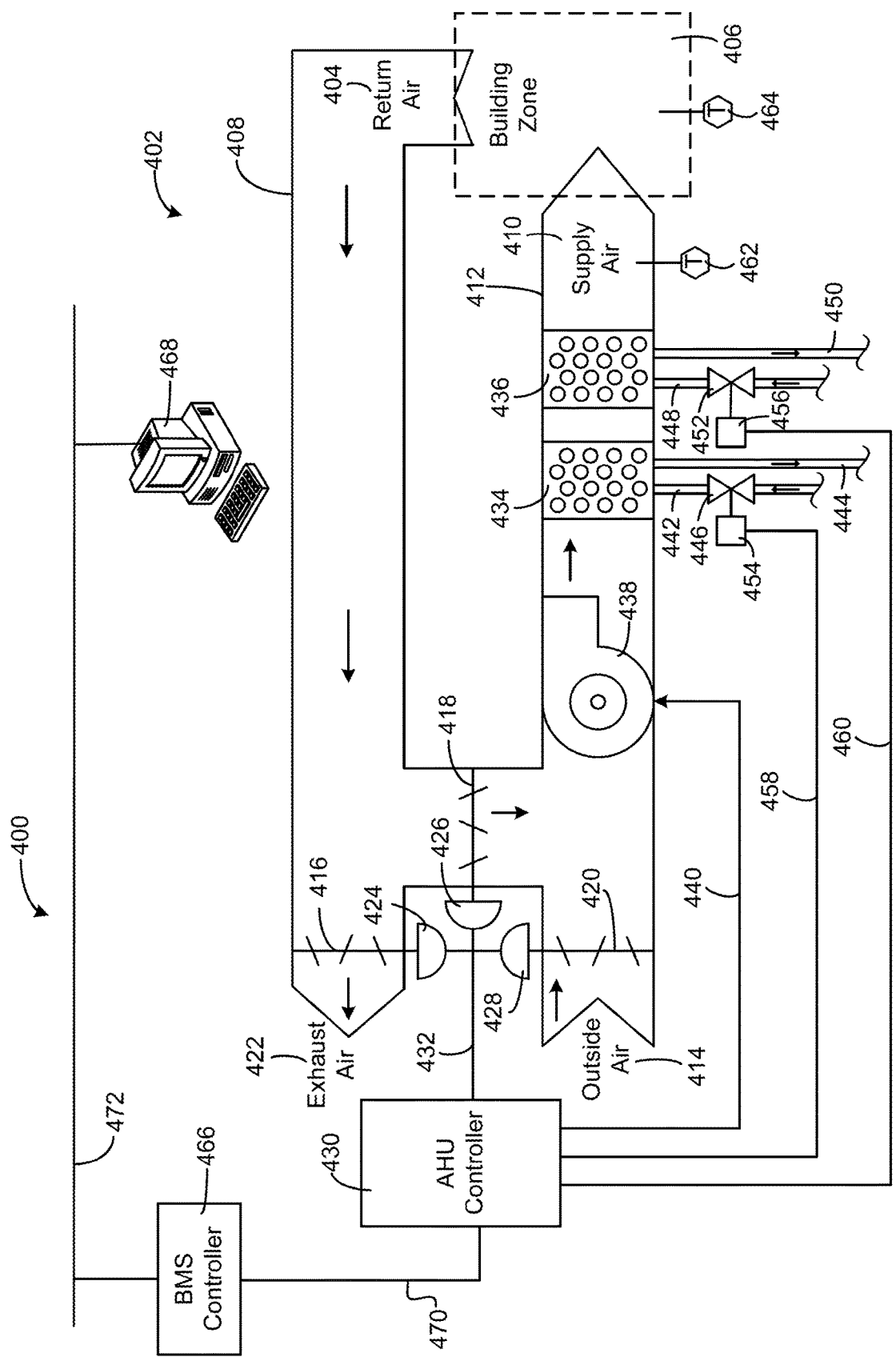
FIG. 4 is a block diagram of an airside system, according to an exemplary embodiment.
Figure 5:
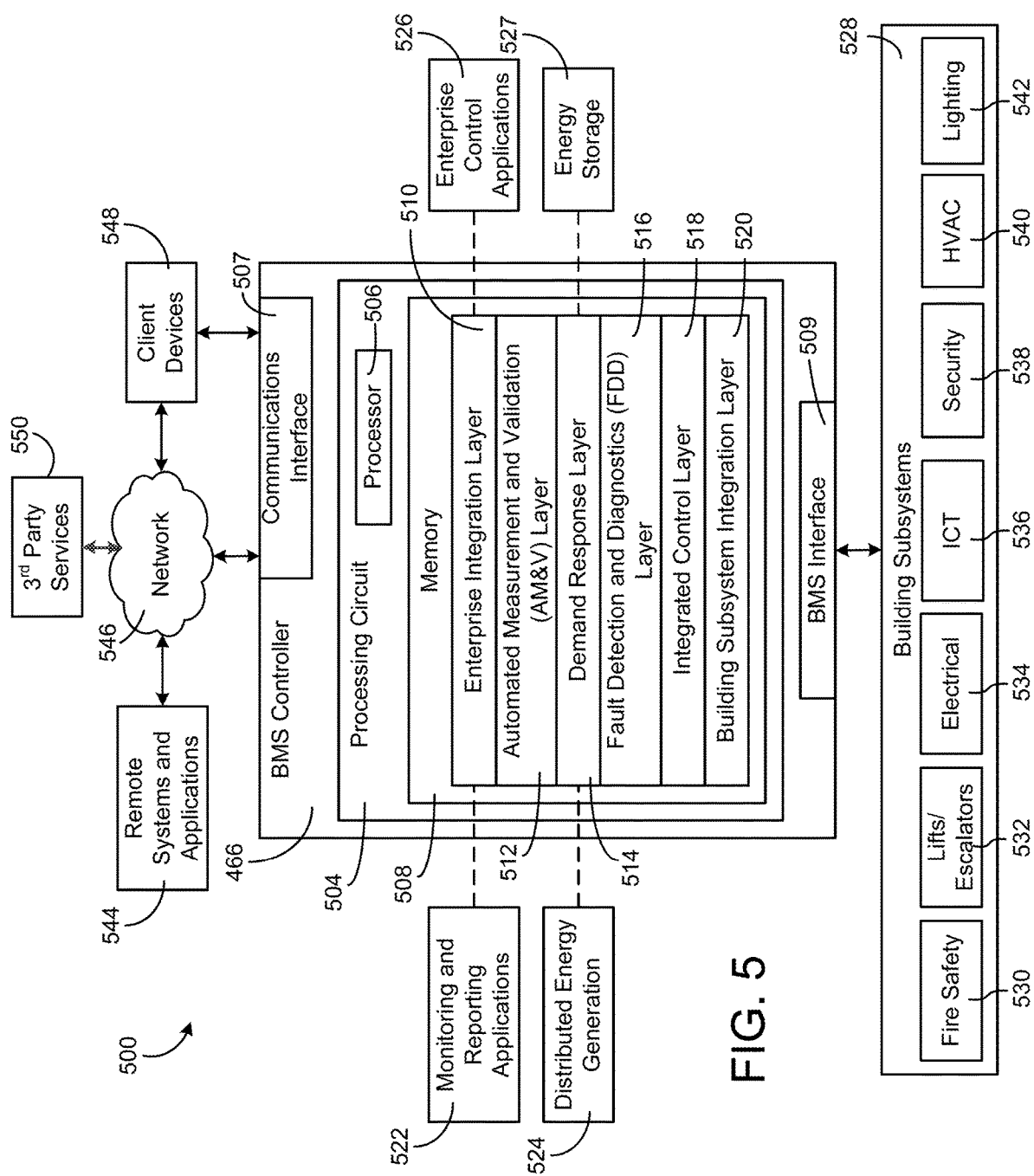
FIG. 5 is a block diagram of a building management system, according to an exemplary embodiment.

Referring now to FIGS. 2-5, several building management systems (BMS) and HVAC systems in which the systems and methods of the present disclosure can be implemented are shown, according to some embodiments. In brief overview, FIG. 2 shows a building 10 equipped with, for example, a HVAC system 200. Building 10 may be any of the buildings 210, 220, 230, and 140 as shown in FIG. 1, or may be any other suitable building that is communicatively connected to building management platform 102. FIG. 3 is a block diagram of a waterside system 300 which can be used to serve building 10. FIG. 4 is a block diagram of an airside system 400 which can be used to serve building 10. FIG. 5 is a block diagram of a building management system (BMS) which can be used to monitor and control building 10.

Building and HVAC System

Referring particularly to FIG. 2, a perspective view of a smart building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and any other system that is capable of managing building functions or devices, or any combination thereof. Further, each of the systems may include sensors and other devices (e.g., IoT devices) for the proper operation, maintenance, monitoring, and the like of the respective systems.

The BMS that serves building 10 includes a HVAC system 200. HVAC system 200 can include HVAC devices (e.g., heaters, chillers, air handling units, pumps, fans, thermal energy storage, etc.) configured to provide heating, cooling, ventilation, or other services for building 10. For example, HVAC system 200 is shown to include a waterside system 220 and an airside system 230. Waterside system 220 may provide a heated or chilled fluid to an air handling unit of airside system 230. Airside system 230 may use the heated or chilled fluid to heat or cool an airflow provided to building 10. An exemplary waterside system and airside system which can be used in HVAC system 200 are described in greater detail with reference to FIGS. 3 and 4.

HVAC system 200 is shown to include a chiller 202, a boiler 204, and a rooftop air handling unit (AHU) 206. Waterside system 220 may use boiler 204 and chiller 202 to heat or cool a working fluid (e.g., water, glycol, etc.) and may circulate the working fluid to AHU 206. In various embodiments, the HVAC devices of waterside system 220 can be located in or around building 10 (as shown in FIG. 2) or at an offsite location such as a central plant (e.g., a chiller plant, a steam plant, a heat plant, etc.). The working fluid can be heated in boiler 204 or cooled in chiller 202, depending on whether heating or cooling is required in building 10. Boiler 204 may add heat to the circulated fluid, for example, by burning a combustible material (e.g., natural gas) or using an electric heating element. Chiller 202 may place the circulated fluid in a heat exchange relationship with another fluid (e.g., a refrigerant) in a heat exchanger (e.g., an evaporator) to absorb heat from the circulated fluid. The working fluid from chiller 202 and/or boiler 204 can be transported to AHU 206 via piping 208.

AHU 206 may place the working fluid in a heat exchange relationship with an airflow passing through AHU 206 (e.g., via one or more stages of cooling coils and/or heating coils). The airflow can be, for example, outside air, return air from within building 10, or a combination of both. AHU 206 may transfer heat between the airflow and the working fluid to provide heating or cooling for the airflow. For example, AHU 206 can include one or more fans or blowers configured to pass the airflow over or through a heat exchanger containing the working fluid. The working fluid may then return to chiller 202 or boiler 204 via piping 210.

Airside system 230 may deliver the airflow supplied by AHU 206 (i.e., the supply airflow) to building 10 via air supply ducts 212 and may provide return air from building 10 to AHU 206 via air return ducts 214. In some embodiments, airside system 230 includes multiple variable air volume (VAV) units 216. For example, airside system 230 is shown to include a separate VAV unit 216 on each floor or zone of building 10. VAV units 216 can include dampers or other flow control elements that can be operated to control an amount of the supply airflow provided to individual zones of building 10. In other embodiments, airside system 230 delivers the supply airflow into one or more zones of building 10 (e.g., via supply ducts 212) without using intermediate VAV units 216 or other flow control elements. AHU 206 can include various sensors (e.g., temperature sensors, pressure sensors, etc.) configured to measure attributes of the supply airflow. AHU 206 may receive input from sensors located within AHU 206 and/or within the building zone and may adjust the flow rate, temperature, or other attributes of the supply airflow through AHU 206 to achieve setpoint conditions for the building zone.

Waterside System

Referring now to FIG. 3, a block diagram of a waterside system 300 is shown, according to some embodiments. In various embodiments, waterside system 300 may supplement or replace waterside system 220 in HVAC system 200 or can be implemented separate from HVAC system 200. When implemented in HVAC system 200, waterside system 300 can include a subset of the HVAC devices in HVAC system 200 (e.g., boiler 204, chiller 202, pumps, valves, etc.) and may operate to supply a heated or chilled fluid to AHU 206. The HVAC devices of waterside system 300 can be located within building 10 (e.g., as components of waterside system 220) or at an offsite location such as a central plant.

In FIG. 3, waterside system 300 is shown as a central plant having subplants 302-312. Subplants 302-312 are shown to include a heater subplant 302, a heat recovery chiller subplant 304, a chiller subplant 306, a cooling tower subplant 308, a hot thermal energy storage (TES) subplant 310, and a cold thermal energy storage (TES) subplant 312. Subplants 302-312 consume resources (e.g., water, natural gas, electricity, etc.) from utilities to serve thermal energy loads (e.g., hot water, cold water, heating, cooling, etc.) of a building or campus. For example, heater subplant 302 can be configured to heat water in a hot water loop 314 that circulates the hot water between heater subplant 302 and building 10. Chiller subplant 306 can be configured to chill water in a cold water loop 316 that circulates the cold water between chiller subplant 306 and building 10. Heat recovery chiller subplant 304 can be configured to transfer heat from cold water loop 316 to hot water loop 314 to provide additional heating for the hot water and additional cooling for the cold water. Condenser water loop 318 may absorb heat from the cold water in chiller subplant 306 and reject the absorbed heat in cooling tower subplant 308 or transfer the absorbed heat to hot water loop 314. Hot TES subplant 310 and cold TES subplant 312 may store hot and cold thermal energy, respectively, for subsequent use.

Hot water loop 314 and cold water loop 316 may deliver the heated and/or chilled water to air handlers located on the rooftop of building 10 (e.g., AHU 206) or to individual floors or zones of building 10 (e.g., VAV units 216). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 302-312 to receive further heating or cooling.

Although subplants 302-312 are shown and described as heating and cooling water for circulation to a building, it is understood that any other type of working fluid (e.g., glycol, $CO_2$, etc.) can be used in place of or in addition to water to serve thermal energy loads. In other embodiments, subplants 302-312 may provide heating and/or cooling directly to the building or campus without requiring an intermediate heat transfer fluid. These and other variations to waterside system 300 are within the teachings of the present disclosure.

Each of subplants 302-312 can include a variety of equipment configured to facilitate the functions of the subplant. For example, heater subplant 302 is shown to include heating elements 320 (e.g., boilers, electric heaters, etc.) configured to add heat to the hot water in hot water loop 314. Heater subplant 302 is also shown to include several pumps 322 and 324 configured to circulate the hot water in hot water loop 314 and to control the flow rate of the hot water through individual heating elements 320. Chiller subplant 306 is shown to include chillers 332 configured to remove heat from the cold water in cold water loop 316. Chiller subplant 306 is also shown to include several pumps 334 and 336 configured to circulate the cold water in cold water loop 316 and to control the flow rate of the cold water through individual chillers 332.

Heat recovery chiller subplant 304 is shown to include heat recovery heat exchangers 326 (e.g., refrigeration circuits) configured to transfer heat from cold water loop 316 to hot water loop 314. Heat recovery chiller subplant 304 is also shown to include several pumps 328 and 330 configured to circulate the hot water and/or cold water through heat recovery heat exchangers 326 and to control the flow rate of the water through individual heat recovery heat exchangers 326. Cooling tower subplant 308 is shown to include cooling towers 338 configured to remove heat from the condenser water in condenser water loop 318. Cooling tower subplant 308 is also shown to include several pumps 340 configured to circulate the condenser water in condenser water loop 318 and to control the flow rate of the condenser water through individual cooling towers 338.

Hot TES subplant 310 is shown to include a hot TES tank 342 configured to store the hot water for later use. Hot TES subplant 310 may also include one or more pumps or valves configured to control the flow rate of the hot water into or out of hot TES tank 342. Cold TES subplant 312 is shown to include cold TES tanks 344 configured to store the cold water for later use. Cold TES subplant 312 may also include one or more pumps or valves configured to control the flow rate of the cold water into or out of cold TES tanks 344.

In some embodiments, one or more of the pumps in waterside system 300 (e.g., pumps 322, 324, 328, 330, 334, 336, and/or 340) or pipelines in waterside system 300 include an isolation valve associated therewith. Isolation valves can be integrated with the pumps or positioned upstream or downstream of the pumps to control the fluid flows in waterside system 300. In various embodiments, waterside system 300 can include more, fewer, or different types of devices and/or subplants based on the particular configuration of waterside system 300 and the types of loads served by waterside system 300.

Airside System

Referring now to FIG. 4, a block diagram of an airside system 400 is shown, according to some embodiments. In various embodiments, airside system 400 may supplement or replace airside system 230 in HVAC system 200 or can be implemented separate from HVAC system 200. When implemented in HVAC system 200, airside system 400 can include a subset of the HVAC devices in HVAC system 200 (e.g., AHU 206, VAV units 216, ducts 212-214, fans, dampers, etc.) and can be located in or around building 10. Airside system 400 may operate to heat or cool an airflow provided to building 10 using a heated or chilled fluid provided by waterside system 300.

In FIG. 4, airside system 400 is shown to include an economizer-type air handling unit (AHU) 402. Economizer-type AHUs vary the amount of outside air and return air used by the air handling unit for heating or cooling. For example, AHU 402 may receive return air 404 from building zone 406 via return air duct 408 and may deliver supply air 410 to building zone 406 via supply air duct 412. In some embodiments, AHU 402 is a rooftop unit located on the roof of building 10 (e.g., AHU 206 as shown in FIG. 2) or otherwise positioned to receive both return air 404 and outside air 414. AHU 402 can be configured to operate exhaust air damper 416, mixing damper 418, and outside air damper 420 to control an amount of outside air 414 and return air 404 that combine to form supply air 410. Any return air 404 that does not pass through mixing damper 418 can be exhausted from AHU 402 through exhaust damper 416 as exhaust air 422.

Each of dampers 416-420 can be operated by an actuator. For example, exhaust air damper 416 can be operated by actuator 424, mixing damper 418 can be operated by actuator 426, and outside air damper 420 can be operated by actuator 428. Actuators 424-428 may communicate with an AHU controller 430 via a communications link 432. Actuators 424-428 may receive control signals from AHU controller 430 and may provide feedback signals to AHU controller 430. Feedback signals can include, for example, an indication of a current actuator or damper position, an amount of torque or force exerted by the actuator, diagnostic information (e.g., results of diagnostic tests performed by actuators 424-428), status information, commissioning information, configuration settings, calibration data, and/or other types of information or data that can be collected, stored, or used by actuators 424-428. AHU controller 430 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 424-428.

Still referring to FIG. 4, AHU 304 is shown to include a cooling coil 434, a heating coil 436, and a fan 438 positioned within supply air duct 412. Fan 438 can be configured to force supply air 410 through cooling coil 434 and/or heating coil 436 and provide supply air 410 to building zone 406. AHU controller 430 may communicate with fan 438 via communications link 440 to control a flow rate of supply air 410. In some embodiments, AHU controller 430 controls an amount of heating or cooling applied to supply air 410 by modulating a speed of fan 438.

Cooling coil 434 may receive a chilled fluid from waterside system 300 (e.g., from cold water loop 316) via piping 442 and may return the chilled fluid to waterside system 300 via piping 444. Valve 446 can be positioned along piping 442 or piping 444 to control a flow rate of the chilled fluid through cooling coil 434. In some embodiments, cooling coil 434 includes multiple stages of cooling coils that can be independently activated and deactivated (e.g., by AHU controller 430, by BMS controller 466, etc.) to modulate an amount of cooling applied to supply air 410.

Heating coil 436 may receive a heated fluid from waterside system 300 (e.g., from hot water loop 314) via piping 448 and may return the heated fluid to waterside system 300 via piping 450. Valve 452 can be positioned along piping 448 or piping 450 to control a flow rate of the heated fluid through heating coil 436. In some embodiments, heating coil 436 includes multiple stages of heating coils that can be independently activated and deactivated (e.g., by AHU controller 430, by BMS controller 466, etc.) to modulate an amount of heating applied to supply air 410.

Each of valves 446 and 452 can be controlled by an actuator. For example, valve 446 can be controlled by actuator 454 and valve 452 can be controlled by actuator 456. Actuators 454-456 may communicate with AHU controller 430 via communications links 458-460. Actuators 454-456 may receive control signals from AHU controller 430 and may provide feedback signals to controller 430. In some embodiments, AHU controller 430 receives a measurement of the supply air temperature from a temperature sensor 462 positioned in supply air duct 412 (e.g., downstream of cooling coil 434 and/or heating coil 436). AHU controller 430 may also receive a measurement of the temperature of building zone 406 from a temperature sensor 464 located in building zone 406.

In some embodiments, AHU controller 430 operates valves 446 and 452 via actuators 454-456 to modulate an amount of heating or cooling provided to supply air 410 (e.g., to achieve a setpoint temperature for supply air 410 or to maintain the temperature of supply air 410 within a setpoint temperature range). The positions of valves 446 and 452 affect the amount of heating or cooling provided to supply air 410 by cooling coil 434 or heating coil 436 and may correlate with the amount of energy consumed to achieve a desired supply air temperature. AHU controller 430 may control the temperature of supply air 410 and/or building zone 406 by activating or deactivating coils 434-436, adjusting a speed of fan 438, or a combination of both.

Still referring to FIG. 4, airside system 400 is shown to include a building management system (BMS) controller 466 and a client device 468. BMS controller 466 can include one or more computer systems (e.g., servers, supervisory controllers, subsystem controllers, etc.) that serve as system level controllers, application or data servers, head nodes, or master controllers for airside system 400, waterside system 300, HVAC system 200, and/or other controllable systems that serve building 10. BMS controller 466 may communicate with multiple downstream building systems or subsystems (e.g., HVAC system 200, a security system, a lighting system, waterside system 300, etc.) via a communications link 470 according to like or disparate protocols (e.g., LON, BACnet, etc.). In various embodiments, AHU controller 430 and BMS controller 466 can be separate (as shown in FIG. 4) or integrated. In an integrated implementation, AHU controller 430 can be a software module configured for execution by a processor of BMS controller 466.

In some embodiments, AHU controller 430 receives information from BMS controller 466 (e.g., commands, setpoints, operating boundaries, etc.) and provides information to BMS controller 466 (e.g., temperature measurements, valve or actuator positions, operating statuses, diagnostics, etc.). For example, AHU controller 430 may provide BMS controller 466 with temperature measurements from temperature sensors 462-464, equipment on/off states, equipment operating capacities, and/or any other information that can be used by BMS controller 466 to monitor or control a variable state or condition within building zone 406.

Client device 468 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 200, its subsystems, and/or devices. Client device 468 can be a computer workstation, a client terminal, a remote or local interface, or any other type of user interface device. Client device 468 can be a stationary terminal or a mobile device. For example, client device 468 can be a desktop computer, a computer server with a user interface, a laptop computer, a tablet, a smartphone, a PDA, or any other type of mobile or non-mobile device. Client device 468 may communicate with BMS controller 466 and/or AHU controller 430 via communications link 472.

Building Management System

Referring now to FIG. 5, a block diagram of a building management system (BMS) 500 is shown, according to some embodiments. BMS 500 can be implemented in building 10 to automatically monitor and control various building functions. BMS 500 is shown to include BMS controller 466 and building subsystems 528. Building subsystems 528 are shown to include a building electrical subsystem 534, an information communication technology (ICT) subsystem 536, a security subsystem 538, a HVAC subsystem 540, a lighting subsystem 542, a lift/escalators subsystem 532, and a fire safety subsystem 530. In various embodiments, building subsystems 528 can include fewer, additional, or alternative subsystems. For example, building subsystems 528 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 528 include waterside system 300 and/or airside system 400, as described with reference to FIGS. 3-4.

Each of building subsystems 528 can include any number of devices (e.g., IoT devices), sensors, controllers, and connections for completing its individual functions and control activities. HVAC subsystem 540 can include many of the same components as HVAC system 200, as described with reference to FIGS. 2-4. For example, HVAC subsystem 540 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 542 can include any number of light fixtures, ballasts, lighting sensors, dimmers, or other devices configured to controllably adjust the amount of light provided to a building space. Security subsystem 538 can include occupancy sensors, video surveillance cameras, digital video recorders, video processing servers, intrusion detection devices, access control devices and servers, or other security-related devices.

Still referring to FIG. 5, BMS controller 466 is shown to include a communications interface 507 and a BMS interface 509. Interface 507 may facilitate communications between BMS controller 466 and external applications (e.g., monitoring and reporting applications 522, enterprise control applications 526, remote systems and applications 544, applications residing on client devices 548, $3^{rd}$ party services 550, etc.) for allowing user control, monitoring, and adjustment to BMS controller 466 and/or subsystems 528. Interface 507 may also facilitate communications between BMS controller 466 and client devices 548. BMS interface 509 may facilitate communications between BMS controller 466 and building subsystems 528 (e.g., HVAC, lighting security, lifts, power distribution, business, etc.).

Interfaces 507, 509 can be or include wired or wireless communications interfaces (e.g., jacks, antennas, transmitters, receivers, transceivers, wire terminals, etc.) for conducting data communications with building subsystems 528 or other external systems or devices. In various embodiments, communications via interfaces 507, 509 can be direct (e.g., local wired or wireless communications) or via a communications network 546 (e.g., a WAN, the Internet, a cellular network, etc.). For example, interfaces 507, 509 can include an Ethernet card and port for sending and receiving data via an Ethernet-based communications link or network. In another example, interfaces 507, 509 can include a Wi-Fi transceiver for communicating via a wireless communications network. In another example, one or both of interfaces 507, 509 can include cellular or mobile phone communications transceivers. In one embodiment, communications interface 507 is a power line communications interface and BMS interface 509 is an Ethernet interface. In other embodiments, both communications interface 507 and BMS interface 509 are Ethernet interfaces or are the same Ethernet interface.

Still referring to FIG. 5, BMS controller 466 is shown to include a processing circuit 504 including a processor 506 and memory 508. Processing circuit 504 can be communicably connected to BMS interface 509 and/or communications interface 507 such that processing circuit 504 and the various components thereof can send and receive data via interfaces 507, 509. Processor 506 can be implemented as a general purpose processor, an application specific integrated circuit (ASIC), one or more field programmable gate arrays (FPGAs), a group of processing components, or other suitable electronic processing components.

Memory 508 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 508 can be or include volatile memory or non-volatile memory. Memory 508 can include database components, object code components, script components, or any other type of information structure for supporting the various activities and information structures described in the present application. According to some embodiments, memory 508 is communicably connected to processor 506 via processing circuit 504 and includes computer code for executing (e.g., by processing circuit 504 and/or processor 506) one or more processes described herein.

In some embodiments, BMS controller 466 is implemented within a single computer (e.g., one server, one housing, etc.). In various other embodiments BMS controller 466 can be distributed across multiple servers or computers (e.g., that can exist in distributed locations). Further, while FIG. 4 shows applications 522 and 526 as existing outside of BMS controller 466, in some embodiments, applications 522 and 526 can be hosted within BMS controller 466 (e.g., within memory 508).

Still referring to FIG. 5, memory 508 is shown to include an enterprise integration layer 510, an automated measurement and validation (AM&V) layer 512, a demand response (DR) layer 514, a fault detection and diagnostics (FDD) layer 516, an integrated control layer 518, and a building subsystem integration later 520. Layers 510-520 can be configured to receive inputs from building subsystems 528 and other data sources, determine improved and/or optimal control actions for building subsystems 528 based on the inputs, generate control signals based on the improved and/or optimal control actions, and provide the generated control signals to building subsystems 528. The following paragraphs describe some of the general functions performed by each of layers 510-520 in BMS 500.

Enterprise integration layer 510 can be configured to serve clients or local applications with information and services to support a variety of enterprise-level applications. For example, enterprise control applications 526 can be configured to provide subsystem-spanning control to a graphical user interface (GUI) or to any number of enterprise-level business applications (e.g., accounting systems, user identification systems, etc.). Enterprise control applications 526 may also or alternatively be configured to provide configuration GUIs for configuring BMS controller 466. In yet other embodiments, enterprise control applications 526 can work with layers 510-520 to improve and/or optimize building performance (e.g., efficiency, energy use, comfort, or safety) based on inputs received at interface 507 and/or BMS interface 509.

Building subsystem integration layer 520 can be configured to manage communications between BMS controller 466 and building subsystems 528. For example, building subsystem integration layer 520 may receive sensor data and input signals from building subsystems 528 and provide output data and control signals to building subsystems 528. Building subsystem integration layer 520 may also be configured to manage communications between building subsystems 528. Building subsystem integration layer 520 translates communications (e.g., sensor data, input signals, output signals, etc.) across multi-vendor/multi-protocol systems.

Demand response layer 514 can be configured to determine (e.g., optimize) resource usage (e.g., electricity use, natural gas use, water use, etc.) and/or the monetary cost of such resource usage to satisfy the demand of building 10. The resource usage determination can be based on time-of-use prices, curtailment signals, energy availability, or other data received from utility providers, distributed energy generation systems 524, energy storage 527 (e.g., hot TES 342, cold TES 344, etc.), or from other sources. Demand response layer 514 may receive inputs from other layers of BMS controller 466 (e.g., building subsystem integration layer 520, integrated control layer 518, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 514 includes control logic for responding to the data and signals it receives. These responses can include communicating with the control algorithms in integrated control layer 518, changing control strategies, changing setpoints, or activating/deactivating building equipment or subsystems in a controlled manner. Demand response layer 514 may also include control logic configured to determine when to utilize stored energy. For example, demand response layer 514 may determine to begin using energy from energy storage 527 just prior to the beginning of a peak use hour.

In some embodiments, demand response layer 514 includes a control module configured to actively initiate control actions (e.g., automatically changing setpoints) which reduce (e.g., minimize) energy costs based on one or more inputs representative of or based on demand (e.g., price, a curtailment signal, a demand level, etc.). In some embodiments, demand response layer 514 uses equipment models to determine an improved and/or optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 514 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 518 can be configured to use the data input or output of building subsystem integration layer 520 and/or demand response later 514 to make control decisions. Due to the subsystem integration provided by building subsystem integration layer 520, integrated control layer 518 can integrate control activities of the subsystems 528 such that the subsystems 528 behave as a single integrated super system. In some embodiments, integrated control layer 518 includes control logic that uses inputs and outputs from building subsystems to provide greater comfort and energy savings relative to the comfort and energy savings that separate subsystems could provide alone. For example, integrated control layer 518 can be configured to use an input from a first subsystem to make an energy-saving control decision for a second subsystem. Results of these decisions can be communicated back to building subsystem integration layer 520.

Integrated control layer 518 is shown to be logically below demand response layer 514. Integrated control layer 518 can be configured to enhance the effectiveness of demand response layer 514 by enabling building subsystems 528 and their respective control loops to be controlled in coordination with demand response layer 514. This configuration may advantageously reduce disruptive demand response behavior relative to conventional systems. For example, integrated control layer 518 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 518 can be configured to provide feedback to demand response layer 514 so that demand response layer 514 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 518 is also logically below fault detection and diagnostics layer 516 and automated measurement and validation layer 512. Integrated control layer 518 can be configured to provide calculated inputs (e.g., aggregations) to these higher levels based on outputs from more than one building subsystem.

Automated measurement and validation (AM&V) layer 512 can be configured to verify that control strategies commanded by integrated control layer 518 or demand response layer 514 are working properly (e.g., using data aggregated by AM&V layer 512, integrated control layer 518, building subsystem integration layer 520, FDD layer 516, or otherwise). The calculations made by AM&V layer 512 can be based on building system energy models and/or equipment models for individual BMS devices or subsystems. For example, AM&V layer 512 may compare a model-predicted output with an actual output from building subsystems 528 to determine an accuracy of the model.

Fault detection and diagnostics (FDD) layer 516 can be configured to provide on-going fault detection for building subsystems 528, building subsystem devices (i.e., building equipment), and control algorithms used by demand response layer 514 and integrated control layer 518. FDD layer 516 may receive data inputs from integrated control layer 518, directly from one or more building subsystems or devices, or from another data source. FDD layer 516 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 516 can be configured to output a specific identification of the faulty component or cause of the fault (e.g., loose damper linkage) using detailed subsystem inputs available at building subsystem integration layer 520. In other exemplary embodiments, FDD layer 516 is configured to provide "fault" events to integrated control layer 518 which executes control strategies and policies in response to the received fault events. According to some embodiments, FDD layer 516 (or a policy executed by an integrated control engine or business rules engine) may shut-down systems or direct control activities around faulty devices or systems to reduce energy waste, extend equipment life, or assure proper control response.

FDD layer 516 can be configured to store or access a variety of different system data stores (or data points for live data). FDD layer 516 may use some content of the data stores to identify faults at the equipment level (e.g., specific chiller, specific AHU, specific terminal unit, etc.) and other content to identify faults at component or subsystem levels. For example, building subsystems 528 may generate temporal (i.e., time-series) data indicating the performance of BMS 500 and the various components thereof. The data generated by building subsystems 528 can include measured or calculated values that exhibit statistical characteristics and provide information about how the corresponding system or process (e.g., a temperature control process, a flow control process, etc.) is performing in terms of error from its setpoint. These processes can be examined by FDD layer 516 to expose when the system begins to degrade in performance and alert a user to repair the fault before it becomes more severe.

Building Management System With Cloud Building Management Platform

Figure 6:
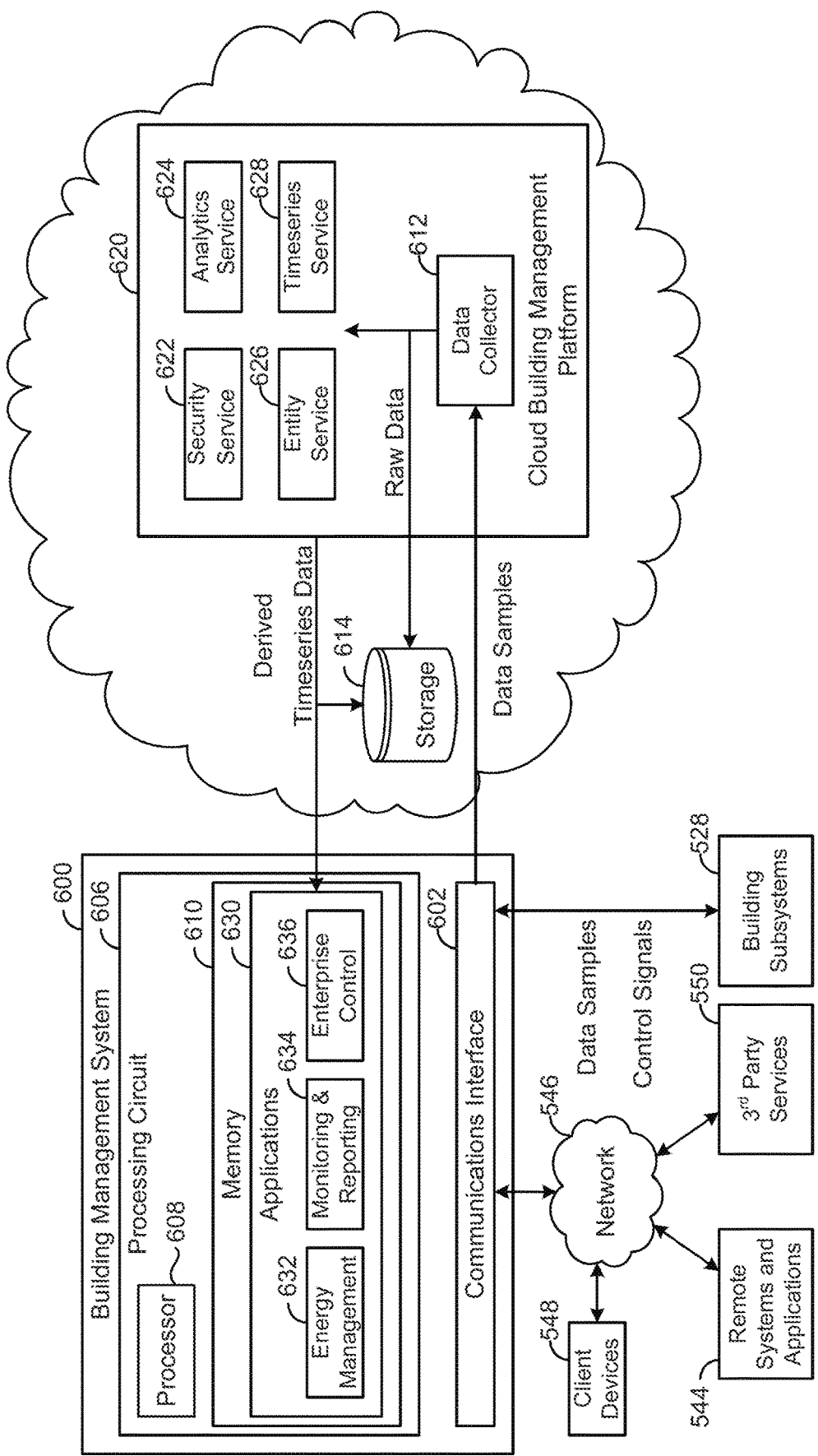
FIG. 6 is a block diagram of another building management system including a timeseries service and an entity service, according to an exemplary embodiment.

Referring now to FIG. 6, a block diagram of another building management system (BMS) 600 is shown, according to some embodiments. BMS 600 can be configured to collect data samples from client devices 548, remote systems and applications 544, $3^{rd}$ party services 550, and/or building subsystems 528, and provide the data samples to Cloud building management platform 620 to generate raw timeseries data, derived timeseries data, and/or entity data from the data samples. In some embodiments, Cloud building management platform 620 may supplement or replace building management platform 102 shown in FIG. 1 or can be implemented separate from building management platform 102. Cloud building management platform 620 can process and transform the data samples to generate derived timeseries data. Throughout this disclosure, the term "derived timeseries data" is used to describe the result or output of a transformation or other timeseries processing operation performed by various services of the building management platform 620 (e.g., data aggregation, data cleansing, virtual point calculation, etc.). The term "entity data" is used to describe the attributes of various smart entities (e.g., IoT systems, devices, components, sensors, and the like) and the relationships between the smart entities. The derived timeseries data can be provided to various applications 630 and/or stored in storage 614 (e.g., as materialized views of the raw timeseries data). In some embodiments, Cloud building management platform 620 separates data collection; data storage, retrieval, and analysis; and data visualization into three different layers. This allows Cloud building management platform 620 to support a variety of applications 630 that use the derived timeseries data and allows new applications 630 to reuse the existing infrastructure provided by Cloud building management platform 620.

It should be noted that the components of BMS 600 and/or Cloud building management platform 620 can be integrated within a single device (e.g., a supervisory controller, a BMS controller, etc.) or distributed across multiple separate systems or devices. In other embodiments, some or all of the components of BMS 600 and/or Cloud building management platform 620 can be implemented as part of a cloud-based computing system configured to receive and process data from one or more building management systems. In other embodiments, some or all of the components of BMS 600 and/or Cloud building management platform 620 can be components of a subsystem level controller (e.g., a HVAC controller), a subplant controller, a device controller (e.g., AHU controller 330, a chiller controller, etc.), a field controller, a computer workstation, a client device, or any other system or device that receives and processes data from building systems and equipment.

BMS 600 (or cloud building management platform 620) can include many of the same components as BMS 500 (e.g., processing circuit 504, processor 506, and/or memory 508), as described with reference to FIG. 5. For example, BMS 600 is shown to include a communications interface 602 (including the BMS interface 509 and the communications interface 507 from FIG. 5). Interface 602 can include wired or wireless communications interfaces (e.g., jacks, antennas, transmitters, receivers, transceivers, wire terminals, etc.) for conducting data communications with client devices 548, remote systems and applications 544, $3^{rd}$ party services 550, building subsystems 528 or other external systems or devices. Communications conducted via interface 602 can be direct (e.g., local wired or wireless communications) or via a communications network 546 (e.g., a WAN, the Internet, a cellular network, etc.).

Communications interface 602 can facilitate communications between BMS 600, Cloud building management platform services 620, building subsystems 528, client devices 548 and external applications (e.g., remote systems and applications 544 and $3^{rd}$ party services 550) for allowing user control, monitoring, and adjustment to BMS 600. BMS 600 can be configured to communicate with building subsystems 528 using any of a variety of building automation systems protocols (e.g., BACnet, Modbus, ADX, etc.). In some embodiments, BMS 600 receives data samples from building subsystems 528 and provides control signals to building subsystems 528 via interface 602. In some embodiments, BMS 600 receives data samples from the $3^{rd}$ party services 550, such as, for example, weather data from a weather service, news data from a news service, documents and other document-related data from a document service, media (e.g., video, images, audio, social media, etc.) from a media service, and/or the like, via interface 602 (e.g., via APIs or any suitable interface).

Building subsystems 528 can include building electrical subsystem 534, information communication technology (ICT) subsystem 536, security subsystem 538, HVAC subsystem 540, lighting subsystem 542, lift/escalators subsystem 532, and/or fire safety subsystem 530, as described with reference to FIG. 5. In various embodiments, building subsystems 528 can include fewer, additional, or alternative subsystems. For example, building subsystems 528 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 528 include waterside system 300 and/or airside system 400, as described with reference to FIGS. 3-4. Each of building subsystems 528 can include any number of devices, controllers, and connections for completing its individual functions and control activities. Building subsystems 528 can include building equipment (e.g., sensors, air handling units, chillers, pumps, valves, etc.) configured to monitor and control a building condition such as temperature, humidity, airflow, etc.

Still referring to FIG. 6, BMS 600 is shown to include a processing circuit 606 including a processor 608 and memory 610. Cloud building management platform 620 may include one or more processing circuits including one or more processors and memory. Each of the processor can be a general purpose or specific purpose processor, an application specific integrated circuit (ASIC), one or more field programmable gate arrays (FPGAs), a group of processing components, or other suitable processing components. Each of the processors is configured to execute computer code or instructions stored in memory or received from other computer readable media (e.g., CDROM, network storage, a remote server, etc.).

Memory can include one or more devices (e.g., memory units, memory devices, storage devices, etc.) for storing data and/or computer code for completing and/or facilitating the various processes described in the present disclosure. Memory can include random access memory (RAM), read-only memory (ROM), hard drive storage, temporary storage, non-volatile memory, flash memory, optical memory, or any other suitable memory for storing software objects and/or computer instructions. Memory can include database components, object code components, script components, or any other type of information structure for supporting the various activities and information structures described in the present disclosure. Memory can be communicably connected to the processors via the processing circuits and can include computer code for executing (e.g., by processor 508) one or more processes described herein.

Still referring to FIG. 6, Cloud building management platform 620 is shown to include a data collector 612. Data collector 612 is shown receiving data samples from $3^{rd}$ party services 550 and building subsystems 528 via interface 602. However, the present disclosure is not limited thereto, and the data collector 612 may receive the data samples directly from the $3^{rd}$ party service 550 or the building subsystems 528 (e.g., via network 546 or via any suitable method). In some embodiments, the data samples include data values for various data points. The data values can be measured and/or calculated values, depending on the type of data point. For example, a data point received from a temperature sensor can include a measured data value indicating a temperature measured by the temperature sensor. A data point received from a chiller controller can include a calculated data value indicating a calculated efficiency of the chiller. A data sample received from a $3^{rd}$ party weather service can include both a measured data value (e.g., current temperature) and a calculated data value (e.g., forecast temperature). Data collector 612 can receive data samples from multiple different devices (e.g., IoT devices, sensors, etc.) within building subsystems 528, and from multiple different $3^{rd}$ party services (e.g., weather data from a weather service, news data from a news service, etc.) of the $3^{rd}$ party services 550.

The data samples can include one or more attributes that describe or characterize the corresponding data points. For example, the data samples can include a name attribute defining a point name or ID (e.g., "B1F4R2.T-Z"), a device attribute indicating a type of device from which the data samples is received (e.g., temperature sensor, humidity sensor, chiller, etc.), a unit attribute defining a unit of measure associated with the data value (e.g., ° F., ° C., kPA, etc.), and/or any other attribute that describes the corresponding data point or provides contextual information regarding the data point. The types of attributes included in each data point can depend on the communications protocol used to send the data samples to BMS 600 and/or Cloud building management platform 620. For example, data samples received via the ADX protocol or BACnet protocol can include a variety of descriptive attributes along with the data value, whereas data samples received via the Modbus protocol may include a lesser number of attributes (e.g., only the data value without any corresponding attributes).

In some embodiments, each data sample is received with a timestamp indicating a time at which the corresponding data value was measured or calculated. In other embodiments, data collector 612 adds timestamps to the data samples based on the times at which the data samples are received. Data collector 612 can generate raw timeseries data for each of the data points for which data samples are received. Each timeseries can include a series of data values for the same data point and a timestamp for each of the data values. For example, a timeseries for a data point provided by a temperature sensor can include a series of temperature values measured by the temperature sensor and the corresponding times at which the temperature values were measured. An example of a timeseries which can be generated by data collector 612 is as follows:
[<key, timestamp$_1$, value$_1$>, <key, timestamp$_2$, value$_2$>, <key, timestamp$_3$, value$_3$>]where key is an identifier of the source of the raw data samples (e.g., timeseries ID, sensor ID, device ID, etc.), timestamp$_i$ identifies the time at which the ith sample was collected, and value$_i$ indicates the value of the ith sample.

Data collector 612 can add timestamps to the data samples or modify existing timestamps such that each data sample includes a local timestamp. Each local timestamp indicates the local time at which the corresponding data sample was measured or collected and can include an offset relative to universal time. The local timestamp indicates the local time at the location the data point was measured at the time of measurement. The offset indicates the difference between the local time and a universal time (e.g., the time at the international date line). For example, a data sample collected in a time zone that is six hours behind universal time can include a local timestamp (e.g., Timestamp=2016-03-18T14:10:02) and an offset indicating that the local timestamp is six hours behind universal time (e.g., Offset=−6:00). The offset can be adjusted (e.g., +1:00 or −1:00) depending on whether the time zone is in daylight savings time when the data sample is measured or collected.

The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs. For example, the offset can be subtracted from the local timestamp to generate a universal time value that corresponds to the local timestamp without referencing an external database and without requiring any other information.

In some embodiments, data collector 612 organizes the raw timeseries data. Data collector 612 can identify a system or device associated with each of the data points. For example, data collector 612 can associate a data point with a temperature sensor, an air handler, a chiller, or any other type of system or device. In some embodiments, a data entity may be created for the data point, in which case, the data collector 612 (e.g., via entity service) can associate the data point with the data entity. In various embodiments, data collector uses the name of the data point, a range of values of the data point, statistical characteristics of the data point, or other attributes of the data point to identify a particular system or device associated with the data point. Data collector 612 can then determine how that system or device relates to the other systems or devices in the building site from entity data. For example, data collector 612 can determine that the identified system or device is part of a larger system (e.g., a HVAC system) or serves a particular space (e.g., a particular building, a room or zone of the building, etc.) from the entity data. In some embodiments, data collector 612 uses or retrieves an entity graph (e.g., via entity service 626) when organizing the timeseries data.

Data collector 612 can provide the raw timeseries data to the services of Cloud building management platform 620 and/or store the raw timeseries data in storage 614. Storage 614 may be internal storage or external storage. For example, storage 614 can be internal storage with relation to Cloud building management platform 620 and/or BMS 600, and/or may include a remote database, cloud-based data hosting, or other remote data storage. Storage 614 can be configured to store the raw timeseries data obtained by data collector 612, the derived timeseries data generated by Cloud building management platform 620, and/or directed acyclic graphs (DAGs) used by Cloud building management platform 620 to process the timeseries data.

Still referring to FIG. 5, Cloud building management platform 620 can receive the raw timeseries data from data collector 612 and/or retrieve the raw timeseries data from storage 614. Cloud building management platform 620 can include a variety of services configured to analyze, process, and transform the raw timeseries data. For example, Cloud building management platform 620 is shown to include a security service 622, an analytics service 624, an entity service 626, and a timeseries service 628. Security service 622 can assign security attributes to the raw timeseries data to ensure that the timeseries data are only accessible to authorized individuals, systems, or applications. Security service 622 may include a messaging layer to exchange secure messages with the entity service 626. In some embodiment, security service 622 may provide permission data to entity service 626 so that entity service 626 can determine the types of entity data that can be accessed by a particular entity or device. Entity service 626 can assign entity information (or entity data) to the timeseries data to associate data points with a particular system, device, or space. Timeseries service 628 and analytics service 624 can apply various transformations, operations, or other functions to the raw timeseries data to generate derived timeseries data.

In some embodiments, timeseries service 628 aggregates predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by timeseries service 628 provide an efficient mechanism for applications 630 to query the timeseries data. For example, applications 630 can construct visualizations of the timeseries data (e.g., charts, graphs, etc.) using the pre-aggregated data rollups instead of the raw timeseries data. This allows applications 630 to simply retrieve and present the pre-aggregated data rollups without requiring applications 630 to perform an aggregation in response to the query. Since the data rollups are pre-aggregated, applications 630 can present the data rollups quickly and efficiently without requiring additional processing at query time to generate aggregated timeseries values.

In some embodiments, timeseries service 628 calculates virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, timeseries service 628 can calculate a virtual data point (pointID$_3$) by adding two or more actual data points (pointID$_1$ and pointID$_2$) (e.g., pointID$_3$=pointID$_1$+pointID$_2$). As another example, timeseries service 628 can calculate an enthalpy data point (pointID$_4$) based on a measured temperature data point (pointID$_5$) and a measured pressure data point (pointID$_6$) (e.g., pointID$_4$=enthalpy(pointID$_5$, pointID$_6$)). The virtual data points can be stored as derived timeseries data.

Applications 630 can access and use the virtual data points in the same manner as the actual data points. Applications 630 may not need to know whether a data point is an actual data point or a virtual data point since both types of data points can be stored as derived timeseries data and can be handled in the same manner by applications 630. In some embodiments, the derived timeseries are stored with attributes designating each data point as either a virtual data point or an actual data point. Such attributes allow applications 630 to identify whether a given timeseries represents a virtual data point or an actual data point, even though both types of data points can be handled in the same manner by applications 630. These and other features of timeseries service 628 are described in greater detail with reference to FIG. 9.

In some embodiments, analytics service 624 analyzes the raw timeseries data and/or the derived timeseries data to detect faults. Analytics service 624 can apply a set of fault detection rules to the timeseries data to determine whether a fault is detected at each interval of the timeseries. Fault detections can be stored as derived timeseries data. For example, analytics service 624 can generate a new fault detection timeseries with data values that indicate whether a fault was detected at each interval of the timeseries. The fault detection timeseries can be stored as derived timeseries data along with the raw timeseries data in storage 614.

In some embodiments, analytics service 624 analyzes the raw timeseries data and/or the derived timeseries data with the entity data to generate alerts or warnings, analyze risks, and determine threats. For example, analytics service 624 can apply probabilistic machine learning methods to model risks associated with an asset. An asset may be any resource or entity type, such as, for example, a person, building, space, system, equipment, device, sensor, and the like. Analytics service 624 can generate a risk score associated with an asset based on model parameters. The model parameters can be automatically updated based on feedback on the accuracy of the risk predictions. For example, the feedback may be explicit (e.g., based on questionnaires, disposition of alerts, and the like) or implicit (e.g., analyzing user actions on each threat or alert to estimate the importance of a particular event, and the like). The risk score may be stored as derived timeseries. For example, analytics service 624 (e.g., via timeseries service 628) can generate a risk score timeseries with data values indicating the risk score at each interval of the timeseries. The risk score timeseries can be stored as derived timeseries data along with the raw timeseries data in storage 614. The risk scores can then be retrieved, for example, by a Risk Dashboard from the timeseries service 628.

Still referring to FIG. 6, BMS 600 is shown to include several applications 630 including an energy management application 632, monitoring and reporting applications 634, and enterprise control applications 636. Although only a few applications 630 are shown, it is contemplated that applications 630 can include any of a variety of suitable applications configured to use the raw or derived timeseries generated by Cloud building management platform 620. In some embodiments, applications 630 exist as a separate layer of BMS 600 (e.g., a part of Cloud building management platform 620 and/or data collector 612). In other embodiments, applications 630 can exist as remote applications that run on remote systems or devices (e.g., remote systems and applications 544, client devices 548, and/or the like).

Applications 630 can use the derived timeseries data to perform a variety data visualization, monitoring, and/or control activities. For example, energy management application 632 and monitoring and reporting application 634 can use the derived timeseries data to generate user interfaces (e.g., charts, graphs, etc.) that present the derived timeseries data to a user. In some embodiments, the user interfaces present the raw timeseries data and the derived data rollups in a single chart or graph. For example, a dropdown selector can be provided to allow a user to select the raw timeseries data or any of the data rollups for a given data point.

Enterprise control application 636 can use the derived timeseries data to perform various control activities. For example, enterprise control application 636 can use the derived timeseries data as input to a control algorithm (e.g., a state-based algorithm, an extremum seeking control (ESC) algorithm, a proportional-integral (PI) control algorithm, a proportional-integral-derivative (PID) control algorithm, a model predictive control (MPC) algorithm, a feedback control algorithm, etc.) to generate control signals for building subsystems 528. In some embodiments, building subsystems 528 use the control signals to operate building equipment. Operating the building equipment can affect the measured or calculated values of the data samples provided to BMS 600 and/or Cloud building management platform 620. Accordingly, enterprise control application 636 can use the derived timeseries data as feedback to control the systems and devices of building subsystems 528.

Cloud Building Management Platform Entity Service

Figure 7:
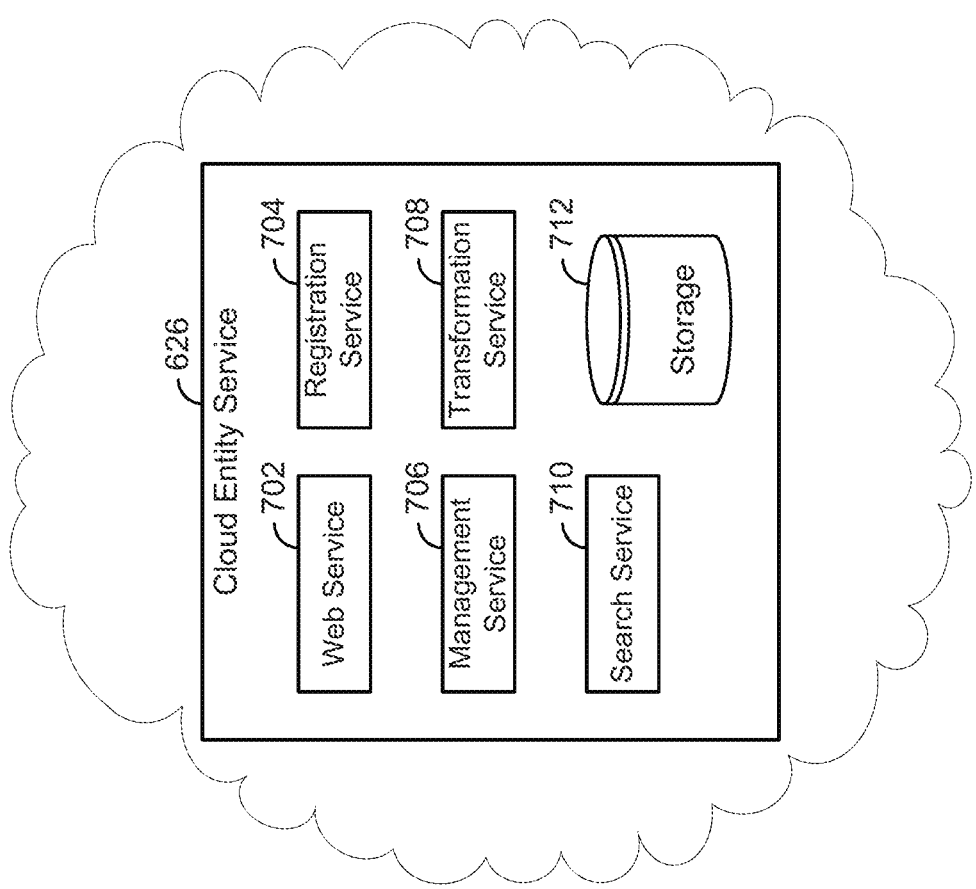
FIG. 7 is a block diagram illustrating the entity service of FIG. 6 in greater detail, according to an exemplary embodiment FIG. 8 in an example entity graph of entity data, according to an exemplary embodiment.

Referring now to FIG. 7, a block diagram illustrating entity service 626 in greater detail is shown, according to some embodiments. Entity service 626 registers and manages various buildings (e.g., 110-140), spaces, persons, subsystems (e.g., 428), devices (e.g., 112-146), and other entities in the Cloud building management platform 620. According to various embodiments, an entity may be any person, place, or physical object, hereafter referred to as an object entity. Further, an entity may be any event, data point, or record structure, hereinafter referred to as data entity. In addition, an entity may define a relationship between entities, hereinafter referred to as a relational entity.

In some embodiments, an object entity may be defined as having at least three types of attributes. For example, an object entity may have a static attribute, a dynamic attribute, and a behavioral attribute. The static attribute may include any unique identifier of the object entity or characteristic of the object entity that either does not change over time or changes infrequently (e.g., a device ID, a person's name or social security number, a place's address or room number, and the like). The dynamic attribute may include a property of the object entity that changes over time (e.g., location, age, measurement, data point, and the like). In some embodiments, the dynamic attribute of an object entity may be linked to a data entity. In this case, the dynamic attribute of the object entity may simply refer to a location (e.g., data/network address) or static attribute (e.g., identifier) of the linked data entity, which may store the data (e.g., the value or information) of the dynamic attribute. Accordingly, in some such embodiments, when a new data point (e.g., timeseries data) is received for the object entity, only the linked data entity may be updated, while the object entity remains unchanged. Therefore, resources that would have been expended to update the object entity may be reduced.

However, the present disclosure is not limited thereto. For example, in some embodiments, there may also be some data that is updated (e.g., during predetermined intervals) in the dynamic attribute of the object entity itself. For example, the linked data entity may be configured to be updated each time a new data point is received, whereas the corresponding dynamic attribute of the object entity may be configured to be updated less often (e.g., at predetermined intervals less than the intervals during which the new data points are received). In some implementations, the dynamic attribute of the object entity may include both a link to the data entity and either a portion of the data from the data entity or data derived from the data of the data entity. For example, in an embodiment in which periodic temperature readings are received from a thermostat, an object entity corresponding to the thermostat could include the last temperature reading and a link to a data entity that stores a series of the last ten temperature readings received from the thermostat.

The behavioral attribute may define a function of the object entity, for example, based on inputs, capabilities, and/or permissions. For example, behavioral attributes may define the types of inputs that the object entity is configured to accept, how the object entity is expected to respond under certain conditions, the types of functions that the object entity is capable of performing, and the like. As a non-limiting example, if the object entity represents a person, the behavioral attribute of the person may be his/her job title or job duties, user permissions to access certain systems or locations, expected location or behavior given a time of day, tendencies or preferences based on connected activity data received by entity service 626 (e.g., social media activity), and the like. As another non-limiting example, if the object entity represents a device, the behavioral attributes may include the types of inputs that the device can receive, the types of outputs that the device can generate, the types of controls that the device is capable of, the types of software or versions that the device currently has, known responses of the device to certain types of input (e.g., behavior of the device defined by its programming), and the like.

In some embodiments, the data entity may be defined as having at least a static attribute and a dynamic attribute. The static attribute of the data entity may include a unique identifier or description of the data entity. For example, if the data entity is linked to a dynamic attribute of an object entity, the static attribute of the data entity may include an identifier that is used to link to the dynamic attribute of the object entity. In some embodiments, the dynamic attribute of the data entity represents the data for the dynamic attribute of the linked object entity. In some embodiments, the dynamic attribute of the data entity may represent some other data that is derived, analyzed, inferred, calculated, or determined based on data from data sources.

In some embodiments, the relational entity may be defined as having at least a static attribute. The static attribute of the relational entity may semantically define the type of relationship between two or more entities. For example, in a non-limiting embodiment, a relational entity for a relationship that semantically defines that Entity A has a part of Entity B, or that Entity B is a part of Entity A may include:

hasPart{Entity A, Entity B} where the static attribute hasPart defines what the relationship is of the listed entities, and the order of the listed entities or data field of the relational entity specifies which entity is the part of the other (e.g., Entity A→hasPart→Entity B).

In various embodiments, the relational entity is an object-oriented construct with predefined fields that define the relationship between two or more entities, regardless of the type of entities. For example, Cloud building management platform 620 can provide a rich set of pre-built entity models with standardized relational entities that can be used to describe how any two or more entities are semantically related, as well as how data is exchanged and/or processed between the entities. Accordingly, a global change to a definition or relationship of a relational entity at the system level can be effected at the object level, without having to manually change the entity relationships for each object or entity individually. Further, in some embodiments, a global change at the system level can be propagated through to third-party applications integrated with Cloud building management platform 620 such that the global change can be implemented across all of the third-party applications without requiring manual implementation of the change in each disparate application.

Figure 8:
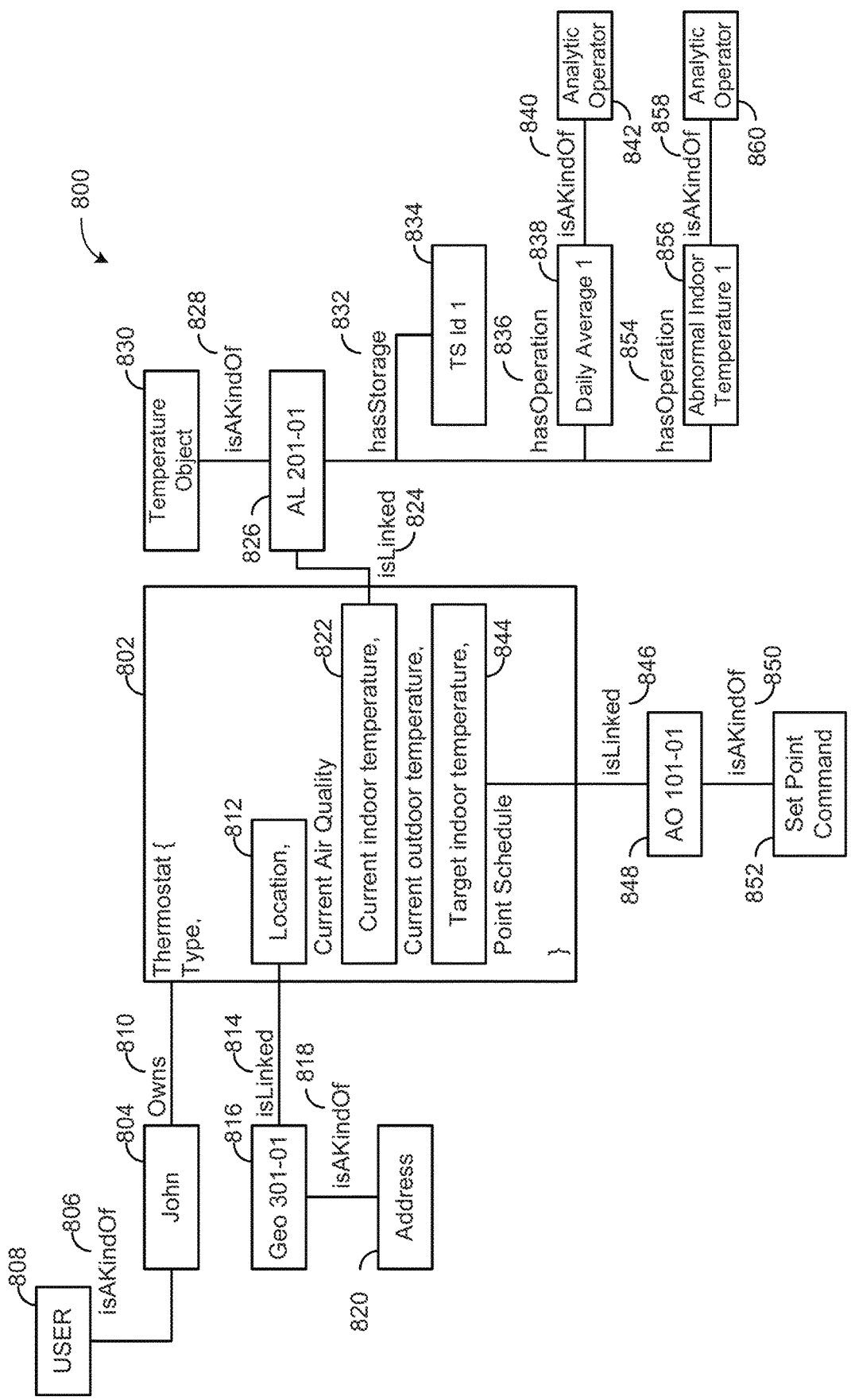

For example, referring to FIG. 8, an example entity graph of entity data is shown, according to some embodiments. The term "entity data" is used to describe the attributes of various entities and the relationships between the entities. For example, entity data may be represented in the form of an entity graph. In some embodiments, entity data includes any suitable predefined data models (e.g., as a table, JSON data, and/or the like), such as entity type or object, and further includes one or more relational entities that semantically define the relationships between the entities. The relational entities may help to semantically define, for example, hierarchical or directed relationships between the entities (e.g., entity X controls entity Y, entity A feeds entity B, entity 1 is located in entity 2, and the like). For example, an object entity (e.g., IoT device) may be represented by entity type or object, which generally describes how data corresponding to the entity will be structured and stored.

For example, an entity type (or object) "Thermostat" may be represented via the below schema:

---

Thermostat{
    Type,
    Model No,
    Device Name,
    Manufactured date,
    Serial number,
    MAC address,
    Location,
    Current air quality,
    Current indoor temperature,
    Current outdoor temperature,
    Target indoor temperature,
    Point schedule (e.g., BACnet schedule object)
}

--- where various attributes are static attributes (e.g., "Type," "Model Number," "Device Name," etc.,), dynamic attributes (e.g., "Current air quality," "Current outdoor temperature," etc.), or behavioral attributes (e.g., "Target indoor temperature," etc.) for the object entity "thermostat." In a relational database, the object "Thermostat" is a table name, and the attributes represents column names.

An example of an object entity data model for a person named John Smith in a relational database may be represented by the below table:

| First Name | Last Name | Tel. No. | Age | Location | Job Title |
|---|---|---|---|---|---|
| John | Smith | (213)220-XXXX | 36 | Home | Engineer | where various attributes are static attributes (e.g., "First Name," "Last Name," etc.,), dynamic attributes (e.g., "Age," "Location," etc.), or behavioral attributes (e.g., "Engineer") for the object entity "John Smith."

An example data entity for the data point "Current indoor temperature" for the "Thermostat" owned by John Smith in a relational database may be represented by the below table:

| Present-Value | Description | Device_Type | Unit of measure |
|---|---|---|---|
| 68 | "Current indoor temperature of John's house" | Thermostat | Degrees-F. | where various attributes are static attributes (e.g., "Description" and "Device_Type") and dynamic attributes (e.g., "Present-Value").

While structuring the entities via entity type or object may help to define the data representation of the entities, these data models do not provide information on how the entities relate to each other. For example, a BMS, building subsystem, or device may need data from a plurality of sources as well as information on how the sources relate to each other in order to provide a proper decision, action, or recommendation. Accordingly, in various embodiments, the entity data further includes the relational entities to semantically define the relationships between the entities, which may help to increase speeds in analyzing data, as well as provide ease of navigation and browsing.

For example, still referring to FIG. 8, an entity graph 800 for the Thermostat object entity 802 includes various class entities (e.g., User, Address, SetPoint Command, and Temperature Object), relational entities (e.g., isAKindOf, Owns, isLinked, hasStorage, and hasOperation), and data entities (AI 201-01, TS ID 1, Daily Average 1, Abnormal indoor temp 1, AO 101-1, and Geo 301-01). The relational entities describe the relationships between the various class, object, and data entities in a semantic and syntactic manner, so that an application or user viewing the entity graph 800 can quickly determine the relationships and data process flow of the Thermostat object entity 802, without having to resort to a data base analyst or engineer to create, index, and/or manage the entities (e.g., using SQL or NoSQL).

For example, the entity graph 800 shows that a person named John (object entity) 804 isAKindOf (relational entity) 806 User (class entity) 808. John 804 Owns (relational entity) 810 the Thermostat 802. The Thermostat 802 has a location attribute (dynamic attribute) 812 that isLinked (relational entity) 814 to Geo 301-01 (data entity) 816, which isAKindOf (relational entity) 818 an Address (class entity) 820. Accordingly, Geo 301-01 316 should have a data point corresponding to an address.

The Thermostat 802 further includes a "Current indoor temperature" attribute (dynamic attribute) 822 that isLinked (relational entity) 824 to AI 201-01 (data entity) 826. AI 201-01 826 isAKindOf (relational entity) 828 Temperature Object (class entity) 830. Thus, AI 201-01 826 should contain some sort of temperature related data. AI 201-01 826 hasStorage (relational entity) 832 at TS ID 1 (data entity) 834, which may be raw or derived timeseries data for the temperature readings. AI 201-01 826 hasOperation (relational entity) 836 of Daily Average 1 (data entity) 838, which isAKindOf (relational entity) 840 Analytic Operator (class entity) 842. Thus, Daily Average 1 results from an analytic operation that calculates the daily average of the indoor temperature. AI 201-01 826 further hasOperation (relational entity) 854 of Abnormal Indoor Temperature (data entity) 856, which isAKindOf (relational entity) 858 Analytic Operator (class entity) 860. Accordingly, Abnormal Indoor Temperature results from an analytic operation to determine an abnormal temperature (e.g., exceeds or falls below a threshold value).

In this example, the data entity AI 201-01 526 may be represented by the following data model:

```
point {
    name: "AI 201-01";
    type: "analog input";
    value: 72;
    unit: "Degree-F";
    source: "Temperature Sensor 1"
}
``` where "point" is an example of a data entity that may be created by Cloud building management platform 620 to hold the value for the linked "Current indoor temperature" 822 dynamic attribute of the Thermostat entity 802, and source is the sensor or device in the Thermostat device that provides the data to the linked "Current indoor temperature" 822 dynamic attribute.

The data entity TS Id 1 534 may be represented, for example, by the following data model:

```
timeseries {
    name: "TS Id 1";
    type: "Daily Average";
    values: "[68, 20666, 70, 69, 71];
    unit: "Degree-F";
    point: "AI 201-01";
    source: "Daily Average 1"
}
``` where the data entity Daily Average 1 838 represents a specific analytic operator used to create the data entity for the average daily timeseries TS Id 1 834 based on the values of the corresponding data entity for point AI 201-01 826. The relational entity hasOperation shows that the AI 201-01 data entity 826 is used as an input to the specific logic/math operation represented by Daily Average 1 838. TS Id 1 834 might also include an attribute that identifies the analytic operator Daily Average 1 838 as the source of the data samples in the timeseries.

Still referring to FIG. 8, the entity graph 800 for Thermostat 802 shows that the "Target indoor temperature" attribute (dynamic attribute) 844 isLinked (relational attribute) 846 to the data entity AO 101-01 (data entity) 848. AO 101-01 data entity 848 isAKindOf (relational attribute) 850

SetPoint Command (class entity) 852. Thus, the data in data entity AO 101-01 848 may be set via a command by the user or other entity, and may be used to control the Thermostat object entity 802. Accordingly, in various embodiments, entity graph 800 provides a user friendly view of the various relationships between the entities and data processing flow, which provides for ease of navigation, browsing, and analysis of data.

Referring again to FIG. 7, entity service 626 may transform raw data samples and/or raw timeseries data into data corresponding to entity data. For example, as discussed above with reference to FIG. 8, entity service 626 can create data entities that use and/or represent data points in the timeseries data. Entity service 626 includes a web service 702, a registration service 704, a management service 706, a transformation service 708, a search service 710, and storage 712. In some embodiments, storage 712 may be internal storage or external storage. For example, storage 712 may be storage 614 (see FIG. 6), internal storage with relation to entity service 626, and/or may include a remote database, cloud-based data hosting, or other remote data storage.

Web service 702 can be configured to interact with web-based applications to send entity data and/or receive raw data (e.g., data samples, timeseries data, and the like). For example, web service 702 can provide an interface (e.g., API, UI/UX, and the like) to manage (e.g., register, create, edit, delete, and/or update) an entity (e.g., class entity, object entity, data entity, relational entity, and/or the like). In some embodiments, web service 702 provides entity data to web-based applications. For example, if one or more of applications 630 are web-based applications, web service 702 can provide entity data to the web-based applications. In some embodiments, web service 702 receives raw data samples and/or raw timeseries data including device information from a web-based data collector, or a web-based security service to identify authorized entities and to exchange secured messages. For example, if data collector 612 is a web-based application, web service 702 can receive the raw data samples and/or timeseries data including a device attribute indicating a type of device (e.g., IoT device) from which the data samples and/or timeseries data are received from data collector 612. In some embodiments, web service 702 may message security service 622 to request authorization information and/or permission information of a particular user, building, BMS, building subsystem, device, application, or other entity. In some embodiments, web service 702 receives derived timeseries data from timeseries service 628, and/or may provide entity data to timeseries service 628. In some embodiments, the entity service 626 processes and transforms the collected data to generate the entity data.

The registration service 704 can perform registration of devices and entities. For example, registration service 704 can communicate with building subsystems 528 and client devices 548 (e.g., via web service 702) to register each entity (e.g., building, BMS, building subsystems, devices, and the like) with Cloud building management platform 620. In some embodiments, registration service 704 registers a particular building subsystem 528 (or the devices therein) with a specific user and/or a specific set of permissions and/or entitlements. For example, a user may register a device key and/or a device ID associated with the device via a web portal (e.g., web service 702). In some embodiments, the device ID and the device key may be unique to the device. The device ID may be a unique number associated with the device such as a unique alphanumeric string, a serial number of the device, and/or any other static identifier. In various embodiments, the device is provisioned by a manufacturer and/or any other entity. In various embodiments, the device key and/or device ID are saved to the device or building subsystem 528 based on whether the device includes a trusted platform module (TPM). If the device includes a TPM, the device or building subsystem 528 may store the device key and/or device ID according to the protocols of the TPM. If the device does not include a TPM, the device or building subsystem 528 may store the device key and/or device ID in a file and/or file field which may be stored in a secure storage location. Further, in some embodiments, the device ID may be stored with BIOS software of the device. For example, a serial number of BIOS software may become and/or may be updated with the device ID.

In various embodiments, the device key and/or the device ID are uploaded to registration service 704 (e.g., an IoT hub such as AZURE® IoT Hub). In some embodiments, registration service 704 is configured to store the device key and the device ID in secure permanent storage and/or may be stored by security service 622 (e.g., by a security API). In some embodiments, a manufacturer and/or any other individual may register the device key and the device ID with registration service 704 (e.g., via web service 702). In various embodiments, the device key and the device ID are linked to a particular profile associated with the building subsystem 528 or device and/or a particular user profile (e.g., a particular user). In this regard, a device (or building subsystem 528) can be associated with a particular user. In various embodiments, the device key and the device ID make up the profile for device. The profile may be registered as a device that has been manufactured and/or provisioned but has not yet been purchased by an end user.

In various embodiments, registration service 704 adds and/or updates a device in an building hub device registry. In various embodiments, registration service 704 may determine if the device is already registered, can set various authentication values (e.g., device ID, device key), and can update the building hub device registry. In a similar manner, registration service 704 can update a document database with the various device registration information.

In some embodiments, registration service 704 can be configured to create a virtual representation (e.g., "digital twins" or "shadow records") of each object entity (e.g., person, room, building subsystem, device, and the like) in the building within Cloud building management platform 620. In some embodiments, the virtual representations are smart entities that include attributes defining or characterizing the corresponding object and are associated to the corresponding object entity via relational entities defining the relationship of the object and the smart entity representation thereof. In some embodiments, the virtual representations maintain shadow copies of the object entities with versioning information so that entity service 626 can store not only the most recent update of an attribute (e.g., a dynamic attribute) associated with the object, but records of previous states of the attributes (e.g., dynamic attributes) and/or entities. For example, the shadow record may be created as a type of data entity that is related to a linked data entity corresponding to the dynamic attribute of the object entity (e.g., the person, room, building subsystem, device, and the like). For example, the shadow entity may be associated with the linked data entity via a relational entity (e.g., isLinked, hasStorage, hasOperation, and the like). In this case, the shadow entity may be used to determine additional analytics for the data point of the dynamic attribute. For example, the shadow entity may be used to determine an average value, an expected value, or an abnormal value of the data point from the dynamic attribute.

Management service 706 may create, modify, or update various attributes, data entities, and/or relational entities of the objects managed by entity service 626 for each entity rather than per class or type of entity. This allows for separate processing/analytics for each individual entity rather than only to a class or type of entity. Some attributes (or data entities) may correspond to, for example, the most recent value of a data point provided to BMS 600 or Cloud building management platform 620 via the raw data samples and/or timeseries data. For example, the "Current indoor temperature" dynamic attribute of the "Thermostat" object entity 802 in the example discussed above may be the most recent value of indoor temperature provided by the Thermostat device. Management service 706 can use the relational entities of the entity data for Thermostat to determine where to update the data of the attribute.

For example, Management service 706 may determine that a data entity (e.g., AI 201-01) is linked to the "Current indoor temperature" dynamic attribute of Thermostat via an isLinked relational entity. In this case, Management service 706 may automatically update the attribute data in the linked data entity. Further, if a linked data entity does not exist, Management service 706 can create a data entity (e.g., AI 201-01) and an instance of the isLinked relational entity 824 to store and link the "Current indoor temperature" dynamic attribute of Thermostat therein. Accordingly, processing/analytics for Thermostat 802 may be automated. As another example, a "most recent view" attribute (or linked data entity) of a webpage object entity may indicate the most recent time at which the webpage was viewed. Management service 706 can use the entity data from a related click tracking system object entity or web server object entity to determine when the most recent view occurred and can automatically update the "most recent view" attribute (or linked data entity) of the webpage entity accordingly.

Other data entities and/or attributes may be created and/or updated as a result of an analytic, transformation, calculation, or other processing operation based on the raw data and/or entity data. For example, Management service 706 can use the relational entities in entity data to identify a related access control device (e.g., a card reader, a keypad, etc.) at the entrance/exit of a building object entity. Management service 706 can use raw data received from the identified access control device to track the number of occupants entering and exiting the building object entity (e.g., via related card entities used by the occupants to enter and exit the building). Management service 706 can update a "number of occupants" attribute (or corresponding data entity) of the building object each time a person enters or exits the building using a related card entity, such that the "number of occupants" attribute (or data entity) reflects the current number of occupants within the building object. As another example, a "total revenue" attribute associated with a product line object may be the summation of all the revenue generated from related point of sales entities. Management service 706 can use the raw data received from the related point of sales entities to determine when a sale of the product occurs, and can identify the amount of revenue generated by the sales. Management service 706 can then update the "total revenue" attribute (or related data entity) of the product line object by adding the most recent sales revenue from each of the related point of sales entities to the previous value of the attribute.

In some embodiments, management service 706 may use derived timeseries data generated from timeseries service 628 to update or create a data entity (e.g., Daily Average 1) that uses or stores the data points in the derived timeseries data. For example, the derived timeseries data may include a virtual data point corresponding to the daily average steps calculated by timeseries service 628, and management service 706 may update the data entity or entities that store or use the data corresponding to the virtual data point as determined via the relational entities. In some embodiments, if a data entity corresponding to the virtual data point does not exist, management service 706 may automatically create a corresponding data entity and one or more relational entities that describe the relationship between the corresponding data entity and other entities.

In some embodiments, management service 706 uses entity data and/or raw data from multiple different data sources to update the attributes (or corresponding data entities) of various object entities. For example, an object entity representing a person (e.g., a person's cellular device or other related object entity) may include a "risk" attribute that quantifies the person's level of risk attributable to various physical, environmental, or other conditions. Management service 706 can use relational entities of the person object entity to identify a related card device and/or a related card reader from a related building object entity (e.g., the building in which the person works) to determine the physical location of the person at any given time. Management service 706 can determine from raw data (e.g., time that the card device was scanned by the card reader) or derived timeseries data (e.g., average time of arrival) whether the person object is located in the building or may be in transit to the building. Management service 706 can associate weather data from a weather service in the region in which the building object entity is located with the building object entity, and analytics service 624 can generate a risk score for the possibility that any severe weather is approaching the person's location based on the associated weather data, building entity, and person entity. Similarly, management service 706 can associate building data from related building entities with the building object entity, and analytics service 624 can determine whether the building in which the person is located is experiencing any emergency conditions (e.g., fire, building lockdown, etc.) or environmental hazards (e.g., detected air contaminants, pollutants, extreme temperatures, etc.) that could increase the person's level of risk. Management service 706 can provide these and other types of data to analytics service 624 as inputs to a risk function that calculates the value of the person object's "risk" attribute and can update the person object (or related device entity of the person object) accordingly.

In some embodiments, management service 706 can be configured to synchronize configuration settings, parameters, and other device-specific or object-specific information between the entities and Cloud building management platform 620. In some embodiments, the synchronization occurs asynchronously. Management service 706 can be configured to manage device properties dynamically. The device properties, configuration settings, parameters, and other device-specific information can be synchronized between the smart entities created by and stored within Cloud building management platform 620.

In some embodiments, management service 706 is configured to manage a manifest for each of the building subsystems 528 (or devices therein). The manifest may include a set of relationships between the building subsystems 528 and various entities. Further, the manifest may indicate a set of entitlements for the building subsystems 528 and/or entitlements of the various entities and/or other entities. The set of entitlements may allow a BMS 600, building subsystem 528 and/or a user to perform certain actions within the building or (e.g., control, configure, monitor, and/or the like).

Still referring to FIG. 7, transformation service 708 can provide data virtualization, and can transform various predefined standard data models for entities in a same class or type to have the same entity data structure, regardless of the object, device, or Thing that the entity represents. For example, each object entity under an object class may include a location attribute, regardless of whether or not the location attribute is used or even generated. Thus, if an application is later developed requiring that each object entity includes a location attribute, manual mapping of heterogeneous data of different entities in the same class may be avoided. Accordingly, interoperability and scalability of applications may be improved.

In some embodiments, transformation service 708 can provide entity matching, cleansing, and correlation so that a unified cleansed view of the entity data including the entity related information (e.g., relational entities) can be provided. Transformation service 708 can support semantic and syntactic relationship description in the form of standardized relational entities between the various entities. This may simplify machine learning because the relational entities themselves provide all the relationship description between the other entities. Accordingly, the rich set of pre-built entity models and standardized relational entities may provide for rapid application development and data analytics.

Still referring to FIG. 7, the search service 710 provides a unified view of product related information in the form of the entity graph, which correlates entity relationships (via relational entities) among multiple data sources (e.g., CRM, ERP, MRP and the like). In some embodiments, the search service 710 is based on a schema-less and graph based indexing architecture. The search service 710 facilitates simple queries without having to search multiple levels of the hierarchical tree of the entity graph. For example, search service 710 can return results based on searching of entity type, individual entities, attributes, or even relational entities without requiring other levels or entities of the hierarchy to be searched.

Timeseries Data Platform Service

Figure 9:
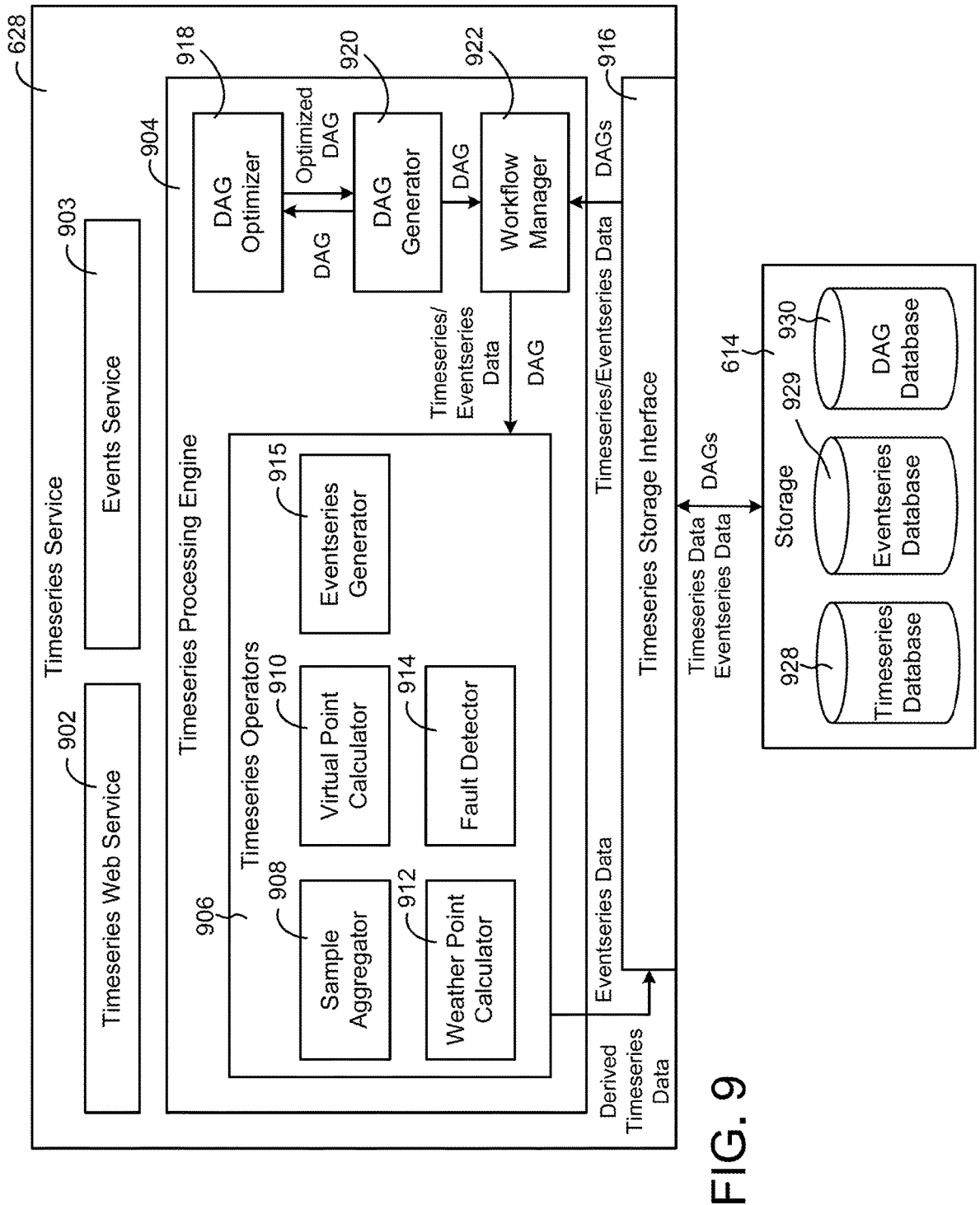
FIG. 9 is a block diagram illustrating the timeseries service of FIG. 6 in greater detail, according to an exemplary embodiment.

Referring now to FIG. 9, a block diagram illustrating timeseries service 628 in greater detail is shown, according to some embodiments. Timeseries service 628 is shown to include a timeseries web service 902, an events service 903, a timeseries processing engine 904, and a timeseries storage interface 916. Timeseries web service 902 can be configured to interact with web-based applications to send and/or receive timeseries data. In some embodiments, timeseries web service 902 provides timeseries data to web-based applications. For example, if one or more of applications 630 are web-based applications, timeseries web service 902 can provide derived timeseries data and/or raw timeseries data to the web-based applications. In some embodiments, timeseries web service 902 receives raw timeseries data from a web-based data collector. For example, if data collector 612 is a web-based application, timeseries web service 902 can receive raw data samples or raw timeseries data from data collector 612. In some embodiments, timeseries web service 902 and entity service web service 702 may be integrated as parts of the same web service.

Timeseries storage interface 916 can be configured to store and read samples of various timeseries (e.g., raw timeseries data and derived timeseries data) and eventseries (described in greater detail below). Timeseries storage interface 916 can interact with storage 614. For example, timeseries storage interface 916 can retrieve timeseries data from a timeseries database 928 within storage 614. In some embodiments, timeseries storage interface 916 reads samples from a specified start time or start position in the timeseries to a specified stop time or a stop position in the timeseries. Similarly, timeseries storage interface 916 can retrieve eventseries data from an eventseries database 929 within storage 614. Timeseries storage interface 916 can also store timeseries data in timeseries database 928 and can store eventseries data in eventseries database 929. Advantageously, timeseries storage interface 916 provides a consistent interface which enables logical data independence.

In some embodiments, timeseries storage interface 916 stores timeseries as lists of data samples, organized by time. For example, timeseries storage interface 916 can store timeseries in the following format:

[<key, timestamp$_1$, value$_1$>, <key, timestamp$_2$, value$_2$>, <key, timestamp$_3$, value$_3$>]

where key is an identifier of the source of the data samples (e.g., timeseries ID, sensor ID, device ID, etc.), timestamp$_i$ identifies a time associated with the ith sample, and value$_i$ indicates the value of the ith sample.

In some embodiments, timeseries storage interface 916 stores eventseries as lists of events having a start time, an end time, and a state. For example, timeseries storage interface 916 can store eventseries in the following format:

[<eventID$_1$, start_timestamp$_1$, end_timestamp$_1$, state$_1$>, . . . , <eventID$_N$, start_timestamp$_N$, end_timestamp$_N$, state$_N$>]

where eventID$_i$ is an identifier of the ith event, start_timestamp$_i$ is the time at which the ith event started, end_timestamp$_i$ is the time at which the ith event ended, state$_i$ describes a state or condition associated with the ith event (e.g., cold, hot, warm, etc.), and N is the total number of events in the eventseries.

In some embodiments, timeseries storage interface 916 stores timeseries and eventseries in a tabular format. Timeseries storage interface 916 can store timeseries and eventseries in various tables having a column for each attribute of the timeseries/eventseries samples (e.g., key, timestamp, value). The timeseries tables can be stored in timeseries database 928, whereas the eventseries tables can be stored in eventseries database 929. In some embodiments, timeseries storage interface 916 caches older data to storage 614 but stores newer data in RAM. This may improve read performance when the newer data are requested for processing.

In some embodiments, timeseries storage interface 916 omits one or more of the attributes when storing the timeseries samples. For example, timeseries storage interface 916 may not need to repeatedly store the key or timeseries ID for each sample in the timeseries. In some embodiments, timeseries storage interface 916 omits timestamps from one or more of the samples. If samples of a particular timeseries have timestamps at regular intervals (e.g., one sample each minute), timeseries storage interface 916 can organize the samples by timestamps and store the values of the samples in a row. The timestamp of the first sample can be stored along with the interval between the timestamps. Timeseries storage interface 916 can determine the timestamp of any sample in the row based on the timestamp of the first sample and the position of the sample in the row.

In some embodiments, timeseries storage interface 916 stores one or more samples with an attribute indicating a change in value relative to the previous sample value. The change in value can replace the actual value of the sample when the sample is stored in timeseries database 928. This allows timeseries storage interface 916 to use fewer bits when storing samples and their corresponding values. Timeseries storage interface 916 can determine the value of any sample based on the value of the first sample and the change in value of each successive sample.

In some embodiments, timeseries storage interface 916 invokes entity service 626 to create data entities in which samples of timeseries data and/or eventseries data can be stored. The data entities can include JSON objects or other types of data objects to store one or more timeseries samples and/or eventseries samples. Timeseries storage interface 916 can be configured to add samples to the data entities and read samples from the data entities. For example, timeseries storage interface 916 can receive a set of samples from data collector 612, entity service 626, timeseries web service 902, events service 903, and/or timeseries processing engine 904. Timeseries storage interface 916 can add the set of samples to a data entity by sending the samples to entity service 626 to be stored in the data entity, for example, or may directly interface with the data entity to add/modify the sample to the data entity.

Timeseries storage interface 916 can use data entities when reading samples from storage 614. For example, timeseries storage interface 916 can retrieve a set of samples from storage 614 or from entity service 626, and add the samples to a data entity (e.g., directly or via entity service 626). In some embodiments, the set of samples include all samples within a specified time period (e.g., samples with timestamps in the specified time period) or eventseries samples having a specified state. Timeseries storage interface 916 can provide the samples in the data entity to timeseries web service 902, events service 903, timeseries processing engine 904, applications 630, and/or other components configured to use the timeseries/eventseries samples.

Still referring to FIG. 9, timeseries processing engine 904 is shown to include several timeseries operators 906. Timeseries operators 906 can be configured to apply various operations, transformations, or functions to one or more input timeseries to generate output timeseries and/or eventseries. The input timeseries can include raw timeseries data and/or derived timeseries data. Timeseries operators 906 can be configured to calculate aggregate values, averages, or apply other mathematical operations to the input timeseries. In some embodiments, timeseries operators 906 generate virtual point timeseries by combining two or more input timeseries (e.g., adding the timeseries together), creating multiple output timeseries from a single input timeseries, or applying mathematical operations to the input timeseries. In some embodiments, timeseries operators 906 perform data cleansing operations or deduplication operations on an input timeseries. In some embodiments, timeseries operators 906 use the input timeseries to generate eventseries based on the values of the timeseries samples. The output timeseries can be stored as derived timeseries data in storage 614 as one or more timeseries data entities. Similarly, the eventseries can be stored as eventseries data entities in storage 614.

In some embodiments, timeseries operators 906 do not change or replace the raw timeseries data, but rather generate various "views" of the raw timeseries data (e.g., as separate data entities) with corresponding relational entities defining the relationships between the raw timeseries data entity and the various views data entities. The views can be queried in the same manner as the raw timeseries data. For example, samples can be read from the raw timeseries data entity, transformed to create the view entity, and then provided as an output. Because the transformations used to create the views can be computationally expensive, the views can be stored as "materialized view" data entities in timeseries database 928. Instances of relational entities can be created to define the relationship between the raw timeseries data entity and the materialize view data entities. These materialized views are referred to as derived data timeseries throughout the present disclosure.

Timeseries operators 906 can be configured to run at query time (e.g., when a request for derived data timeseries is received) or prior to query time (e.g., when new raw data samples are received, in response to a defined event or trigger, etc.). This flexibility allows timeseries operators 906 to perform some or all of their operations ahead of time and/or in response to a request for specific derived data timeseries. For example, timeseries operators 906 can be configured to pre-process one or more timeseries that are read frequently to ensure that the timeseries are updated whenever new data samples are received, and the pre-processed timeseries may be stored in a corresponding data entity for retrieval. However, timeseries operators 906 can be configured to wait until query time to process one or more timeseries that are read infrequently to avoid performing unnecessary processing operations.

In some embodiments, timeseries operators 906 are triggered in a particular sequence defined by a directed acyclic graph (DAG). The DAG may define a workflow or sequence of operations or transformations to apply to one or more input timeseries. For example, the DAG for a raw data timeseries may include a data cleansing operation, an aggregation operation, and a summation operation (e.g., adding two raw data timeseries to create a virtual point timeseries). The DAGs can be stored in a DAG database 930 within storage 614, or internally within timeseries processing engine 904. DAGs can be retrieved by workflow manager 922 and used to determine how and when to process incoming data samples. Exemplary systems and methods for creating and using DAGs are described in greater detail below.

Timeseries operators 906 can perform aggregations for dashboards, cleansing operations, logical operations for rules and fault detection, machine learning predictions or classifications, call out to external services, or any of a variety of other operations which can be applied to timeseries data. The operations performed by timeseries operators 906 are not limited to timeseries data. Timeseries operators 906 can also operate on event data or function as a billing engine for a consumption or tariff-based billing system. Timeseries operators 906 are shown to include a sample aggregator 908, a virtual point calculator 910, a weather point calculator 912, a fault detector 914, and an eventseries generator 915.

Still referring to FIG. 9, timeseries processing engine 904 is shown to include a DAG optimizer 918. DAG optimizer 918 can be configured to combine multiple DAGs or multiple steps of a DAG to improve the efficiency of the operations performed by timeseries operators 906. For example, suppose that a DAG has one functional block which adds "Timeseries A" and "Timeseries B" to create "Timeseries C" (i.e., A+B=C) and another functional block which adds "Timeseries C" and "Timeseries D" to create "Timeseries E" (i.e., C+D=E). DAG optimizer 918 can combine these two functional blocks into a single functional block which computes "Timeseries E" directly from "Timeseries A," "Timeseries B," and "Timeseries D" (i.e., E=A+B+D). Alternatively, both "Timeseries C" and "Timeseries E" can be computed in the same functional block to reduce the number of independent operations required to process the DAG.

In some embodiments, DAG optimizer 918 combines DAGs or steps of a DAG in response to a determination that multiple DAGs or steps of a DAG will use similar or shared inputs (e.g., one or more of the same input timeseries). This allows the inputs to be retrieved and loaded once rather than performing two separate operations that both load the same inputs. In some embodiments, DAG optimizer 918 schedules timeseries operators 906 to nodes where data is resident in memory in order to further reduce the amount of data required to be loaded from the timeseries database 928.

Timeseries processing engine 904 is shown to include a directed acyclic graph (DAG) generator 920. DAG generator 920 can be configured to generate one or more DAGs for each raw data timeseries. Each DAG may define a workflow or sequence of operations which can be performed by timeseries operators 906 on the raw data timeseries. When new samples of the raw data timeseries are received, workflow manager 922 can retrieve the corresponding DAG and use the DAG to determine how the raw data timeseries should be processed. In some embodiments, the DAGs are declarative views which represent the sequence of operations applied to each raw data timeseries. The DAGs may be designed for timeseries rather than structured query language (SQL).

In some embodiments, DAGs apply over windows of time. For example, the timeseries processing operations defined by a DAG may include a data aggregation operation that aggregates a plurality of raw data samples having timestamps within a given time window. The start time and end time of the time window may be defined by the DAG and the timeseries to which the DAG is applied. The DAG may define the duration of the time window over which the data aggregation operation will be performed. For example, the DAG may define the aggregation operation as an hourly aggregation (i.e., to produce an hourly data rollup timeseries), a daily aggregation (i.e., to produce a daily data rollup timeseries), a weekly aggregation (i.e., to produce a weekly data rollup timeseries), or any other aggregation duration. The position of the time window (e.g., a specific day, a specific week, etc.) over which the aggregation is performed may be defined by the timestamps of the data samples of timeseries provided as an input to the DAG.

In operation, sample aggregator 908 can use the DAG to identify the duration of the time window (e.g., an hour, a day, a week, etc.) over which the data aggregation operation will be performed. Sample aggregator 908 can use the timestamps of the data samples in the timeseries provided as an input to the DAG to identify the location of the time window (i.e., the start time and the end time). Sample aggregator 908 can set the start time and end time of the time window such that the time window has the identified duration and includes the timestamps of the data samples. In some embodiments, the time windows are fixed, having predefined start times and end times (e.g., the beginning and end of each hour, day, week, etc.). In other embodiments, the time windows may be sliding time windows, having start times and end times that depend on the timestamps of the data samples in the input timeseries.

Figure 10:
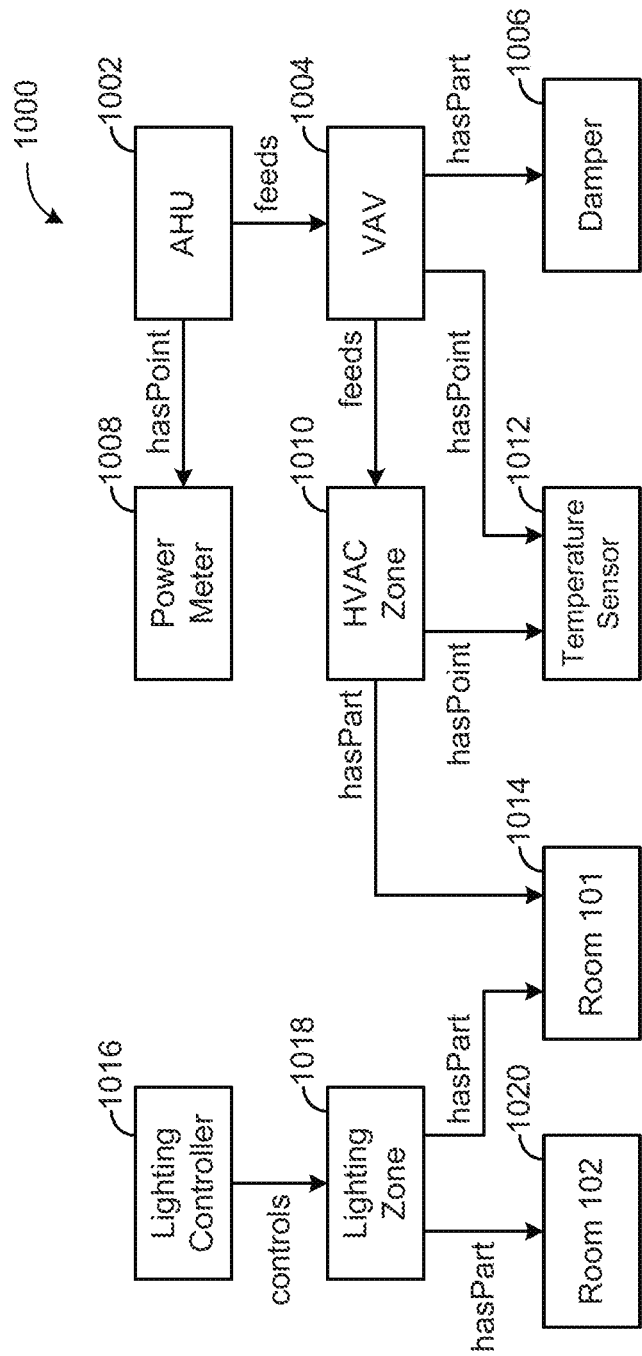
FIG. 10 is an example entity graph of entity data, according to an exemplary embodiment.

FIG. 10 is an example entity graph of entity data according to an embodiment of the present disclosure. The example of FIG. 10 assumes that an HVAC fault detection application has detected an abnormal temperature measurement with respect to Temperature Sensor 1012. However, Temperature Sensor 1012 itself may be operating properly, but may rely on various factors, conditions, and other systems and devices to measure the temperature properly. Accordingly, for example, the HVAC fault detection application may need to know the room 1014 in which the Temperature Sensor 1012 is located, the corresponding temperature setpoint, the status of the VAV 1004 that supplies conditioned air to the room 1014, the status of the AHU 1002 that feeds the VAV 1004, the status of the vents in the HVAC zone 1010, etc., in order to pin point the cause of the abnormal measurement. Thus, the HVAC fault detection application may require additional information from various related subsystems and devices (e.g., entity objects), as well as the zones and rooms (e.g., entity objects) that the subsystems and devices are configured to serve, to properly determine or infer the cause of the abnormal measurement.

Referring to FIG. 10, entity graph 1000 shows the relationship between Temperature Sensor 1012 and related entities via relational entities (e.g., feeds, hasPoint, hasPart, Controls, etc.). For example, entity graph 1000 shows that Temperature Sensor 1012 provides temperature readings (e.g., hasPoint) to the VAV 1004 and the HVAC Zone 1010. An AHU 1002 provides (e.g., feeds) the VAV 1004 with chilled and/or heated air. The AHU 1002 receives/provides power readings (e.g., hasPoint) from/to a Power Meter 1008. The VAV 1004 provides (e.g., feeds) air to HVAC Zone 1010 using (e.g., hasPart) a Damper 1006. The HVAC Zone 1010 provides the air to Room 1014. Further, Rooms 1014 and 1020 are located in (e.g., hasPart) Lighting Zone 1018, which is controlled (e.g., controls) by Lighting Controller 1016.

Accordingly, in the example of FIG. 10, in response to receiving the faulty measurement from Temperature Sensor 1012, the HVAC fault detection application and/or analytics service 624 can determine from the entity graph that the fault could be caused by some malfunction in one or more of the other related entities, and not necessarily a malfunction of the Temperature Sensor 1012. Thus, the HVAC fault detection application and/or the analytics service 624 can further investigate into the other related entities to determine or infer the most likely cause of the fault.

Space Graph

Referring generally to FIGS. 11-21, systems and methods for creating, managing, and utilizing space graphs for a building management system are shown and described, according to various exemplary embodiments. The limitations of building management systems to handle multivariate relationships between spaces, assets, and/or people can be addressed by creating space graphs. In some embodiments, a space graph is a type of knowledge graph (e.g., graph data structure) where each node of the space graph represents an entity and each edge is directed (e.g., from a first node to a second node) and represents a relationship between entities (e.g., indicates that the entity represented by the first node has a particular relationship with the entity represented by the second node).

Entities can be things and/or concepts related to spaces, people, and/or asset. For example, the entities could be "B7F4 North", "Air Handling Unit," and/or "meeting room." The nodes can represent nouns while the edges can represent verbs. For example, the edges can be "isA," "hasPart," and/or "feeds". While the nodes represent the building and its components, the edges describe how the building operations, both together create a digital twin of a particular building. In some embodiments, the entities include properties or attributes describing the entities (e.g., a thermostat may have a particular model number attribute).

The components of the space graph form large networks that encode semantic information for a building.

The space graph is configured to enable flexible data modeling for advanced analytics, control, and/or artificial intelligence applications, in some embodiments. These applications may require, or benefit from information modeling including interconnected entities. Other data modeling techniques based on a table, a hierarchy, a document, and/or a relational database may not be applicable. The space graph can be a foundational knowledge management layer to support other higher level applications, which can be, complex root cause, impact analysis, building powerful recommendation engines, product taxonomy information services, etc. Such a multilayer system, a system of system topologies, can benefit from an underlying space graph.

The space graph can be a data contextualization layer for all traditional and/or artificial intelligence applications. The space graph can be configured to capture evidence that can be used to attribute the strengths of entity relationships within the space graph, providing the applications which utilize the space graph with context of the systems they are operating. Without context (e.g., who the user is, what the user is looking for, what the target of a user request is, e.g., find a meeting room, increase a temperature in my office) these applications may never reach their full potential. Furthermore, the space graph provides a native data structure for constructing question and answer type systems, e.g., a chatbot, that can leverage and understand intent.

The space graph may not be a configuration database but may be a dynamic representation of a space. The space graph can include operational data from entities which it represents, e.g., sensors, actuators, card access systems, occupancy of a particular space, thermodynamics of the space as a result of actuation, etc. The space graph can be configured to continually, and/or periodically, ingest new data of the space and thus the space graph can represent a near real-time status of cyber-physical entities and their inter-relationships. For this reason, artificial intelligence can be configured to introduce a virtual entity and new semantic relationships among entities, in some embodiments.

The space graph is configured to facilitate adaptive controls, in some embodiments. The space graph can be configured to adapt and learn over time. The space graph can be configured to enable dynamic relationships between building information and other facility and enterprise systems to create new insights and drive new optimization capabilities for artificial intelligence systems. As relationships can be learned over time for the space graph, the artificial intelligence systems and also learn overtime based on the space graph.

Figure 11:
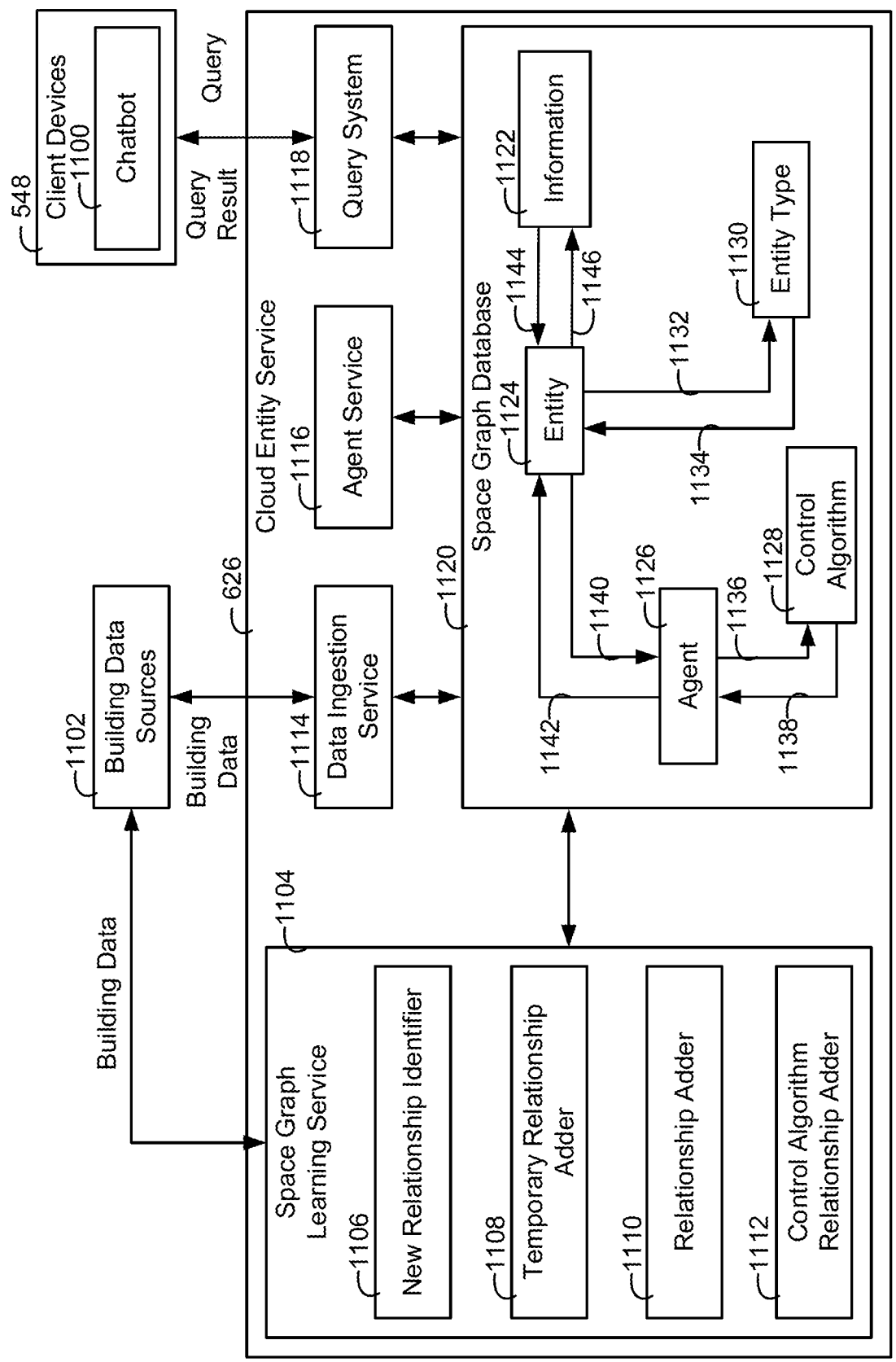
FIG. 11 is a block diagram of the entity service of FIG. 6 managing a space graph, according to an exemplary embodiment.

Referring now to FIG. 11, the cloud entity service 626 is shown in greater detail including a space graph database 1120, according to an exemplary embodiment. The cloud entity service 626 includes the space graph database 1120, a space graph learning service 1104, a data ingestion service 1114, an agent service 1116, and a query system 1118. The space graph database can be a knowledge base that represents how entities are related to each other at a given point in time. The space graph database 1120 can extend the utility and effectiveness of digital twins and/or single and/or multi-agent systems. The space graph database 1120 can correspond to an entity (e.g., a building) and/or a subset of entities (building equipment and spaces within the building) with real-time status synchronization of information, relationships, and/or entities of the building.

The space graph database 1120 includes nodes 1122-1130. The nodes 1122-1130 represent physical entities and/or software components. Entity 1124 could be a user, a space, a piece of software, equipment, and/or any other type of entity. The other nodes 1122 and 1126-1130 represent other entities. Agent 1126 is a software agent configured to implement artificial intelligence, in some embodiments. In some embodiments, control algorithm 1128 represents a control algorithm that can be generated by the agent 1126. Entity type 1130 represents a type definition for the entity 1124 (for example, if the entity 1124 represents "Thermostat A" the entity type 1130 may be a set entity type, "Thermostat" which defines the type of the entity 1124 for the space graph database 1120). Information 1122 can be collected data associated with the entity 1124 (for example, if the entity 1124 is a thermostat, the information 1122 could be temperature measurements of the thermostat, a fault log of the thermostat, etc.).

The space graph database 1120 includes directional relationships, edges 1132-1144. The edges 1132-1144 can define relationships between the entities of the nodes. Each of the entities of the space graph database 1120 can include one or multiple different edges between each other. For example, entity 1124 has an edge 1140 from the entity 1124 to the agent 1126 defining the relationship between the entity 1124 and the agent 1126. Furthermore, the edge 1142 between the agent 1126 and the entity 1124 represents another, different relationship between the agent 1126 and the entity 1124. For example, the edge 1140 may indicate that the entity 1124 is associated with the agent 1126 while the edge 1142 may indicate that the agent 1126 generates control information for controlling the entity 1124.

The data ingestion service 1114 of the cloud entity service 626 is configured, in some embodiments, to ingest data into the space graph database 1120. The data ingestion service 1114 is configured, in some embodiments, to receive building information from building data sources 1102 and ingest the data into the space graph database 1120. The building data sources 1102 may be data sources configured to collect information for the entities of the space graph database 1120. For example, the building data sources 1102, are, in some embodiments, actual building equipment, a BMS, sensors, actuators, etc. For example, the building data sources 1102 can be the devices of the school 110, the hospital 120, the factory 30, and/rot eh office 140 as described with reference to FIG. 1.

Furthermore, the data sources 1102 can be any of the equipment and/or systems as described with reference to FIGS. 2-5. Furthermore, external systems that gather information (e.g., social media data, cellphone data, equipment specifications, building information, weather information, etc.) can be included in the building data sources 1102. For example, the weather service 152, the news service 154, the document service 156, and/or the media service 158 can be included within the building data sources 1102 and can provide building data to the data ingestion service 1114.

The data ingestion service 1114 is configured to ingest building information received from the building data sources 1102 into the space graph database 1120 in some embodiments. For example, the data ingestion service 1114 can be configured to identify, based on the building data, values, measurements, and/or any other information of the building data that is directed associated with an entity of the space graph database 1120. In this regard, the data ingestion service 1114 can cause the building data associated with the entity to be stored within the space graph database 1120 with an association to the identified entity.

For example, if the building data includes collected data for the entity 1124, the data ingestion service 1114 can cause information 1122, which represents information of the entity 1124, to include the collected data. In some embodiments, the node entity 1124 itself includes its own information storage instead of a separate node (e.g., the information 1122). In this regard, the data ingestion service 1114 can cause the entity 1124 to store the collected data. The data ingestion service 1114 is configured to perform similar data ingestion operations for one or all of the entities of the space graph database 1120, in some embodiments. The data ingestion service 1114 can be configured to ingest the data as the data becomes available and/or at a time period.

In some embodiments, the space graph learning service 1104 is configured to generate and/or update the entities (e.g., the nodes 1122-1130) and/or the edges 1132-1142. The space graph learning service 1104 can be configured to receive the building data from the building data sources 1102 and generate and/or manage the space graph database 1120 based on the received building data. In some embodiments, the space graph learning service 1104 generates the entire space graph database 1120 to instantiate a space graph for a particular building. For example, data representing particular entities and/or their relationships can be within the building data.

Based on the building data, the space graph learning service 1104 is configured to generate the entire space graph database 1120. One example of such a generation step can be the data point string analysis mechanisms as described in U.S. patent application Ser. No. 15/207,376 filed Jul. 11, 2016, the entirety of which is incorporated by reference herein. Furthermore, another example of generating the relationships between entities can be the equipment relationship derivation mechanisms for determining a relationship between two pieces of equipment as described in U.S. patent application Ser. No. 15/400,926 filed Jan. 6, 2017, the entirety of which is incorporated by reference herein.

The space graph learning service 1104 includes a new relationship identifier 1106. The new relationship identifier 1106 is configured to generate relationships between entities that do not exist in the space graph database 1120. The new relationship identifier 1106 is configured, in some embodiments, to generate relationships for nodes upon construction of the space graph database 1120 and/or after the space graph database 1120 has been constructed to reflect relationships derived from new data indicating changes which may have been made to the building represented by the space graph database 1120 and/or new entities for the space graph database 1120. The new relationship identifier 1106 can analyze trends associated with data of the entities of the space graph database 1120. For example, ingested data into the space graph database 1120 may indicate that an access control system registers access and immediately after, a room becomes occupied. The new relationship identifier 1106 can derive a relationship between the access control system and the room, i.e., that the access control system controls access to the room. Various supervised or unsupervised learning mechanisms (e.g., neural networks, Bayesian networks, etc.) can be utilized to analyze data ingested into the space graph database 1120 and/or received directly from the building data sources 1102 to identify the relationships.

In some embodiments, the new relationship identifier 1106 continually and/or periodically identifies new relationships for the space graph database 1120. In some embodiments, the new relationship identifier 1106 is triggered by the data ingestion service 1114 to identify new relationship in response to the data ingestion service 1114 ingesting new data into the space graph database 1120. In some embodiments, the data utilized by the new relationship identifier 1106 to identify the new relationships is the entire space graph database 1120, e.g., the nodes and/or the edges between the nodes of the space graph database 1120.

The space graph learning service 1104 includes a temporary relationship adder 1108. Based on new relationships identified by the new relationship identifier 1106, the temporary relationship adder 1108 can cause the space graph database 1120 to be updated with a temporary relationship. The temporary relationship adder 1108 is configured, in some embodiments, to cause an edge between a first nod representing a first entity and a second node representing a second entity to be added to the space graph database 1120. The temporary relationship may indicate that a relationship between two entities may exist. The temporary relationship can cause other system that rely on the space graph database 1120 to adjust their operations, assuming based on the temporary relationship. As additional data is collected, the temporary relationship can be verified as existing (which can be based updates to control algorithms used to control equipment) and replaced with a permanent relationship via the relationship adder 1110.

The relationship adder 1110 can be configured to add a relationship between entities in the space graph database 1120. In some embodiments, in response to the new relationship identifier 1106 identifying a relationship existing between a first entity and a second entity, the relationship adder 1110 can be configured to add the relationship to the space graph database 1120. In some embodiments, the relationship adder 1110 adds the relationship by causing an edge to exist between the first entity and the second entity of the space graph database 1120. In some embodiments, the relationship adder 1110 can assign a particular type to the edge, "isAPartOf," "controls," "hasA," etc. In some embodiments, the relationship adder 1110 is configured to derive the type of the relationship from the ingested building data of the space graph database 1120. In some embodiments, the relationship adder 1110 is configured to derive the type of the relationship from the types of the entities which the relationship is between.

The space graph learning service 1104 includes a control algorithm relationship adder 1112. The control algorithm relationship adder 1112 is configured to identify an impact relationship cause by the execution of a control algorithm and cause the space graph database 1120 to store the impact relationship. In some embodiments, the control algorithm relationship adder 1112 identifiers an indirect relationship between entities of the space graph database 1120. For example, a VAV unit entity may operate temperature of a zone. A control algorithm can cause the VAV unit to operate in a particular manner to regulate the temperature of the zone. However, execution of the algorithm to regulate the temperature of the zone can indirectly impact other entities.

For example, a neighboring zone next to the zone can have its temperature affected by the execution of the control algorithm. This type of relationship may not be direct or physical but may be an indirect impact resulting from execution of a control algorithm. For this reason, the control algorithm relationship adder 1112 can identify relationships between entities of the space graph database 1120 which are the result of the execution of the control algorithm and cause the space graph database 1120 to store a new edge representing the indirect relationship to the space graph database 1120.

In some embodiments, the control algorithm causing the indirect impact, or other control algorithms, can be adjusted. For example, if the agent 1126 generates a control algorithm for a first zone and operation of the control algorithm affects temperature in the first zone but also indirectly in a second zone, another agent associated with the second zone can coordinate with the agent 1126 to combine control algorithms for the first and second zones such that control of the first zone is considered when controlling the second zone. This cooperation between agents can be implemented based on the presence of an indirect relationship caused by a control algorithm.

The query system 1118 can be a system utilized to process queries of the space graph database 1120. The queries can be generated by client devices 548 via an chatbot interface application 1100. The chatbot 1100 can be configured to receive queries in text and/or spoken word from an input device (e.g., display screen, keyboard, microphone, etc.) and provide the query to the query system 1118. The queries may be in the form of a database query and/or may be in the form of text. For example, the queries can be queries similar to the BRICK queries described in U.S. Provisional Patent Application No. 62/751,926 filed Oct. 29, 2018, the entirety of which is incorporated by reference herein.

In some embodiments, the query system 1118 integrates with the chatbot 1100 configured to converse with a user of the client devices 548. The chatbot 1100 can be similar to a CORTANA and/or SIRI system. The chatbot 1100 can be configured to perform natural language processing on spoken questions regarding information of the space graph database 1120, resolve the question via the NLP into a semantic query for the space graph database 1120, and query the space graph database 1120 for the information requested by the user of the client devices 548.

In some embodiments, a query may be "What temperature is this room?" Based on a location of the client devices 548, the query system 1118 can determine what room the user is asking for information about, what information the user is asking for, temperature, and what semantic query would pull the temperature for the identified room from the space graph database 1120. The query system 1118 can perform the generated query to retrieve the request information, and provide the information to the user of the client device 548 via text and/or audio (e.g., via a screen or a speaker). The query can be based on the relationship and entity names of the space graph database 1120 and, based on the query, a system can traverse the various nodes and relationships of the space graph database 1120 to retrieve the information requested by the query which can be any type of information (e.g., measurements, relationships between equipment, etc.). In some embodiments, since operational data, relationships, and entities are stored by the space graph database 1120, no other relationships or nodes of other data structures besides the space graph database 1120 need to be traversed to retrieve information for a query. The chatbot 1100 can be similar to and/or the same as the assistant described with reference to U.S. patent application Ser. No. 16/028,126 filed Jul. 5, 2018 and U.S. patent application Ser. No. 16/246,391 filed Jan. 11, 2019, the entity of both of which are incorporated by reference herein. In some embodiments, any system or software component (e.g., the space graph learning service 1104, the agent 1126, the agent service 1116) can interact with the space graph database 1120 by receiving information for the space graph database 1120 based on a query. In this regard, the systems and/or components can include some and/or all of the operations and/or components of the query system 1118 and/or can rely on the query system 1118 for performing queries.

The agent service 1116 is configured, in some embodiments, to manage agents of the space graph database 1120. For example, the agent service 1116 is configured, in some embodiments, to instantiate agents within the space graph database 1120 to exist as nodes within the space graph database 1120 and/or in some embodiments, is configured to operate the agents of the space graph database 1120. The agent service can be configured, in some embodiments, to execute all of the agents of the space graph database 1120 external to the space graph database 1120 and inject the results of the operation of the agents into the space graph database 1120. However, in some embodiments, the agents of the space graph database 1120 within the space graph database 1120 itself. The agent service 1116 and/or the agents of the space graph database 1120 can implement the agent based operations as described with reference to U.S. patent application Ser. No. 15/586,104 filed May 3, 2017, U.S. patent application Ser. No. 15/367,167 (now U.S. Pat. No. 9,817,383) filed Dec. 1, 2016, U.S. patent application Ser. No. 15/723,624 filed Oct. 3, 2017, U.S. patent application Ser. No. 15/968,278 filed May 1, 2018, U.S. patent application Ser. No. 16/036,685 filed Jul. 16, 2018, U.S. patent application Ser. No. 16/008,885 filed Jun. 14, 2018, the entirety of each of these patent application is incorporated by reference herein.

The agent 1126 can be a software component. In some embodiments, the agent 1126 is a long-running small process that classifies the status of entities of the space graph database 1120 into a pre-determined category (e.g., a room can be classified into occupied, unoccupied, stand-by, in-meeting, etc.,). In some embodiments, the classification is performed with various classification rules and/or machine learning models (e.g., neural networks, Bayesian models, etc.). The data used in the classification can be the relationships, entities, and/or ingested data of the space graph database 1120. In some embodiments, the agent 1126 is configured to interact with other agents of the space graph database 1120 and utilize a space graph to answer queries or update entities. For example, a comfort agent is configured to retrieve occupancy history of a user via the space graph database 1120 and retrieve outdoor weather information from the space graph database 1120 to generate a temperature control strategy (e.g., an optimized temperature control strategy), and then make the control strategy available as a comfort schedule.

In some embodiments, the agent 1126 is a space agent representing a space. In some embodiments, the space agent is a zone agent, a room agent, a floor agent, a building agent, etc. The space agent is configured to monitor health of the equipment that serve the space of the space agent, in some embodiments. Furthermore, the space agent is configured to manage setpoints for the space and calculate an effective setpoint for the space.

In some embodiments, the agent 1126 is a control agent which can be generated by the agent service 1116 to perform control operations. In some embodiments, the control agent is a global data sharing agent configured to publish information to other agents within the space graph database 1120 or other service outside the space graph database 1120, a temporary occupancy override agent configured to determine whether to override an occupancy state of a space, a scheduled exception agent configured to determine an exception to a control schedule, a flow setpoint reset agent configured to reset a flow setpoint, an optimal start and stop agent configured to determine times at which to start or stop equipment, a reheat valve control agent configured to generate control signals for a reheat valve, an unoccupied mode night setback agent configured to set other entities to unoccupied based on time of day, and a chiller sequencing agent configured to sequence an agent, in some embodiments.

Figure 12:
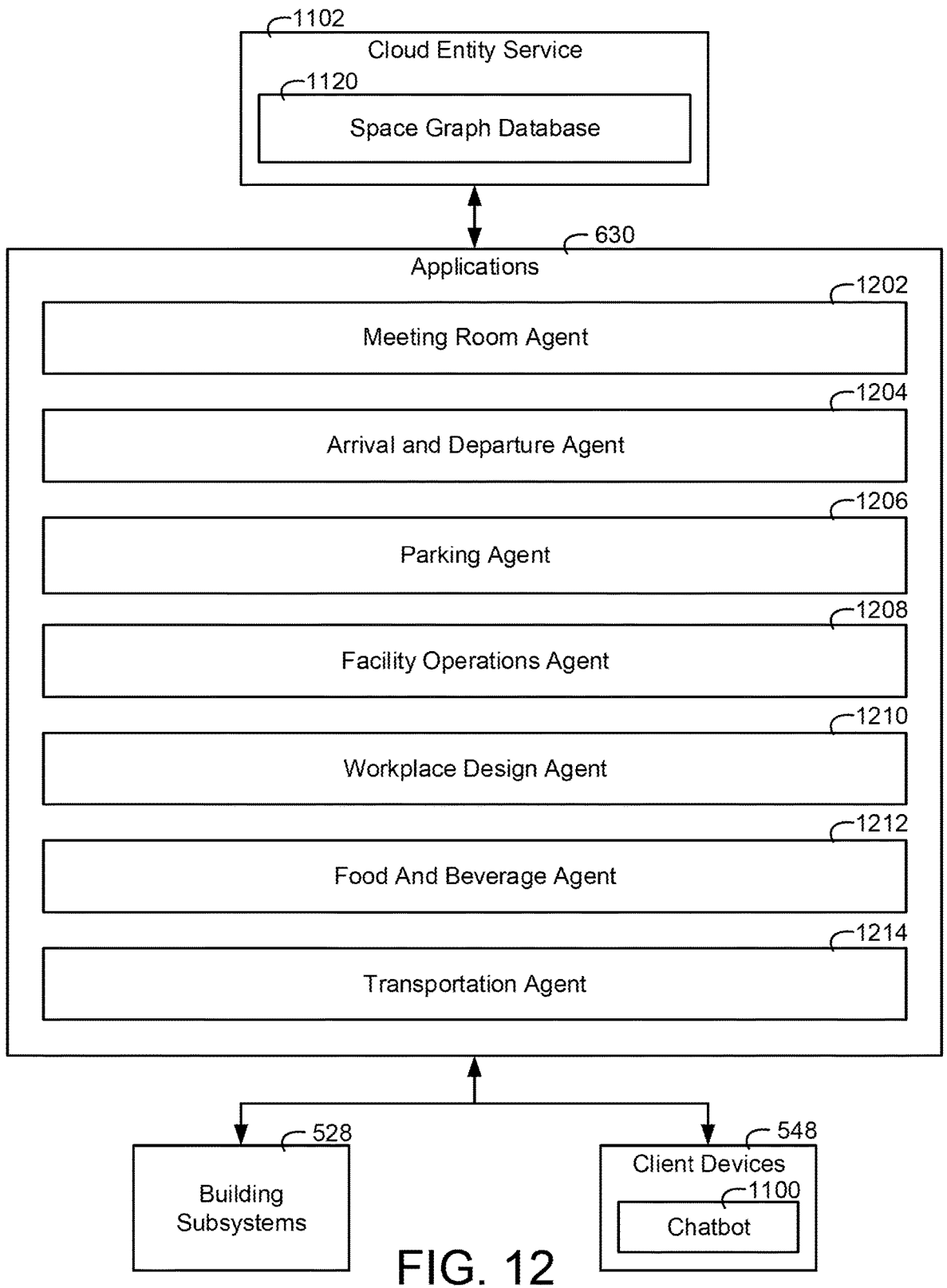
FIG. 12 is a block diagram of applications for a building utilizing the space graph of FIG. 11, according to an exemplary embodiment.

Referring now to FIG. 12, the applications 630 as described with reference to FIG. 6 is shown in greater detail, according to an exemplary embodiment. The applications 630 can be configured to perform operations based on the information of the space graph database 1120 to operate the building subsystems 528. For example, the applications 630 can be configured to query the space graph database 1120 for information, make adjustments to information in the space graph database 1120, and/or make perform control actions based on the adjustments to the space graph database 1120. In some embodiments, the agents 1202-1214 are included within the space graph database 1120 and query the space graph database 1120 for information to perform control actions.

In some embodiments, the applications 630 are occupant based applications configured to perform local environmental control (e.g., control of temperature and/or lighting), perform desk booking, perform room booking and/or meeting management, perform contact information management and/or contact status management, perform wayfinding, perform employee mass notifications, perform attendance and activity tracking, perform enhanced local environmental control, advanced desk booking, efficient meeting management, contact management, advanced wayfinding, mass notifications for employees and visitors, visitor management and registration, patient room monitoring and control, local desk control and adjustments, hot desk booking, advanced meeting management and booking, hot desking features, asset tracking and advanced wayfinding, enhanced mass notifications, nurse call features and automated code blue features, issue reporting, and/or any other occupant related feature.

In some embodiments, the applications 630 perform tenant applications configured to generate interfaces allowing a tenant to view energy usage. Furthermore, the applications 630 may allow the tenant to make payments in an amount for their energy usage. The applications 630 can record energy usage via the space graph database 1120 and various tenant entities can be related to the energy usage. Bills can be generated by the applications 630 and added to the space graph database 1120 and linked to the particular tenants. Therefore, in response to a request by a tenant to view their bill, the applications 630 can retrieve the tenant energy usage information tied to that user and the bill tied to that user and cause the information to be displayed.

In some embodiments, the applications 630 perform facility management for an owner of a building. The owner can view information pertaining to tenant energy usage, building spending and energy consumption, public awareness data, heat maps of spaces generated based on occupancy levels, fault detection and diagnostics (FDD) with monetization, fault trends and/or work order conversations, energy intensity by tenant and building load, utility bill data, etc.

In some embodiments, the applications 630 are configured to perform building owner features e.g., automated tenant billing, generation of space level key performance indications (KPIs) and/or associated analytics, analysis of sustainability statistics and tracking, security alarm management, equipment failure analytics, awareness between BMS systems, file integrity monitoring (FIM) and tracking, etc.

The applications 630 include a meeting room agent 1202. The meeting room agent 1202 is configured to allow building staff to book a meeting room via MICROSOFT OUTLOOK and/or Cortana. The meeting room agent 1202 is configured, in some embodiments, to identify with an artificial intelligence, if a very important person (VIP) will be a meeting attendee. Based on the attendees and/or whether the meeting attendees include a VIP person, the meeting room agent 1202 is configured to select a meeting room and/or adjust other scheduled meetings and/or meeting rooms, to properly accommodate the VIP person in a meeting room with a particular quality level. The meeting room agent 1202 is configured to interact with an arrival and departure agent 1204 to perform the VIP meeting room booking.

In some embodiments, the artificial intelligence of the meeting room agent 1202 is configured to generate shortlists for all meeting rooms of a building based on the size and available number of attendees of each meeting room. In some embodiments, the size and available number of attendees for each meeting room is received from a workplace design agent 1210. The meeting room agent 1202 is configured to utilize the shortlists in booking meetings. Furthermore, when booking meeting rooms, the room agent 1202 can generate requests that additional chairs and/or tables be added to the booked room to accommodate the number of attendees in the request. The request may get provided to a facility manager via a facility operations agent 1208.

In some embodiments, the meeting room agent 1202 is configured to implement instant and/or immediate booking. The artificial intelligence of the meeting room agent 1202 is configured to find a nearest available meeting room for an immediate booking and, if necessary, can re-adjust other meeting room bookings to accommodate the immediate booking. To identify the nearest meeting room, the meeting room agent 1202 can be configured to communicate with the workplace design agent 1210.

In some embodiments, the meeting room agent 1202 is configured to detect when an employee enters a meeting room unexpectedly. The artificial intelligence of the meeting room agent 1202 can cause audio to play within the room welcoming the employee by naming and asking if the user would like to book the room and/or for how long the user would like the room to be booked. Based on other bookings for the same room, the meeting room agent 1202 is configured to grant and/or deny the booking request.

In some embodiments, when a user books a meeting room, the artificial intelligence of the meeting room agent 1202 is configured to analyze the attendees and the hosts with the meeting location, subject, agenda, and/or duration. The artificial intelligence of the meeting room agent 1202 is configured to limit effective meetings to be between a predefined length of time (e.g., 30-45 minutes) and workshops to be within another predefined length of time (e.g., 60 minutes). The meeting booking analysis and limits can be performed by the meeting room agent 1202 and/or by the workplace design agent 1210.

In some cases, a meeting attendee (whether employee or visitor) may be running late to a meeting scheduled by the meeting room agent 1202. In such a case, the attendee can utilize the chatbot 1100 to communicate with and inform the meeting room agent 1202 that the attendee is running late. The meeting room agent 1202 can then be configured to notify the organizer and ask the organizer what he wishes to do. The meeting room agent 1202 is configured to notify the other attendees and if necessary, is configured to adjust the meeting schedule accordingly, in some embodiment. In some embodiments, the meeting room agent 1202 is configured to cause smart screens of the meeting to automatically display a notification that the late attendee is running late. Furthermore, upon arrival of late attendee, the meeting organizer may be automatically notified via the chatbot 1100. The meeting room agent 1202 is configured, in some embodiments, to communicate with the parking agent 1206, a lobby agent, the arrival and departure agent to identify whether an attendee is late to a meeting.

In some embodiments, the meeting room agent 1202 is configured to determine whether no one has showed up for a scheduled meeting. In response to no one showing up for a scheduled meeting, the meeting room agent 1202 is configured to ask an organizer, via the chatbot 1100, if the meet room is still required by the organizer. In some embodiments, the meeting room agent 1202 is configured to keep the meeting booked or cancel the meeting based on a response provided by the host via the chatbot 1100. Furthermore, the meeting room agent 1202 is configured to ask, via the chatbot 1100 whether the host needs to extend the booking and can be configured to extend the meeting time, select a new meeting room for the meeting, and/or adjust other scheduled meetings for the room to accommodate the extended meeting time. If the organizer does not answer the questions of the meeting room agent 1202 within a predefined amount of time, the meeting room agent 1202 is configured to cancel the meeting, in some embodiments. The meeting room agent 1202 is configured, in some embodiments, to coordinate to the workplace design agent 1210 to facilitate management of meeting rooms when attendees do not show up at a scheduled time.

In some embodiments, if one or more guests are waiting in the meeting room alone and the organizer does not show up to the meeting, the meeting room agent 1202 is configured to automatically notify the organizer of their absence and provide an alert to a receptionist to take appropriate actions. If the host does not reply to the notification of the meeting room agent 1202, the meeting room agent 1202 is configured to cancel the meeting. If the organizer indicates to delay the meeting, the meeting room agent 1202 can provide a notification to the meeting attendees of the delay. The meeting will be either be canceled if the host does not respond, or will be delayed according to his response. For a situation where an organizer who does not show up for a scheduled meeting, the meeting room agent 1202 can be configured to coordinate with the workplace design service 1210 to take appropriate actions.

In some embodiments, before a meeting starts, the meeting room agent 1202 is configured to automatically adjust meeting room temperature settings according to meeting requirements and participants preferences. During the meeting, using chatbot 1100, the participants can be able to control all features in the room, temperature, lighting, etc. by communicating with the meeting room agent 1202. The automatic and manual control of the meeting room can be performed by the meeting room agent 1202 with the facility operations agent 1208.

In some embodiments, the meeting room agent 1202 is configured to identify meeting room attendees via facial recognition and is configured to cause a speaker of the room to play a greeting for each attendee greeting the attendee by name. The meeting room agent 1202 is configured to automatically login an organizer of the meeting to a collaboration screen to enable collaboration through annotation, screen sharing, and conferencing. The identification, greeting, and smart screen features can be performed via the meeting room agent 1202 with the workplace design agent 1210.

The meeting room agent 1202 is configured to automatically identify if video or voice conferencing is required for a meeting. As soon as the organizer enters the meeting room, the meeting room agent is configured to cause speakers of the room to great the organizer and automatically link the organizer to a conference call if the meeting is booked with a conference call. The conference call implementation can be performed by the meeting room agent 1202 and/or the workplace design agent 1210. Furthermore, the meeting room agent 1202 is configured to cause laptops, notebooks, and/or smartphones to be connected to the meeting room equipment via their network connection to a wireless network instead of requiring specialized cables.

In some embodiments, the meeting room agent 1202 is configured to ask the meeting organizer via the chatbot 1100 whether the organizer would like the meeting to be recorded via meeting video cameras, via meeting room microphones, via speech-to-text transcription services, and/or via an action assignment service. The meeting room agent 1202 is configured to cause the recorded meeting information to be stored a drive (e.g., a network drive). In some embodiments, via email, an, application, and/or text messaging, the meeting room agent 1202 is configured to follow up with attendees and the organizer to provide reminders according to the action assignment determined during the meeting. Furthermore, via the chatbot 1100, the meeting room agent 1202 is configured to ask the organizer fi the organizer would like the meeting recording to be provided to the other meeting attendees of the meeting. The meeting room recording features can be implemented by the meeting room agent 1202 and/or the workplace design agent 1210.

In some embodiments, as the end of meeting approaches, the meeting room agent 1202 is configured to ask the organizer, via chatbot 110, if the organizer requires additional time for the meeting. If additional time is required than originally booked, the meeting room agent 1202 is configured to check if there is another consecutive meeting in the same room. If there is a consecutive meeting, the meeting room agent 1202 is configured to check the availability of other meeting rooms and will act accordingly to either re-locate the current meeting or relocate the consecutive meeting. The meeting room agent 1202 is configured to notify the relocated meeting attendees with the new changes via the chatbot 1100. The meeting room extension features can be performed by the meeting room agent 1202 and/or the workplace design agent 1210.

In some embodiments, at the end of the meeting, the meeting room agent 1202 is configured to cause speakers of the room to play a goodbye message and a reminder for them to not forget their personal belongings. The meeting room agent 1202, via a camera of the room, is configured to determine whether all attendees have left the room and/or whether any personal belongings are left behind in the room. The meeting room agent 1202 is configured to provide a notification to all users via the chatbot 1100 and/or via text message that an item has been left behind. If the users and/or organizer do not respond within a predefined amount of time from sending out the notifications (e.g., one minute), the meeting room agent 1202 is configured to notify a front desk operator and/or security personal. The left behind items operations can be performed by the meeting room agent 1202 and/or by the facility operations agent 1208 and/or the arrival and departure agent 1204.

In some embodiments, the meeting room agent 1202 facilitates ordering of food and/or beverages via the chatbot 1100. The meeting room agent 1202 is configured to store food and/or beverage preferences for each attendee and prompt the attendees in future meetings if they would like to order the same food and/or beverages ordered at a previous meeting via the chatbot 1100. The meeting room agent 1202 is configured to provide a notification to a catering service (e.g., the food and beverage agent 1212) to facilitate the ordering of the food and/or beverages determined by the meeting room agent 1202 via the chatbot 1100. In some embodiments, the meeting room agent 1202 is configured to determine when the food and/or beverages ordered are delivered. If the food and/or beverages are not delivered within a predefined amount of time, the catering service does not acknowledge the orders, and/or the orders arrive after a predefined amount of time, the meeting room agent 1202 can provide a receptionist with a notification and an indication that action should be taken to correct the poor service in the future.

In some embodiments, the meeting room agent 1202, together with the workplace design agent 1210 and/or the facility operations agent 1208, is configured to operate a display in a kitchen, the digital display that shows meeting room occupancies and attendees with their respective orders. Once a meeting is over the, kitchen can be requested by the meeting room agent 1202 via the digital display to clean up and set the room for the next meeting. The meeting room agent 1202 is configured, in some embodiments, to use video streams of a camera of the room and object recognition to identify if the meeting room is cleaned/arranged or not, and will provide a notification to cleaning personnel if the room is not timely cleaned.

In some embodiments, an organizer can utilize a smart meeting room collaboration screen of the meeting room operated by the meeting room agent to enable collaboration through annotation, screen sharing, and conferencing. The meeting room screen may allow one touch dial-in to conference features and/or automated video conferencing start. Furthermore, during a meeting, and organizer and/or employee can instantly share documents, screen, group chatting, group editing of documents, via the meeting room agent 1202, to the collaboration screen.

In some embodiments, before or during the meeting, attendees can request via the chatbot 1100 any supplies, equipment, and/or stationary. The meeting room agent 1202 is configured to receive the request and provide a notification to a facility manager with the request, e.g., provide a notification to the facility operations agent 1208. The request will notify the facility manager with the request made by the meeting attendees. If the facility team does not address the request within a predefined amount of time (e.g., one minute), the meeting room agent 1202 and/or the facility operations agent 1208 is configured to provide a reminder to the facility team.

In some embodiments, attendees can report any malfunction or breakdown of any of the equipment in the meeting room via the chatbot 1100 to the meeting room agent 1202. Some equipment failure can be automatically detected through the meeting room agent 1202. The meeting room agent 1202 can be configured to notify service, information technology, and/or facility management using the chatbot 1100 to address the issue. In some embodiments, the notification is delivered to the appropriate service personal via the facility operations agent 1208.

In some embodiments, the arrival and departure agent 1204 is configured to, upon entrance to a lobby, identify visitors via facial recognition. Information regarding a history of the visitors can be displayed to a receptionist by the arrival and departure agent 1204 based on the identification of the user. Furthermore, for unregistered visitors, the arrival and departure agent 1204 is configure dot identify unregistered visitors through social media profile pictures, e.g., LINKEDIN, FACEBOOK, etc.

In some embodiments, if a visitor is late for a meeting, the arrival and departure agent 1204 is configured to text the visitor and ask the visitor how long it will take him to make the meeting and/or whether or not the visitor wishes to cancel the meeting. The arrival and departure agent 1204 is configured to communicate with the meeting room agent 1202 to cancel and/or delay the meeting based on the input of the user.

In some embodiments, a mobile robot is operated by the arrival and departure agent 1204 to greet a visitor if the arrival and departure agent 1204 identifies the visitor via facial recognition when the visitor arrives. In some embodiments, the robot escorts the visitor to a meeting room indicated by the arrival and departure agent 1204. In some embodiments, when the visitor arrives, the arrival and departure agent 1204 determines whether an associated room is booked for the visitor. If no room is booked for the user, the arrival and departure agent 1204 is configured to provide an indication of no booking lobby personnel and that the lobby personnel ask that the visitor wait in the lobby.

In some embodiments, the arrival and departure agent 1204 can determine whether or not the host is within the building that the visitor arrives at. In such a case, a human receptionist and/or the robot can be prompted by the arrival and departure agent 1204 to greet the visitor and will seat him in the lobby while the arrival and departure agent 1204 contacts the host indicating that their visitor has arrived. If the host does not confirm the attendance of the visitor within a predefined amount of time, the arrival and departure agent 1204 is configured to request that the receptionist take necessary actions.

In some embodiments, if the robot (e.g., via a video camera of the robot) and/or the arrival and departure agent 1204 is unable to identify the visitor, the robot can be configured to ask him to the visitor to provide a registration code associated with the visitor registration code so the robot associate the face biometrics with the registration details. In some embodiments, if the visitor is not registered, the robot will ask him to proceed to the receptionist to register. In some embodiments, if the visitor is not attending a scheduled meeting, the arrival and departure agent 1204 is configured to prompt the host to come can collect the visitor, in some embodiments.

In some embodiments, unregistered visitors will register at the reception of the building. Registration can be facilitated by the arrival and departure agent 1204 using face recognition to allow future recognition of the visitor. Furthermore, the car number plate and other relevant information will be automaticity coupled by the arrival and departure agent 1204 to the visitor for frictionless access control system use in the future, in some embodiments.

In some embodiments, waiting visitors in a lobby of the building will be asked by the receptionist or a lobby robot if they require any beverages. In response to the robot or receptionist receiving and/or inputting the request to the arrival and departure agent 1204, the arrival and departure agent 1204 is configured to operate with the food and beverage agent 1212 to facilitate the order and provide an order notification to a kitchen. The arrival and departure agent 1204 is configured, in some embodiments, to remember requests of visitors and record the preferences of the visitors to a profile of the visitor. In future visits, the receptionist or lobby robot after identifying the visitor via the arrival and departure agent 1204, can be able to directly ask the visitor if he/she want to have their favorite beverage.

In some embodiments, the arrival and departure agent 1204 is configured to provide visitors with a display of the latest environmental and energy efficiency data of the building on lobby displays in the lobby. Furthermore, on the same lobby screens, the arrival and departure agent 1204 is configured to display a special welcoming to very important person (VIP) in response to detecting the arrival at the lobby of the VIP.

In some embodiments, an employee can host visitors to a building though visitor registration of a web-portal. The arrival and departure agent 1204 is configured to send a text message and/or email message with a link to a one-time web page that has a registration form for registering the visitor. The visitor can register his/her information and vehicle information that can be recorded by the arrival and departure agent 1204 will be used in frictionless visitor access systems.

In some embodiments, the arrival and departure agent 1204 is configured to issue a visitor a virtual visitor ticket. The ticket will be in a format that allows the visitor to save it in his smart phone built-in digital wallet. When required, the visitor will be able to use the virtual ticket during his visit with his smart phone to access doors that require his identification. Furthermore, the arrival and departure agent 1204 is configured to provide the visitor with a journey map to get to a particular building and meeting room within the particular building that the visitor is scheduled to attend a meeting. While the visitor is in the building, the host and the security will be able to see track their guest location in the building to verify that the visitor is staying within predefined areas of the building.

For unregistered visitors, the arrival and departure agent 1204 can prompt, via the robot and/or a lobby display kiosk, that the visitor declare their host. In response to the host being declared, the host is provided with a notification indicating the arrival of the visitor via a mobile application of a user device of the host. If the visitor does not have an appointment with the host, the host can accept and/or reject the user via the application. If the host accepts the unregistered visitors, they will register at the reception desk and will be given a virtual visitor ticket via the arrival and departure agent 1204, in some embodiments. Some visitors will have a time limit for their presence within the building. If that limit is exceeded the arrival and departure agent 1204 is configured to notify the visitor, the host, and/or security, in some embodiments.

In some embodiments, the arrival and departure agent 1204 is configured to integrate with the meeting room booking system and constantly check if the visitors have been registered prior to the meeting. Before the meeting, the arrival and departure agent 1204 is configured to remind non-registered visitors to register, in some embodiments. Upon leaving the building and while going through the lobby, visitor is wished a good day by robot which can be operated by the arrival and departure agent 1204.

In some embodiments, upon arrival of a vehicle in a parking lot, the parking agent 1206 is configured to identify a number plate via an automatic number plate recognition (ANPR) system of the parking lot. The car information is provided by the ANPR system to the parking agent 1206, based on the car information, the parking agent 1206 assigns a parking bay for the visitor. Furthermore, the parking agent 1206 provides a notification (e.g., via the arrival and departure agent 1204) to a host associated with the visitor and/or a receptionist of the arrival of the visitor.

In some embodiments, the parking agent 1206 displays a greeting and the location and/or parking number of the allocated parking bay on a display at the entrance of the parking lot. In some embodiments, the parking agent 1206 is configured to send a text message to the visitor with his respective parking spot. If the visitors parking is full, the parking agent 1206, rather than assigning and/or alerting the visitor of their parking spot, directs the visitor to a pre-assigned overflow location.

In some embodiments, in case the vehicle is not recognized, the security gate guard can register the car with a respective host. The host will be notified by the parking agent 1206, via the arrival and departure agent 1204, that a visitor is arriving for the host. In some embodiments, the parking agent 1206, using a vehicle occupancy sensor imbedded in the ground of each of multiple parking spots, is configured to determine if the visitor has parked in his allocated parking bay and will notify the security guard of correct and/or incorrect parking. If the visitor does not follow the instructions and parking in the proper location, the parking agent 1206 is configured to adjust the assigned parking of the visitor and inform security, in some embodiments. For a user that parks in the incorrect parking spot, the parking agent 1206 is configured to provide emphasized indication of their parking spot the next time the visitor arrives at the parking lot.

In some embodiments, during peak time, the parking agent 1206 is configured to display, on the greeting screen, not to overstay the parking spot since it is allocated to another visitor after his parking time is over. Furthermore, the parking agent 1206 is configured to take into consideration early visitor arrival.

In some embodiments, the parking agent 1206 is configured, via the parking spot sensors and/or parking lot cameras, whether a vehicle has overstayed its parking time. Overstaying vehicles will be notified to the host and the security. The parking agent 1206 can also provide an indication of the overstay to the arrival and departure agent 1204 to be registered by the arrival and departure agent 1204. The visitor will also receive a notification via text that they have overstayed their allocated parking time. The next time the same visitor arrives at the parking lot, the parking agent 1206 is configured to display on the greeting screen a reminder to not overstay their parking lot time.

In some embodiments, pre-booked visitors will have allocated parking bays. The parking bays maybe reallocated by the parking agent 1206 due to the late departure of the previous visitors leaving the respective pre-booked parking bay. In some embodiments, the parking agent 1206 is configured to adjust the parking bay allocation to suit the demand needs using parking lot usage analytics. Upon the visitor leaving the parking lot, the parking agent 1206 is configured to provide a notification to the arrival and departure agent 1204 and if required, provide a notification to the host that the visitor has left the building.

Upon leaving the building, a digital display at the gate exit is caused by the parking agent 1206 to display a thank-you message to the visitor for visiting the building. Furthermore, if weather conditions are poor, the parking agent 1206 is configured to alert the visitor with an indication of the weather conditions, whether the weather conditions are extreme, and prompt the visitor to drive safely.

In some embodiments, an employee can speak with the chatbot 1100 to tell the chatbot 1100 that the employee is driving to a particular campus before the employee departs. The chatbot 1100 provides an indication to the parking agent 1206 that the employee is on their way and also provides an indication of an estimated time of arrival. Furthermore, the chatbot 1100 can provide another indication of the estimated time of arrival a few minutes before the employee arrives. The parking agent 1206 is configured to monitor the status of all lots texts the chatbot 1100 with updates regarding a parking spot to utilize. The chatbot 1100, in some embodiments, provides a notification to the employee to drive to the appropriate lot. In some embodiments, the chatbot 1100 interfaces with a speaker system of a car of the employee and provides the indication to the employee via the speaker system.

In some embodiments, an employee can registers a visitor with the parking agent 1206 for a next day with the visitor management system from the arrival and departure scenario, and includes a phone number of the visitor. In some embodiments, the parking agent 1206 is configured to obtain a parking reservation for the visitor and texts a five-digit code along with the address and a link with directions to the parking ramp the visitor is assigned to. If the parking is not nearby a meeting location of the visitor, the parking agent 1206 arranges a shuttle and includes the shuttle information in the text.

In some embodiments, if any unidentified person is entering a building with an identified employee, facility operations agent 1208 is configured to provide an alert a receptionist and indicate the presence of the unidentified person with a visible light indication. Furthermore, the facility operations agent 1208 is configured to log in the entry and exit time of each employee and integrate this information with various human resource systems. The time login can take place from any of the building entrances and/or exits.

In some embodiments, the facility operations agent 1208 is configured to log out visitors exiting along with employees automatically via facial recognition even if the visitor exits from a non-visitors gate of the building. In some embodiments, if an employee wishes to find the location of their colleague within a building, and depending on permission and/or roles assigned to the employee, the facility operations agent 1208 is configured to identify the location of the colleague via facial recognition by closed-circuit television (CCTV) cameras throughout the building and/or using wireless beacon tracking systems.

Throughout the building some doors may have wireless access control using smart phones, that will be linked with the employees identify. The CCTV cameras may provide camera feeds to the facility operations agent 1208, the facility operations agent 1208, via the camera feeds, is configured to detect the suspicious behavior. The system will notify the security of any behavior and identify the person committing it. This will include in and/or out of the building. The facility operations agent 1208 is configured to detect out of hours suspicious behaviors based on the camera feeds.

In some embodiments, all cameras throughout the building will have facial recognition capabilities and the facility operations agent 1208 is configured to track occupants through the building and provide their last location when asked by the security or authorized personnel. The facility operations agent 1208 is configured to be able to instantly say who is and who is not within the building and will be able to track the history of movement.

If a visitor arrives with a staff member, the receptionist will update the visitor into the arrival and departure agent 1204 with the details and host information of the visitor. If the visitor leaves with an employee from a staff exit, regardless from where he entered, the facility operations agent 1208 is configured to recognize the visitor and update the reception and arrival and departure agent 1204 with an indication that the visitor has left the building.

In some embodiments, when and if required for future access control, the facility operations agent 1208 is configured to add and/or remove door-locks without having to do any rewiring. If any VIP is entering the building whether form a visitor entrance or a staff entrance, the facility operations agent 1208 is configured to detect, via facial recognition, the presence of the VIP and communicate with the arrival and departure agent 1204 to execute a VIP protocol and inform the relevant staff via the chatbot 1100. In some embodiments, the facility operations agent 1208 is configured to receive information from a Wi-Fi scanner, a smart phone reader, a face recognition system continuously to validate employees and visitors while they are in the building and/or and updates the location of visitor and employee while they are within the building.

In some embodiments, the workplace design agent 1210 is configured to provide a digital twin display of all spaces of a building in a three dimensional map. In some embodiments, the workplace design agent 1210 is configured to filter which space information to display (e.g., temperature, lighting, occupancy, etc.). The facility operations agent 1208 is configured to filter the information by floor and by zone, in some embodiments.

In some embodiments, the workplace design agent 1210 is configured to detect locations of the building with data below the acceptable range (under populated areas, unused lighting or chilling). The workplace design agent 1210 is configured, in some embodiments, to automatically switch off or dim lights in under-populated areas. In some embodiments, the workplace design agent 1210 is configured to automatically reduce chilling in under populated areas, in some embodiments.

In some embodiments, the workplace design agent 1210 is configured to detect locations of the building with data increasing above the acceptable range (increased temperature, over populated areas, etc.). The workplace design agent 1210 is configured to automatically turn on cooling in the detected locations of the building. The workplace design agent 1210 is configured to analyze the occupancy and temperature of different areas of the building and compare different areas of the building. The workplace design agent 1210 is configured to recommend employees in real-time to use other locations that are under populated to balance the occupancy, in some embodiments. In some embodiments, the workplace design agent 1210 is configured to provide enough power, temperature, and lighting for employees to use the new locations.

Workplace design agent 1210 is configured to analyze the occupancy patterns per working hours and working days, in some embodiments. The workplace design agent 1210, is configured, in some embodiments, to analyze and understand each employee space utilization pattern/behavior and will recommend enhanced utilization behaviors to each employee based on temperature and lighting preferences.

In some embodiments, the workplace design agent 1210 is configured to analyze the occupancy patterns per working hours and working days. The workplace design agent 1210 is configured to identify frequent over-populated and frequent under-populated areas despite its recommendations to Employees. In some embodiments, facility managers will be able to take decisions to relocate certain functions that impact the space occupancy.

In some embodiments, employees will be able to control the space ambience (lighting and temperature) through the chatbot 1100. The workplace design agent 1210 is configured to learn the employee preferences and in the future, automatically adjust the space ambience accordingly, in some embodiments. If different employees in the same space have different preferences, the workplace design agent 1210 is configured to automatically average the ambience accordingly.

In some embodiments, if required, the workplace design agent 1210 is configured to identify individuals who have common ambient preferences. In some embodiments, the workplace design agent 1210 is configured to socially connect the identified individuals together and recommend them to hangout in the same areas to optimize power utilization.

In some embodiments, the workplace design agent 1210 is configured to send quick questionnaire to employees every time they use a new space asking them "How productive was your day?" In some embodiments, the workplace design agent 1210 is configured to store this data in the preference profile of the employee and understand whether the preference of the employee actually drives him to be productive. In some embodiments, the workplace design agent 1210 is configured to learn when and where employees are actually productive and will recommend them in the future to select the best ambience and the best location.

In some embodiments, the workplace design agent 1210 is configured to agent use a schedule of an employee to determine employees coming into building soon. In some embodiments, the workplace design agent 1210 is configured to pre-adjust temperature, lighting, and/or air quality before arrival of an employee. In some embodiments, a smart space application and/or chatbot 1100 notifies occupants that there is an emergency (like fire alarm). In some embodiments, the workplace design agent 1210 is configured to send notifications to emergency responders if people are in danger in the space.

For a facility manager, energy consumption information is reported in various formats and timelines by the workplace design agent 1210. The formats illustrate energy savings month-by-month and year-by-year through a space management dashboard. The workplace design agent 1210 is configured to provide artificial intelligence powered back end analytics and can recommend energy optimization actions.

Furthermore, for a facility manager, the workplace design agent 1210 is configured to report utilization data in various formats and timelines. The report may illustrate space usage by day, week, month, and year. The report may illustrate space usage to show actual space usage vs. space reservations from the meeting reservation system though the space management dashboard. In some embodiments, for an employee and/or visitor, the employee and/or visitor can report and create service requests to facility manager through a mobile app and/or the chatbot 1100. In some embodiments, the employee and/or visitor can request any facility service including cleaning, catering, supply refill, repair of office equipment via the agents 1202-1214.

In some embodiments, the facility operations agent 1208 is configured to integrate with all building, elevator systems, information technology systems, etc. in a single Data-Lake. Operator can, via the facility operations agent 1210, customize and/or build any dashboard components to display any current status information and/or reporting for information of the data lake. Furthermore, in some embodiments, the facility operations agent 1208 is configured to continuously optimize on the energy consumption, efficiency, and/or improve the carbon footprint of a building. The facility operations agent 1208 is configured, in some embodiments, to measure improvements on saving continuously measured against key performance indicator compliance.

In some embodiments, the facility operations agent 1208 is configured to perform artificial intelligence based self-healing in which a building system will take directly decisions to remedy a fault and/or compensate by adjusting adjacent equipment and/or informing a facility manager. When a fault occurs, the facility operations agent 1208 is configured to validate the alarm, inform the facility personnel via a hand-held device push notification or text message depending on the urgency of the fault.

In some embodiments, facility operation agent 1208 includes access to all the building mechanical, electrical, and/or plumbing information in a three dimensional representation of the building. The operator will be able to zoom in digitally onto any of the device and equipment and view the current status, history, and/or Datasheets, in some embodiments. The three dimensional digital twin will also contain information of all assets, employee and occupancy data, space characteristics, and/or usage. The three dimensional digital twin may illustrate the distribution of employees and employees and a heatmap of energy consumption and efficiency.

In some embodiments, the facility operations agent 1208 is configured to continuously improve and save time by automating routine tasks, streamlining processes, and/or eliminating redundant steps to meet the workflow needs of staff while complying with various regulations and using collaborative work environment. In some embodiments, the facility operations agent 1208 is configured to monitor and/or improve service quality by making it faster and easier for facility management professionals to access and share information for knowledge-driven decisions that improve outcomes and/or by helping to make sure that the right resources are in the right place at the right time.

In some embodiments, the facility operations agent 1208 is configured to identify abnormal behavior of equipment and/or devices. Once an equipment has been identified the facility operations agent 1208 is configured to inform facility management personnel and take self-healing actions. In some embodiments, the facility operator should be able to review data without opening other operational applications via a single integrated collaboration work environment. Tasks, budget and resources are synchronized and/or syndicated in real time with other enterprise resource planning (ERP) and project management systems as required, in some embodiments. In case of low inventory of any of the equipment or materials, or unavailability of spare parts, facility operations agent 1208 will integrate with an inventory and be able to generate purchase requisitions and/or orders, in some embodiments.

In some embodiments, an employee can ask the chatbot 1100 if any of the nearby dining options are serving an particular lunch entry on a current and/or future day. The chatbot 1100 is configured to determine whether any nearby restaurants are serving the requested type of lunch entry as well as nutrition information for the entry. If an employee is hosting a guest, the employee can register the guest with the arrival and departure agent 1204. The arrival and departure agent 1204 is configured to text the visitor with a parking code and directions to the building and any other information we need if this is a first-time visitor. The visitor picks up a badge when they arrive in the lobby and the badge is registered in the food and beverage agent 1212 at the same time. When the visitor orders food via the food and beverage agent 1212, the visitor "pays" using their badge and all billing is automatically applied to a cost center application associated with the user.

In some embodiments, an order bot orders and coordinates a time for dinner. The order bot can be a kiosk, a mobile robot, the food and beverage agent 1212, etc. The order bot puts food orders into the food and beverage agent 1212 so that the food and beverage agent 1212 can facilitate prompting automatic food preparation systems and/or food preparation individuals to prepare the food so that the food is ready for at an arrival time of the individuals placing the order. The order bots can be configured to utilize signage at a tables and occupancy sensors to detect a free table shortly before the individuals placing the orders arrive reserves the table for the individuals. The bot texts the individual the table location and at time to pick up the food.

In some embodiments, an employee can tell the chatbot 1100 a time that they would like to leave an office, e.g., between 8:00 PM and 8:30 PM. The chatbot 1100 and/or the transportation agent 1214 is configured to identify employees who live nearby the requesting employee and are leaving leave about the same time. The chatbot 1100 and/or the transportation agent 1214 is configured to arrange a ride sharing service with the two employees. If the ridesharing is through a taxi service, the cost of transportation can be split between the employees and/or a sponsor (e.g., a business) can cover the cost of transportation.

A facility manager may realize that there is a shortage of dockless bikes or electric scooters near a building. The facility manager can ask the chatbot 1100 to message people who may have meetings in and/or near my building in the next few hours to ride a bike and/or scooter over to rebalance the dock. The bike-riders are rewarded with an item from a cafeteria or through progress on their fitness goals If an employee typically takes a bus, tram, bike or other form of transportation to work, the employee may not be associated with a parking spot. Furthermore, if the employee is physically injured and unable to walk long distances, the employee can ask the chatbot 1100 to arrange temporary parking on campus in a spot as close to the doors as possible to minimize walking. The chatbot 1100 can communicate the request to the transportation agent 1214 and the transportation agent 1214 can be configured to facilitate the request.

A visitor may be staying at a hotel near a building. The arrival and departure agent 1204 can be configured to texts a quick response (QR) code that will pay for transportation fares from the hotel to the building and/or from the building back to the hotel, provide directions the transportation (e.g., what bus to use, what tram station to use, what train line to use, etc.).

Figure 13:
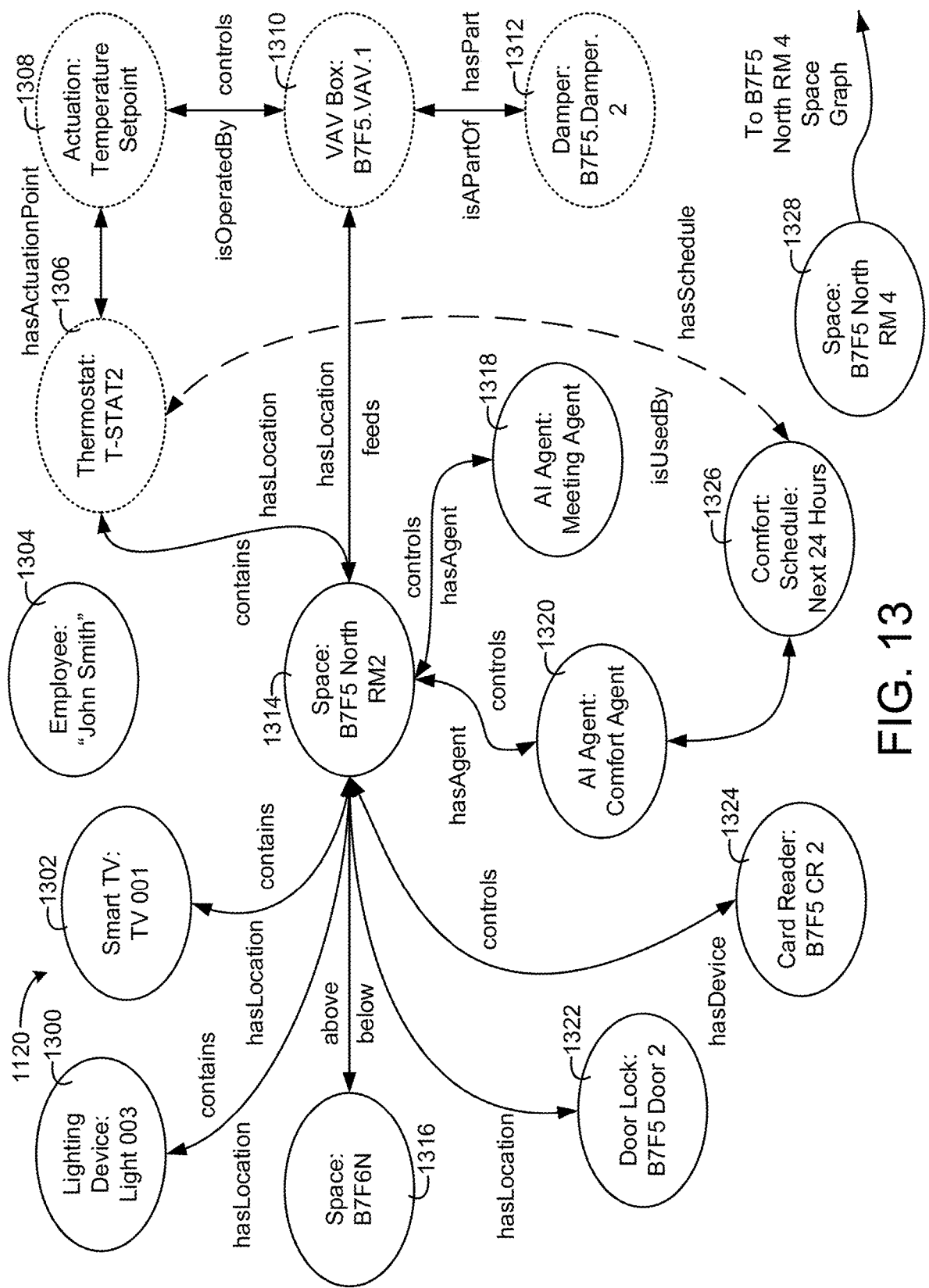
FIG. 13 is a block diagram of the space graph of FIG. 11 in greater detail, according to an exemplary embodiment.

Referring now to FIG. 13, the space graph database 1120 is shown in greater detail, according to an exemplary embodiment. The space graph database 1120 includes entities 1300-1328 (stored as nodes within the space graph database 1120) describing spaces, devices, people (e.g., business employees), and agents implementing artificial intelligence. Furthermore, relationships are shown between the entities 1300-1328 directionally describing relationships between two of the entities 1300-1328 (stored as edges within the space graph database 1120). With the space graph database 1120, various control application systems and/or agents can receive a description of what types of actions to take from a certain device, what the current status of a room is (e.g., occupied or unoccupied), etc. The space graph database 1120 is flexible in managing new entities and relationships that are very expensive with a conventional database such as a relational database management system (RDBMS).

As an example, the space graph database 1120, as shown in FIG. 13, illustrates an office space called "B7F5 North RM2" of a building. In some embodiments, the space graph learning service 1104 extracts the nodes of the space graph database 1120 from various data sources including a building automation system, a security system, a fire alarm, human resources system, and/or building information model (BIM) files (e.g., the building data sources 1102) through an entity name matching process. Furthermore, semantic relationships can be extracted from the building information by the space graph learning service 1104. Even though the nodes and edges of the space graph database 1120 are generated based on the determination of existing entities and relationships between entities, many relationships may be missing but can be discovered from collected building data that is ingested into the space graph database 1120, e.g., sensing and actuation data. As an example, an employee entity, John Smith, can be found from a cardholder database but a relationship between John Smith and his office cannot initially be determined. Similarly, the space graph learning service 1104 is configured to identify a door lock and card reader but without operational data, the space graph learning service 1104 cannot determine whether a card reader "B7F5Cr2" is controlling a door lock "B7F5 Door 2".

For example, entity 1300, a lighting element referred to as "Light 0003" has a directional relationship to the space 1314 referred to as "B7F5 North RM2." The relationship may be an edge "hasLocation" indicating that the entity 1300 has a location, the entity 1314. Furthermore, a second edge "contains" from the entity 1314 to the entity 1300 indicates that the space 1314 includes the entity 1300 within it.

As another example, space 1316 and space 1314 have relationships between them. A directional relationship from the space 1316 to the space 1314 indicates that the space 1316 is above the space 1314, i.e., that space 1316 is on a floor within a building above the space 1314. Furthermore, a second relationship from the space 1314 to the space 1316 indicates the location of the space 1314 relative to the space 1316, the relationship is a below relationship indicating that the space 1314 is below the space 1316.

In some embodiments, only a single relationship exists between entities. For example, door lock 1322 has a location within the space 1314 as represented by the "hasLocation" edge. As shown, there is no relationship between the space 1314 to the door lock 1322. Since door lock 1322 has a location within the space 1314, the space graph learning service 1104 could be configured to automatically add a corresponding relationship from the space 1314 to the door lock 1322, e.g., a "contains" edge indicating that the door lock 1322 is contained within the space 1314. Furthermore, additional relationships could be added between the door lock 1322 and the space 1314 in addition to the "hasLocation" and "contains" edges. For example, if the space graph learning service 1104 is configured to add a "controls" or "allowsAccessTo" edge from the door lock 1322 to the space 1314 indicating that the door lock 1322 is a security measure controlling access to the space 1314.

The entities 1306-1312 are shown in dashed lines indicating that the entities 1306-1312 are related to environmental conditioning. In this regard, each of the node of the space graph database 1120 may represent what subsystem, e.g., HVAC, security, fire, etc. that they belong to. In some embodiments, each of the entities 1306-1312 include relationships to a subsystem node. For example, a HVAC subsystem node may exist which includes a set of relationships "has" to entities 1306-1312 indicating that the HVAC subsystem has the entities 1306-1312. The entities 1306-1312 may each include a "isAPartOf" relationship from the entities 1306-1312 to the HVAC subsystem node to indicate that the entities 1306-1312 form an HVAC subsystem.

Comfort agent 1320 and meeting agent 1318 are configured to provide control of the space 1314, in some embodiments. The comfort agent 1320 is configured to control environmental conditions (e.g., temperature, lighting, humidity, etc.) for the space 1314, in some embodiments.

The meeting agent 1318 can be configured to perform scheduling of meetings and/or communication with meeting organizers and/or meeting attendees. The meeting agent 1318 can be the same as and/or similar to the meeting room agent 1202. The comfort agent 1320 and the meeting agent 1318 each include an edge to the space 1314 indicating "controls," a semantic relationship indicating that the agents 1320 and 1318 are assigned to perform operations for the space 1314. The relationships "has Agent" can be the edges between the space 1314 to the agents 1318 and 1320 representing that the space 1314 has agents that it is assigned.

The comfort agent 1320 is configured to generate a schedule 1326. The schedule 1326 can be a temperature schedule for the space 1314. In some embodiments, the space graph learning service 1104 is configured to learn a new relationship from existing relationships for the space graph database 1120. For example, the agent 1320 can cause the space graph database 1120 to include a new node for the schedule 1326 in response to being run for a first time. The space graph learning service 1104 can identify that the agent 1320 controls the space 1314 and also that the thermostat 1306 has a relationship to other equipment, VAV box 1310, that feeds the space 1314. Based on these relationships, the space graph learning service 1104 can add edges "hasSchedule" and "isUsedBy" between the thermostat 1306 and the schedule 1326 to indicate that the thermostat 1306 should run the schedule 1326 and that the schedule 1326 is used by the thermostat 1306.

Furthermore, the space graph database 1120 includes datapoints within it and their relationship to other pieces of equipment. For example, temperature setpoint 1308 may be an actuation point of thermostat 1306 as represented by the edge "hasActuationPoint" from the thermostat 1306 to the temperature setpoint 1308. The temperature setpoint 1308 controls VAV box 1310, i.e., changes in the value of the temperature setpoint 1308 adjusts the operation of the VAV box 1310. Furthermore, an edge between the VAV box 1310 and the temperature setpoint 1308 indicates that the VAV box 1310 is operated based on the temperature setpoint 1308 "isOperatedBy."

In some embodiments, the entities 1300-1328 have components. For example, VAV box 1310 may include the damper 1312. In this regard, an edge between the VAV box 1310 and the damper 1312 may indicate that the damper is a part of the VAV box 1310 "isAPartOf." Furthermore, an edge between the VAV box 1310 and the damper 1312 may indicate that the VAV box 1310 has the damper 1312 as a part, i.e., "hasPart."

Figure 14:
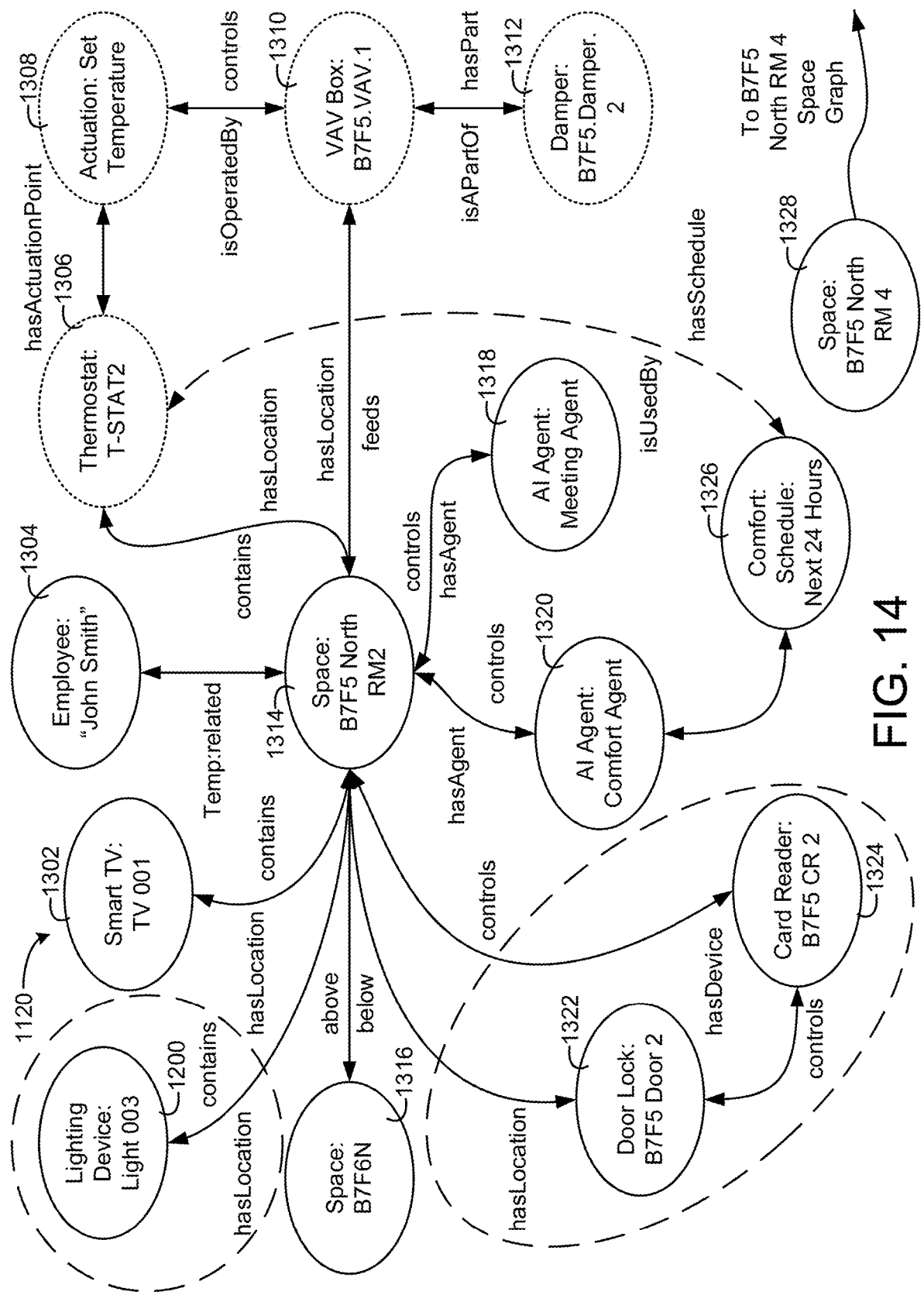
FIG. 14 is a block diagram of the space graph of FIG. 13 where a new relationship for the space graph is learned and a temporary relationship is added, according to an exemplary embodiment.

Referring now to FIG. 14, the space graph database 1120 is shown where the space graph learning service 1104 learns new relationships for the space graph database 1120 and adds new corresponding edges to the space graph database 1120, according to an exemplary embodiment. The graph learning service 1104 is configured to apply multiple different forms of learning to the space graph database 1120. The space graph learning service 1104 is configured to automatically generate the space graph database 1120, deduce and/or fill-in missing relationships after the space graph database 1120 is generated, deduce new entity types for newly added entities, and/or predict a future state of an entity.

One example of the learning that the space graph learning service 1104 is configured to perform is to observe co-occurrences of discrete events within predetermined intervals overtime. The table below indicates events that, when occurring within a predefined amount of time, indicate that the employee 1304 "John Smith" is related to the space 1314 "B7F5 North RM2." The events are determined by the space graph learning service 1104 based on predicate logic, wherein the predicate of the logic used to generate the events are the edges of the space graph database 1120, the actions or operational data can be data ingested into the space graph database 1120, and the entities referred to by the logic can be the nodes of the space graph database 1120.

| Event No. | Description | Predicate Logic-based Description |
| --- | --- | --- |
| 1 | B7F5 CR 2: John Smith's card swiped | CardSwap(CardHolder("John Smith")) && CardReader("B7F5 CR 2") && HasLocation("B7F5 CR 2", ""B7F5 North RM 2") |
| 2 | B7F5 Door 2: Normal Door Unlock | DoorOpenNormal("B7F5 Door 2") && HasLocation("B7F5 Door 2", ""B7F5 North RM 2") |
| 3 | Light: Light 003 ON | On("Light 003") && HasLocation("Light 003", ""B7F5 North RM 2") |
| 4 | Smart TV: TV 001 ON | TurnOn("TV 001") && HasLocation("TV 001", ""B7F5 North RM 2") |

The space graph learning service 1104 is configured to determine, based the logic rules and the data to the space graph database 1120 (e.g., the nodes, edges, and operational data ingested into the space graph database 1120) the occurrence of one or more events. If the space graph learning service 1104 determines the one or more events occurring within a predetermined time interval, the space graph learning service 1104 can implement a process to reasoning about new potential relationships among entities. For example, if the space graph learning service 1104 captures a predefined amount the events of the table below every hour for a set number of hours, a relationship can be determined between the entity john smith 1304 and the space 1314. Furthermore, based on behaviors and/or patterns in occupancy of the space 1314 determined from the rules of the table below, the agent 1320 can mine occupancy patterns for the space 1314 and generate and/or update the schedule 1326 to preheat and/or precool the space 1314.

For example, the first rule,
CardSwap(CardHolder("John Smith")) && CardReader ("B7F5 CR 2") && HasLocation ("B7F5 CR 2", ""B7F5 North RM 2")
may create an event that a particular entity, employee 1304 has entered the space 1314. The rule may indicate that if a card swap occurs for employee 1304 and the card reader at which the card swap occurred is the card reader 1324 and that the card reader 1324 has a location of the space 1314, an event that the employee 1304 has entered the space 1314. The rule can be tested by the space graph learning service 1104 via the relationships, nodes, and ingested data of the space graph database 1120. A similar event can be created for any user entity of the space graph database 1120. If the space graph learning service 1104 determines that the event has occurred a predefined mount of times within a predefined period of times, e.g., the event has occurred twenty times within a week, this may indicate that there is a relationship between the employee 1304 and the space 1314.

As another example, the second rule,
DoorOpenNormal("B7F5 Door 2") && HasLocation ("B7F5 Door 2", ""B7F5 North RM 2")
may create an event that a particular door of a conference room has been opened, specifically, the door lock 1322 has opened a door of space 1314. If a door is opened, based on the door lock 1322 unlocking, and the door lock 1322 has a location of the space 1314, this may indicate that a door of the space 1314 was opened. If the first and second rules described above indicate that the door of the space 1314 has opened and that a particular user has used a card reader to enter the space 1314, the space graph learning service 1104 can determine that the card reader 1324 controls the door lock 1322. For example, if a predefined number of the first and second rules occurring within predefined amounts of time from each other are recorded by the space graph learning service 1104, the space graph learning system can cause the space graph database 1120 to add an edge between the door lock 1322 and the card reader 1324.

As another example, the third rule,

On("Light 003") && HasLocation("Light 003", ""B7F5 North RM 2") 3 and fourth rule, TurnOn("TV 001") && HasLocation("TV 001", ""B7F5 North RM 2")

may create events that an activity within the space 1314 has occurred, indicating occupancy. In some embodiments, the comfort agent 1320 analyzes the data of the space graph database 1120 to determine whether the third or fourth rules have occurred and is configured to update and/or generate the schedule 1326 based on patterns of the third or fourth events over time. For example, if the fourth event occurs at 9 A.M. every working day, the agent 1320 can adjust the comfort schedule 1326 to be a preheat and/or precool the space 1314 to an appropriate temperature by 9 A.M. on working days.

The third event may indicate that the lighting device 1300 turns on and has a relationship between the lighting device 1300 and the space 1314. The light turning on can be determined based on operational data ingested into the space graph database 1120 while the relationship can be determined from the existence of the edge between the lighting device 1200 and the space 1314. Similarly, if the smart TV 1302 turns on and a relationship exists between the smart TV 1302 and the space 1314, the smart TV 1302 turning on in the space 1314 can be determined. Similarly, the operational data indicating that the smart TV 1302 has turned on can be determined from operational data ingested in to the space graph database 1120 while the relationship between the smart TV 1302 and the space 1314 can be determined from the "hasLocation" edge existing between the smart TV 1302 and the space 1314.

Figure 15:
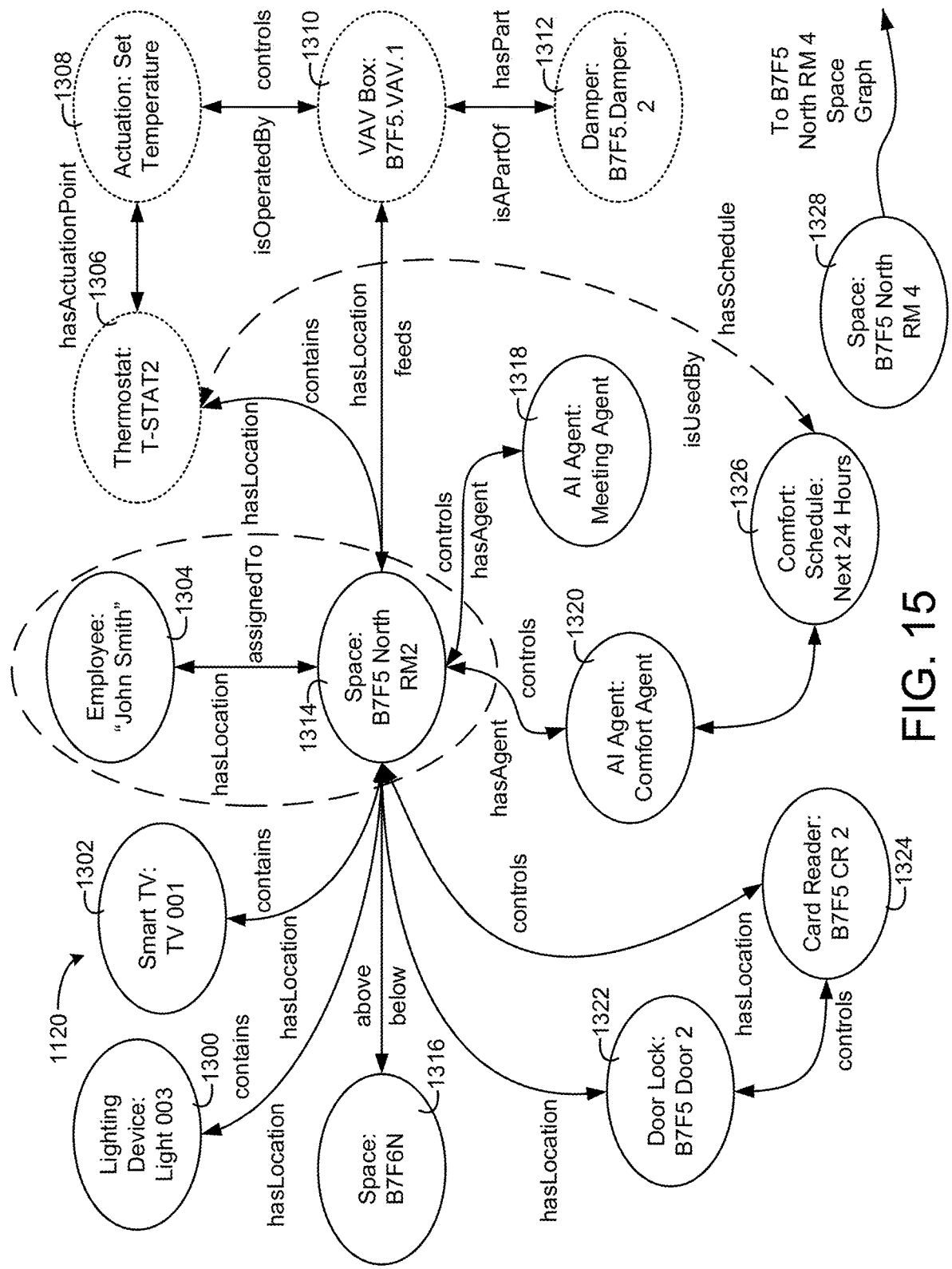
FIG. 15 is a block diagram of the space graph of FIG. 14 where a permanent relationship is learned for replacing the temporary relationship, according to an exemplary embodiment.

Referring to FIG. 15, the space graph database 1120 is shown where the space graph learning service 1104 replaces a temporary relationship with a permanent relationship, according to an exemplary embodiment. As described with reference to FIG. 14, rules can be utilized to determine a relationship between entities, specifically, using a few days of operational data ingested into the space graph database 1120 observation, the space graph learning service 1104 is configured to discover the third event (e.g., the lighting device 1300 turning on in the space 1314), the first event (e.g., the employee 1304 accessing the card reader 1324 with an access card), and the second event (e.g., a door of the space 1314 opening via the door lock 1322) occur at a predefined frequently. The relationship can be added as a temporary relationship between the employee 1304 and the space 1314.

The space graph learning service 1104 can periodically test the temporary relationship to determine whether the temporary relationship should be converted into a permanent relationship. For example, at periodic intervals, the space graph learning service 1104 is configured to analyze newly ingested operational data and/or newly added entities and/or relationship of the space graph database 1120 to generate a confidence level that the permanent relationship should exist and, in response to determine a confidence level above a predefined amount, replace the temporary relationship with a permanent relationship. In some embodiments, the space graph learning service 1104 replaces the temporary relationship with two permanent relationships, i.e., two edges between the employee 1304 and the space 1314.

For example, the employee 1304 may include an edge to the space 1314 which indicates that the employee is associated with the space 1314, e.g., a "hasLocation" edge. Furthermore, an edge from the space 1314 to the employee 1304 can be added to indicate that the space 1314 is assigned to the employee 1304 (e.g., the space 1314 is an office of the employee 1304), this edge may be the "assignedTo" edge.

Figure 16:
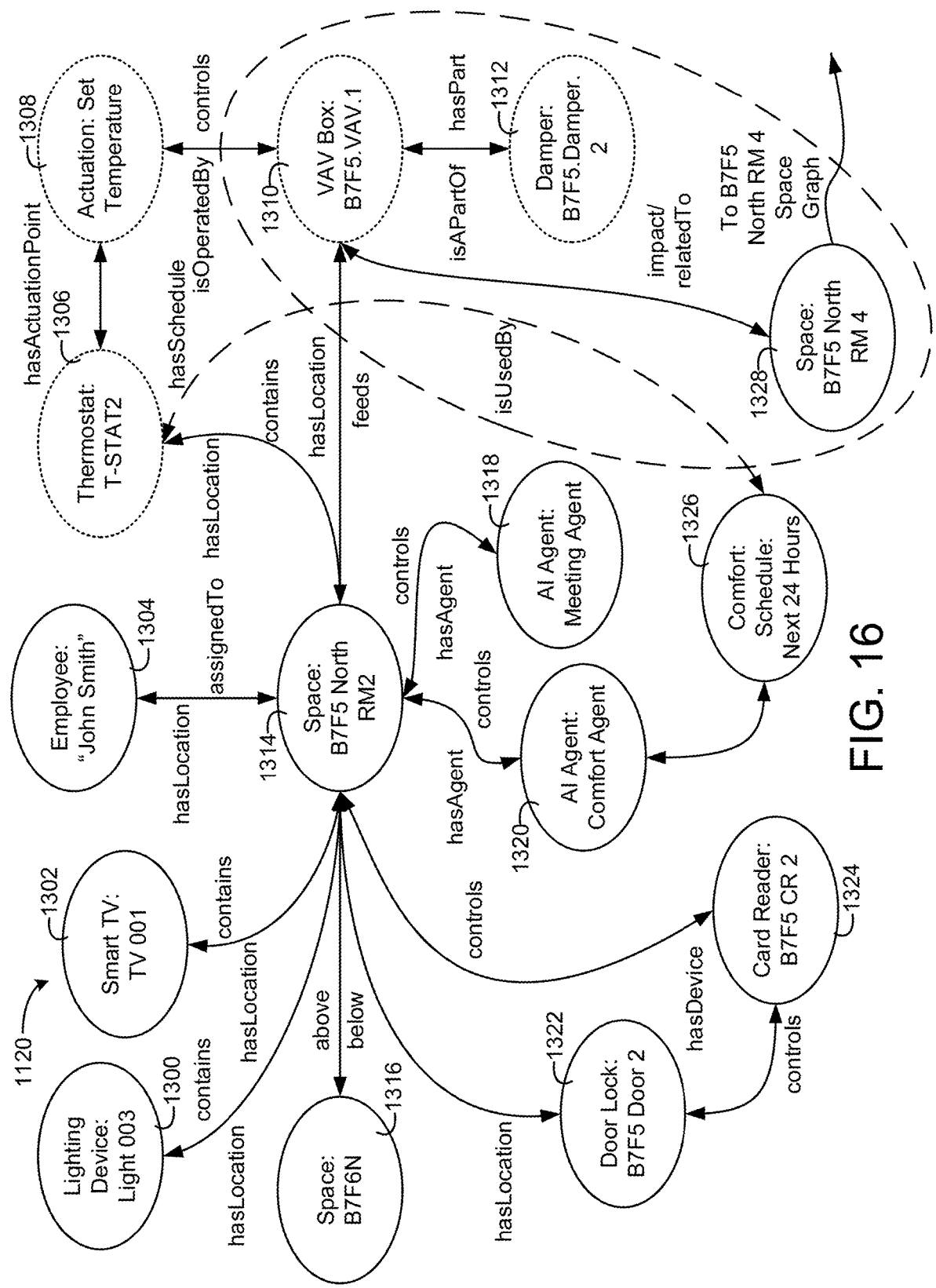
FIG. 16 is a block diagram of the space graph of FIG. 15 where an impact relationship is learned indicating an effect of a control algorithm on multiple entities, according to an exemplary embodiment.

Referring now to FIG. 16, the space graph database 1120 is shown where an impact relationship is identified and added to the space graph database 1120 by the space graph learning service 1104, according to an exemplary embodiment. The "impact" or "relatedTo" edge can be identified by the space graph database 1120 by analyzing operational data, nodes, and edges of the space graph database 1120. The impact relationship can be an indication that operations performed by a first entity indirectly affect a second entity. For example, if the VAV box 1310 operates to condition the space 1314 this may indirectly affect the space 1328.

The impact relationship can assist the agents of the space graph database 1120 in implementing energy efficient control algorithms. For example, the space graph learning service 1104 is configured to determine, based on observing air volume changes for multiple zones, that the operation of the VAV box 1310 affects the space 1328 (the same supply air is used for both the space 1314 and the space 1328 and thus operation of the VAV box 1310 affects both spaces). By analyzing the impact edges of the space graph database 1120, the agent 1320 can optimize the comfort schedule 1326 to take into account the space 1328, for example, the comfort agent 1320 can coordinate with another comfort agent of the space 1328 to generate complimentary schedules of the space 1314 and the space 1328 which utilize the impact relationship to reduce overall energy consumption.

Figure 17:
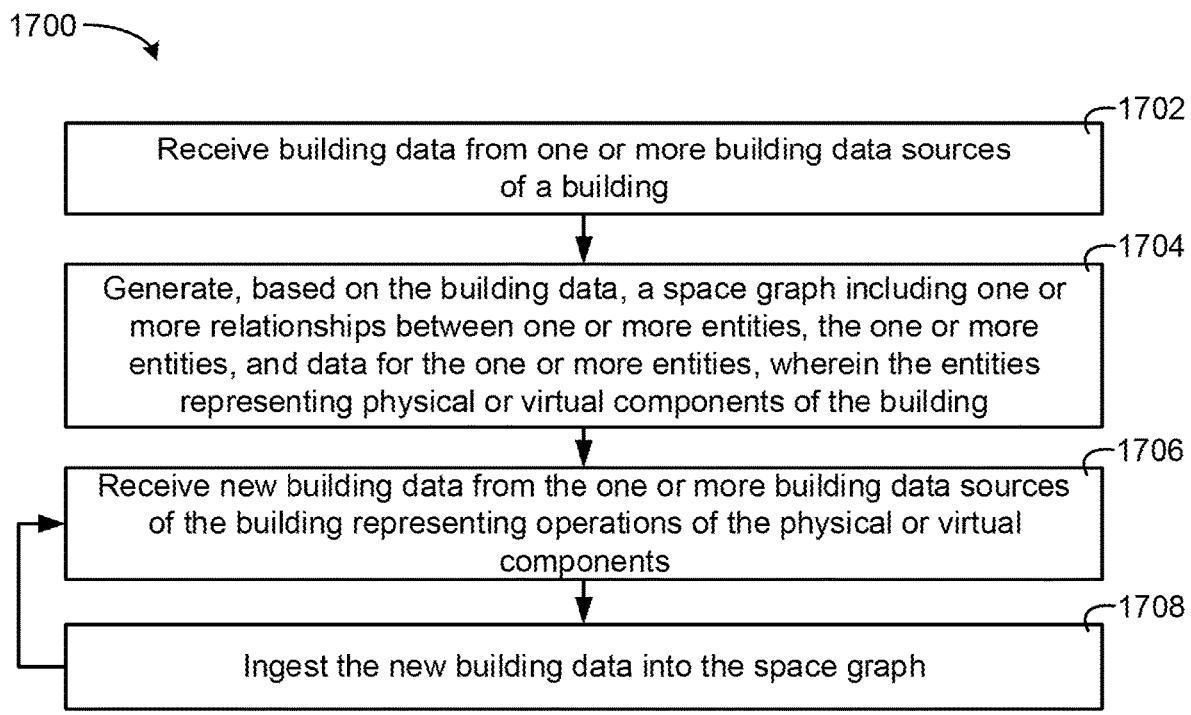
FIG. 17 is a flow diagram of a process for generating the space graph of FIG. 11 wherein a first entity and a second entity include a first relationship between the first entity and the second entity and a second relationship between the second entity and the first entity, according to an exemplary embodiment.

Referring now to FIG. 17, a process 1700 for generating the space graph database 1120 by the space graph learning service 1104 is shown, according to an exemplary embodiment. In some embodiments, the space graph learning service 1104 is configured to perform the process 1700 to generate the space graph database 1120. Instructions stored on one or more memory devices and executed on one or more processors can be configured to implement the space graph learning service 1104 and the generation of the space graph database 1120. Furthermore, any processing device, system, and/or software component as described herein can be configured to perform the process 1700.

In step 1702, the space graph learning service 1104 receives building data from one or more building data sources of a building, e.g., the building data sources 1102. The building data sources 1102 can be BMS systems, point descriptions files, data files including entities and relationships between the entities, security system data, human resources data, access control system data, etc.

In step 1704, the space graph learning service 1104 is configured to generate the space graph database 1120. The space graph database 1120 can include one or more entities, included as nodes within the space graph database 1120, and one or more relationships, included as directional edges between the nodes within the space graph database 1120. The entities can represent physical and/or virtual components of a building for which the data is received in the step 1702. In some embodiments, the space graph learning service 1104 parses the building data of the step 1702 to identify each entity represented in the building data and identifies relationships between the entities.

In step 1706, new building data can be received from the building data sources of the building representing operations of the physical and/or virtual components. In some embodiments, the new building data is operational data for a physical component, e.g., temperature measurements by a temperature sensor, access requests to an access control system, elevator request for an elevator, damper position of a VAV box, etc. Furthermore, the building data can represent operation of virtual components. For example, a temperature setpoint being adjusted by a user, a performance metric (e.g., energy usage metric) changing, etc. The new building data can be representative of various values for the various nodes of the space graph database 1120.

In step 1708, the space graph learning service 1104 is configured to ingest the new building data into the space graph database 1120. For example, the space graph database 1120 can be updated to store values representing operations, data collections, and/or adjustments to the physical and/or virtual components represented as nodes within the space graph database 1120. New data can be continually received by the space graph learning service 1104 from the building data sources 1102 and ingested into the space graph database 1120. In this regard, the steps 1706 and 1708 can be performed continuously and/or periodically.

Figure 18:
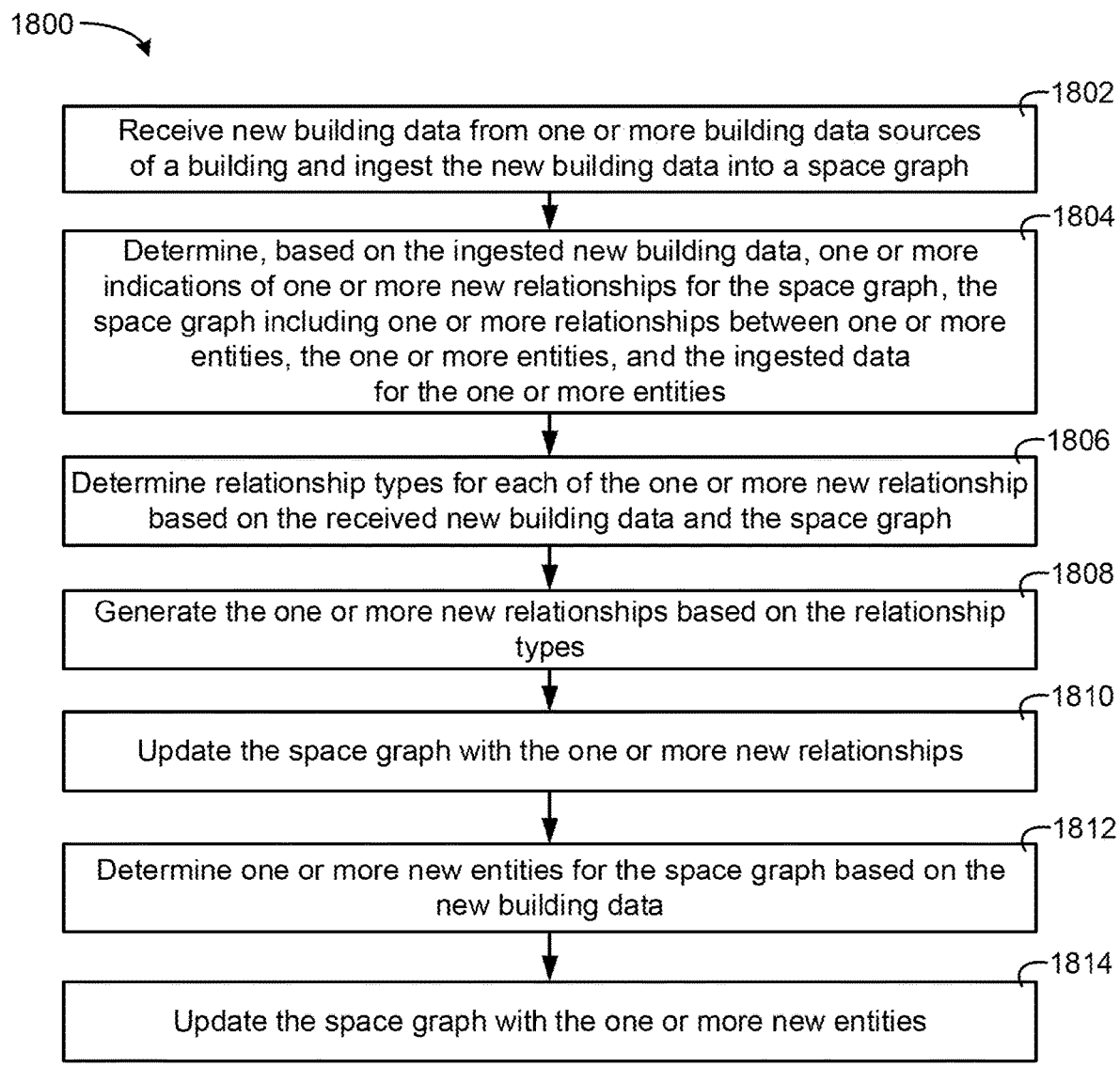
FIG. 18 is a flow diagram of a process for learning new relationships for the space graph of FIG. 11 and updating the space graph with the new relationships, according to an exemplary embodiment.

Referring now to FIG. 18, a process 1800 for updating a space graph database 1120 by the space graph learning service 1104 with new entities and/or new relationships between entities is shown, according to an exemplary embodiment. In some embodiments, the space graph learning service 1104 is configured to perform the process 1800 to generate the space graph database 1120. Instructions stored on one or more memory devices and executed on one or more processors can be configured to implement the space graph learning service 1104 and the generation of the space graph database 1120. Furthermore, any processing device, system, and/or software component as described herein can be configured to perform the process 1800.

In step 1802, the space graph learning service 1104 received new building data from one or more building data sources of a building for an existing space graph database 1120. For example, the space graph learning service 1104 can received new building data from the building data sources 1102 indicating the operation of the building, i.e., operational data for the entities of the space graph database 1120. The space graph learning service 1104 can ingest the new building data into the space graph.

In step 1804, the space graph learning service 1104 can determine based on the new building data of the step 1802 one or more new relationships for the space graph, the space graph including one or more relationships between one or more entities, and data for the one or more entities. In some embodiments, the space graph learning service 1104 analyzes the newly ingested building data of the space graph database 1120 utilizing various relationship event rules (e.g., the rules as described with reference to FIG. 14) and/or machine learning models to generate the new relationships.

In step 1806, the space graph learning service 1104 determines relationship type for the one or more new relationships. For example, the space graph learning service 1104 can identify the node types of nodes of the space graph database 1120 for which the new relationships are for and generate the relationship types based on the node types. For example, for a thermostat and a room, the space graph learning service 1104 can add a "controls" and "isLocatedIn" relationship types between the two nodes. In some embodiments, the relationship types are based on an analysis of the new data. For example, if the new building data indicates that operating a particular actuator device changes temperature measured by a particular sensor device, this may indicate that the impact relationship should be generated.

In step 1808, the space graph learning service 1104 can generate the one or more new relationships based on the relationship types. The generated relationships may be edges for multiple nodes. In step 1810 cause the space graph to include and/or store edges representing the one or more new relationships.

In step 1812, the space graph learning service 1104 is configured to utilize the new building data, which may be ingested into the space graph database 1120. In some embodiments, new data can be received from a building subsystem, the new data indicating a new point and/or new device. In some embodiments, the new data may represent a newly installed device. In this regard, the space graph learning service 1104 is configured to parse the data with machine learning models, dictionaries, etc. to identify the new entity. In step 1814, the space graph learning service 1104 can update the space graph database 1120. In some embodiments, updating the space graph database 1120 includes causing the space graph database 1120 to include and/or store new nodes within the space graph database 1120. Furthermore, similar to steps 1808-1810, based on the new entities and/or the new building data (or data received after the new building data), additional new relationships can be generated. The relationships can be relationships between two new entities and/or between a previous entity and/or a new entity. In this regard, a new entity could be added to the space graph although the data used to generated the new entity may not indicate any relationships for the entity. After more data is received (e.g., data generated by the new entity), based on the space graph with the new entity and/or the new data, new relationships for the new entity can be determined.

Figure 19:
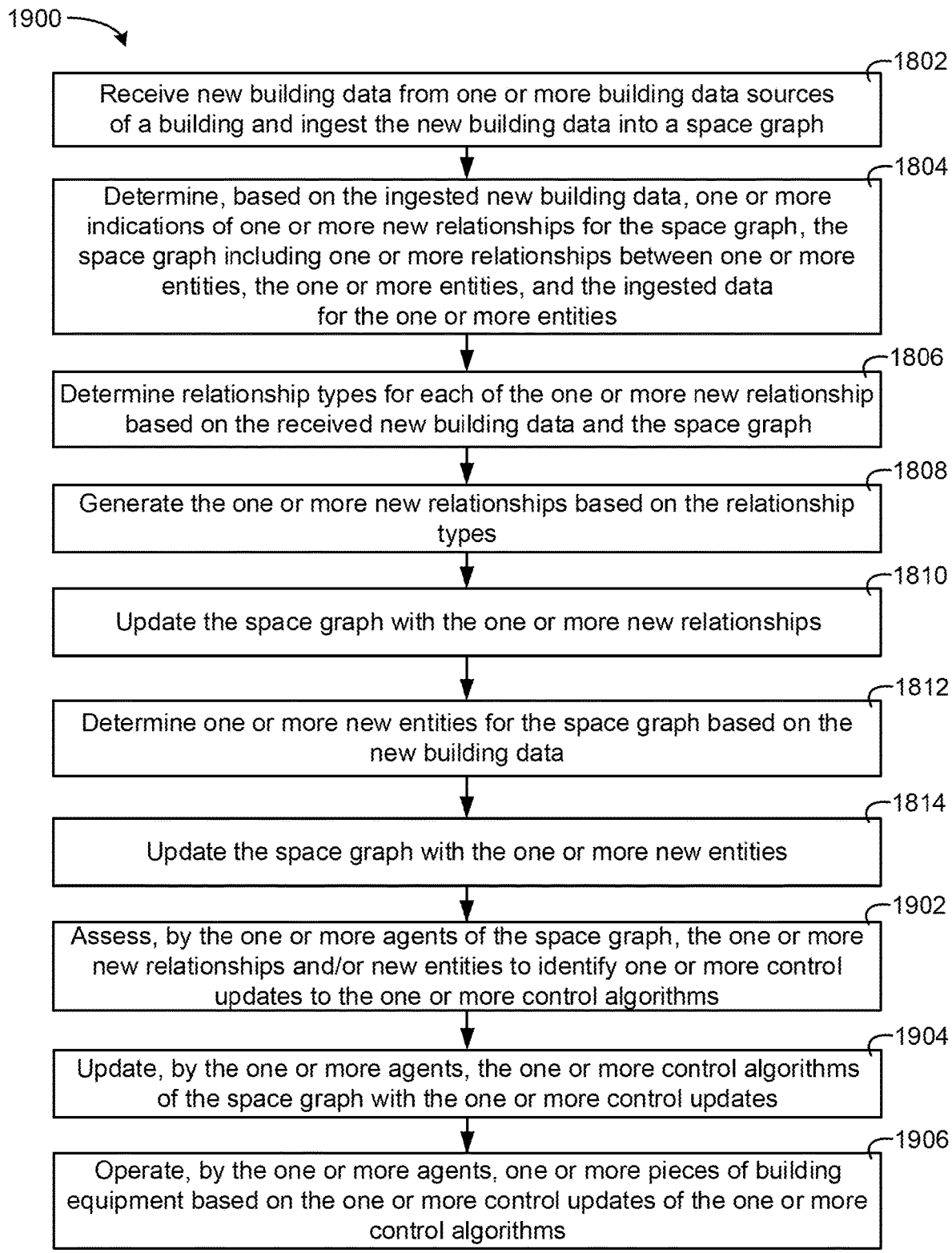
FIG. 19 is a flow diagram of a process for learning new relationships for the space graph of FIG. 11, updating the space graph with the new relationships, and updating control algorithms based on the updated space graph, according to an exemplary embodiment.

Referring now to FIG. 19, a process 1900 for updating control algorithms of a space graph database 1120 based on relationship and entity updates to the space graph database 1120 that can be performed by the space graph learning service 1104, according to an exemplary embodiment. In some embodiments, the space graph learning service 1104 is configured to perform the process 1900 to generate the space graph database 1120. Instructions stored on one or more memory devices and executed on one or more processors can be configured to implement the space graph learning service 1104 and the generation of the space graph database 1120. Furthermore, any processing device, system, and/or software component as described herein can be configured to perform the process 1900. The steps 1802-1814 of the process 1800 are included in FIG. 19 and are described with reference to FIG. 18.

In step 1902, one or more agents of the space graph database 1120 can assess the one or more new relationships and/or new entities to generate control updates. The one or more agents can periodically search the space graph database 1120 for new relationships and/or new entities. In some embodiments, the one or more agents can be triggered to perform updates in response to new relationships and/or new entities being added to the space graph database 1120.

In some embodiments, the control updates can be updates to an occupancy schedule. If it is determined that a television is located within a particular zone, operation of the television may indicate occupancy of the zone. The one or more agents can identify the operations of the television to identify an occupancy pattern. The occupancy pattern can be an update to an existing occupancy schedule.

In step 1904, the one or more agents can update one or more control algorithms of the space graph database 1120 with the one or more control updates. For example, the one or more agents can update temperature setpoints of a comfort schedule. In other embodiments, the one or more agents can activate or deactivate a control algorithm. For example, the control algorithm can be linked to an office that is not in use. However, if a user is linked to the office, this may indicate that the user will be and/or is using the office and a comfort schedule should be implemented for the office. In step 1906, the one or more agents can operate pieces of building equipment based on the one or more control algorithms that are updated to control one or more environmental conditions of the building.

Figure 20:
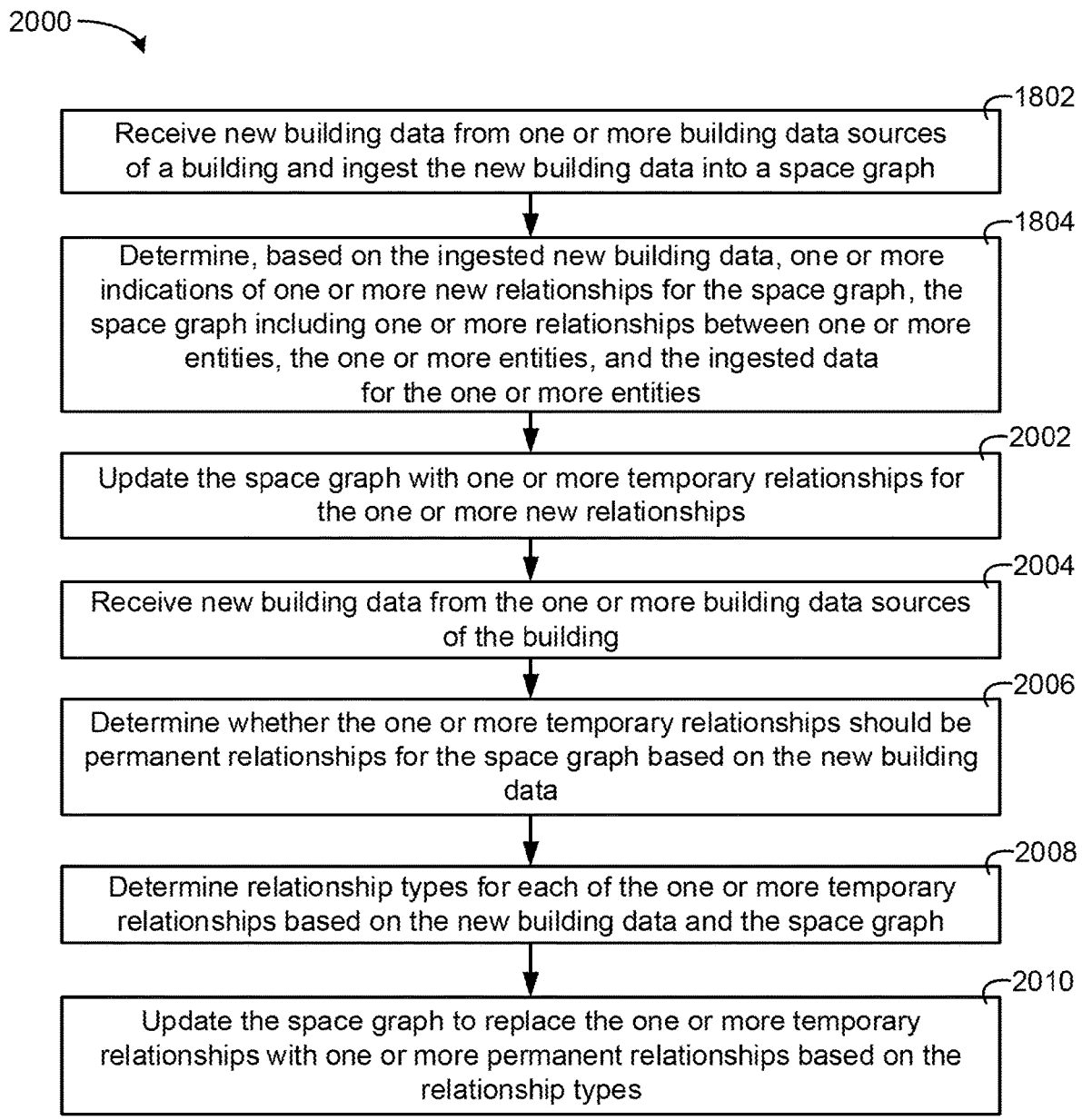
FIG. 20 is a flow diagram of a process of learning temporary relationships for the space graph of FIG. 11 and replacing the temporary relationships with permanent relationships, according to an exemplary embodiment.

Referring now to FIG. 20, a process 2000 for updating a space graph database 1120 with temporary relationships by the space graph learning service 1104 with new entities and/or new relationships between entities is shown, according to an exemplary embodiment. In some embodiments, the space graph learning service 1104 is configured to perform the process 2000 to generate the space graph database 1120. Instructions stored on one or more memory devices and executed on one or more processors can be configured to implement the space graph learning service 1104 and the generation of the space graph database 1120. Furthermore, any processing device, system, and/or software component as described herein can be configured to perform the process 1900. The steps 1802-1804 of the process 1800 are included in FIG. 20 and are described with reference to FIG. 18.

In step 2002, based on the one or more new relationship, the space graph learning service 1104 adds temporary relationships to the space graph database 1120. The temporary relationship may be a placeholder to add a formal relationship, a more permanent relationship (although it could be updated or deleted in the future) can be determined and/or what type of relationship should be added for the permanent relationship. In some embodiments, the space graph learning service 1104 causes the space graph database 1120 to store an edge between entities of the space graph database 1120 which may have the relationship and cause the edge to be labelled as a temporary edge.

In step 2004, new building data can be received from the one or more building data sources. In step 2006, the space graph learning service 1004 ingests the new building data into the space graph database 1120 and/or otherwise analyzes the ingested and/or new building data to determine whether the temporary relationship should be replaced with a permanent relationship. In some embodiments, the edge is associated with and/or stores a confidence level. The confidence level may be based on machine learning and/or relationship rules. For example, if an event indicating a relationship occurs every hour, this may indicate a first level for the confidence level. However, if the event indicating the relationship occurs ten times every hour, this may indicate a second level for the confidence level. If the confidence level is greater than a predefined amount, the temporary relationship can be determined to be a permanent (e.g., a formal) relationship.

Furthermore, the space graph database 1120 can determine the nature of the permanent relationship. For example, based on the new data, the type of the relationship can be discovered. In some embodiments, the type of the relationship is based on the types of the nodes which the permanent relationship connects. In step 2010, the space graph learning service 1104 is configured to remove the temporary relationship can replace the temporary relationship with one or multiple permanent relationships with the permanent relationship types determined in the step 2008.

Figure 21:
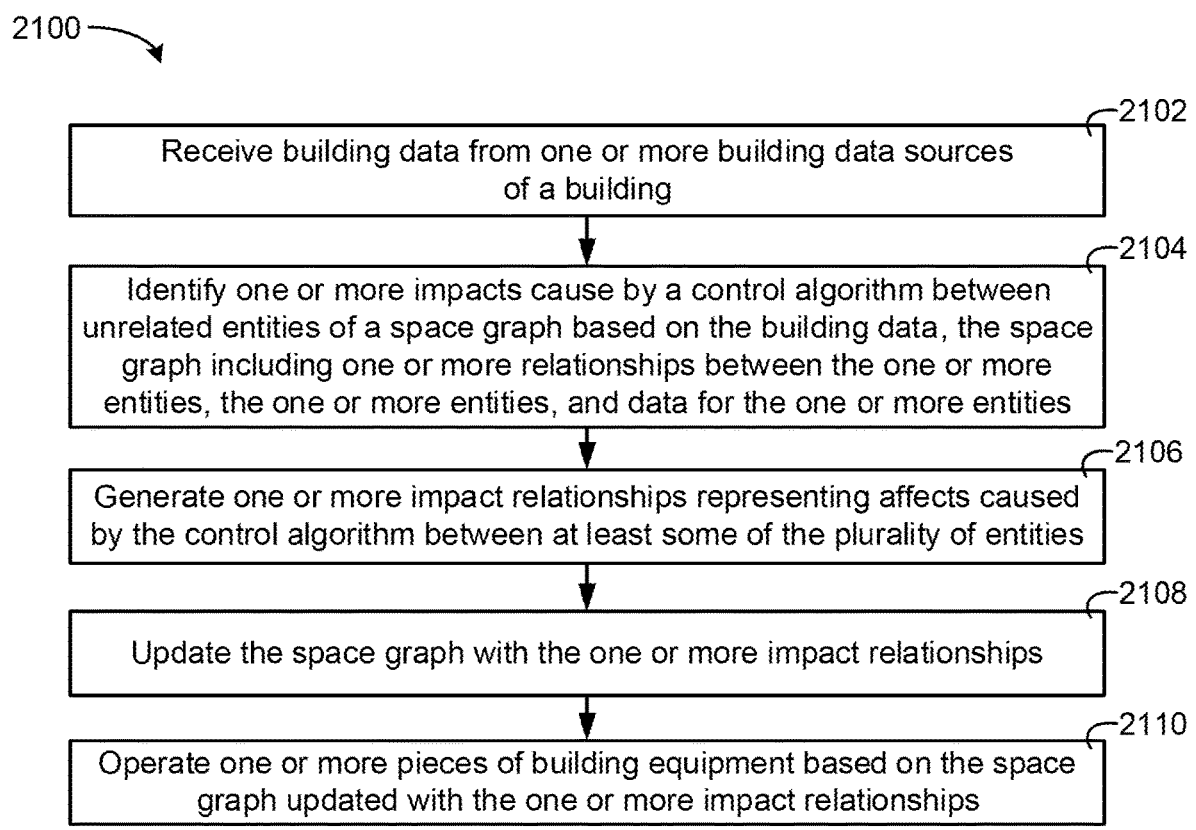
FIG. 21 is a flow diagram of a process of learning an impact relationship between entities of the space graph of FIG. 11, the impact relationship indicating the effects of a control algorithm performed for one entity on another entity, according to an exemplary embodiment.

Referring now to FIG. 21, a process 2100 for updating a space graph database 1120 by the space graph learning service 1104 with new entities and/or new relationships between entities is shown, according to an exemplary embodiment. In some embodiments, the space graph learning service 1104 is configured to perform the process 2100 to generate the space graph database 1120. Instructions stored on one or more memory devices and executed on one or more processors can be configured to implement the space graph learning service 1104 and the generation of the space graph database 1120.

In step 2102, the space graph learning service 1104 receives new building data from one or more building data sources of a building. The building data can indicate operations of entities of the space graph database 1120. The building data can indicate the result of the operation of various control algorithms performed by agents of the space graph database 1120. For example, if a comfort agent causes thermostat to control temperature in a zone, the measured temperature for the zone can be included by the building data. Furthermore, the building data can include measured temperature for other zones of the building.

In step 2104, the space graph learning service 1104 identifies one or more impact relationships between entities of the space graph database 1120 caused by operation of the control algorithm. For example, the schedule of controlling temperature for the zone may also change temperature in a neighboring zone. For example, if a single air duct feeds a first zone and a second zone, operating a VAV of the first zone connected to the air duct may impact control of the second zone. In step 2106, the space graph learning service 1104 can generate an impact relationship (e.g., an edge identified as an impact edge) to be added to the space graph.

In step 2108, the space graph learning service 1104 can update the space graph database 1120 with the impact relationship, the impact relationship indicating the affects cause by the control algorithm between at least some of the entities. In some embodiments, the controlled component of the space graph operated based on the control algorithm is linked to the impacted entity. For example, the VAV box of the first zone is linked to the second zone via the impact relationship. This edge, which can be added between entities for the VAV box and the second zone, can be utilized to adapt one or more control algorithms.

In step 2110, one or more pieces of building equipment can be operated based on the space graph updated with the one or more impact relationships. In some embodiments, control applications for controlling the equipment can analyze the impact relationship to meet setpoints and/or other control goals. In some embodiments, one or more agents of the space graph database 1120 can assess the impact relationships and update control algorithms of the space graph database 1120, update the operation of the one or more pieces of building equipment.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A building system for operating a building and managing building information, the building system comprising one or more memory devices configured to store instructions thereon, the instructions causing one or more processors to:
    receive building data from one or more building data sources;
    generate a space graph based on the building data, wherein the space graph is a graph data structure comprising a plurality of nodes representing a plurality of entities and a plurality edges between the plurality of nodes representing a plurality of relationships between the plurality of entities;
    ingest data timeseries values of the building data into the space graph by adding one or more timeseries nodes for the data timeseries values to the space graph and one or more edges between the one or more timeseries nodes and a second node representing an entity of the plurality of entities; and
    perform one or more operations with the space graph based on both the plurality of relationships between the plurality of entities and the data timeseries values.

2. The building system of claim 1, wherein the plurality of entities comprise one or more agents, wherein the one or more agents are configured to:
    generate one or more control decisions by querying the space graph for information, wherein the information comprises at least some of the plurality of entities, at least some of the plurality of relationships, and at least some of the data timeseries values; and
    cause one or more pieces of equipment to operate based on the one or more control decisions.

3. The building system of claim 1, wherein the space graph is a digital twin of the building, wherein the plurality of entities represent at least one of spaces, people, or devices associated with the building.

4. The building system of claim 1, wherein the instructions cause the one or more processors to:
    receive a query for information of the space graph from a requesting device, wherein the information is included by one of the plurality of nodes of the space graph;
    retrieve the information from the space graph by traversing at least some of the plurality of entities and at least some of the plurality of edges to identify the information without traversing other entities or other relationships of a data structure other than the space graph; and
    provide the information to the requesting device.

5. The building system of claim 4, wherein the query comprises an indication of the at least some of the plurality of nodes and the at least some of the plurality of entities to traverse to identify the information.

6. The building system of claim 4, wherein the information is at least some of the data timeseries values ingested into the space graph.

7. The building system of claim 4, wherein the instructions cause the one or more processors to:
receive a request input from a user device in a natural language;
generate, by a chatbot system, the query by performing natural language processing on the request input; and
provide the information to the user device.

8. A method for operating a building, the method comprising:
receiving, by a processing circuit, building data from one or more building data sources;
generating, by the processing circuit, a space graph based on the building data, wherein the space graph is a graph data structure comprising a plurality of nodes representing a plurality of entities and a plurality edges between the plurality of nodes representing a plurality of relationships between the plurality of entities;
ingesting, by the processing circuit, data timeseries values of the building data into the space graph by adding one or more timeseries nodes for the data timeseries values to the space graph and one or more edges between the one or more timeseries nodes and a second node representing an entity of the plurality of entities; and
performing, by the processing circuit, one or more operations with the space graph based on at least some of the plurality of relationships between the plurality of entities and the data timeseries values.

9. The method of claim 8, wherein the plurality of entities comprise one or more agents, wherein the one or more agents comprise artificial intelligence;
wherein the method further comprises:
generating, by the processing circuit via the one or more agents, one or more control decisions by querying the space graph for information, wherein the information comprises at least some of the plurality of entities, at least some of the plurality of relationships, and at least some of the data timeseries values; and
causing, by the processing circuit, one or more pieces of equipment to operate based on the one or more control decisions.

10. The method of claim 8, wherein the space graph is a digital twin of the building, wherein the plurality of entities represent at least one of spaces, people, or devices associated with the building.

11. The method of claim 8, wherein the instructions cause the one or more processors to:
receiving, by the processing circuit, a query for information of the space graph from a requesting device, wherein the information is included by one of the plurality of nodes of the space graph;
retrieving, by the processing circuit, the information from the space graph by traversing at least some of the plurality of entities and at least some of the plurality of edges to identify the information without traversing other entities or other relationships of a data structure other than the space graph; and
providing, by the processing circuit, the information to the requesting device.

12. The method of claim 11, wherein the query comprises an indication of the at least some of the plurality of nodes and the at least some of the plurality of entities to traverse to identify the information.

13. The method of claim 11, wherein the information is at least some of the data timeseries values ingested into the space graph.

14. The method of claim 11, wherein the instructions cause the one or more processors to:
receiving, by the processing circuit, a request input from a user device in a natural language;
generating, by the processing circuit via a chatbot system, the query by performing natural language processing on the request input; and
providing, by the processing circuit, the information to the user device.

15. A building management system for operating a building and managing building information comprising a processing circuit configured to:
receive building data from one or more building data sources;
generate a space graph based on the building data, wherein the space graph is a graph data structure comprising a plurality of nodes representing a plurality of entities and a plurality edges between the plurality of nodes representing a plurality of relationships between the plurality of entities;
ingest data timeseries values of the building data into the space graph by adding one or more timeseries nodes for the data timeseries values to the space graph and one or more edges between the one or more timeseries nodes and a second node representing an entity of the plurality of entities;
generate one or more control decisions by querying the space graph for information, wherein the information comprises at least some of the plurality of entities, at least some of the plurality of relationships, and at least some of the data timeseries values; and
cause one or more pieces of equipment to operate based on the one or more control decisions.

16. The building management system of claim 15, wherein the processing circuit is configured to generate the one or more control decisions via an agent of the space graph, wherein the agent is one node of the plurality of nodes.

17. The building management system of claim 15, wherein the space graph is a digital twin of the building, wherein the plurality of entities represent at least one of spaces, people, and devices associated with the building.

18. The building management system of claim 15, wherein the instructions cause the processing circuit to:
receive a query for particular information of the space graph from a requesting device, wherein the information is included by one of the plurality of nodes of the space graph;
retrieve the information from the space graph by traversing at least some of the plurality of entities and at least some of the plurality of edges to identify the information without traversing other entities or other relationships of a data structure other than the space graph; and
provide the information to the requesting device.

19. The building management system of claim 18, wherein the query comprises an indication of the at least some of the plurality of nodes and the at least some of the plurality of entities to traverse to identify the information.

20. The building management system of claim 18, wherein the information is at least some of the data time-series values ingested into the space graph.

* * * * *